US012610225B2

(12) United States Patent
Hung et al.

(10) Patent No.: US 12,610,225 B2
(45) Date of Patent: Apr. 21, 2026

(54) METHOD AND APPARATUS FOR RELAY UE SUPPORTING CANDIDATE U2U RELAY DISCOVERY IN A WIRELESS COMMUNICATION SYSTEM

(71) Applicant: ASUS Technology Licensing Inc., Taipei City (TW)

(72) Inventors: Chen-Hsiang Hung, Taipei City (TW); Li-Te Pan, Taipei City (TW); Yu-Hsuan Guo, Taipei City (TW)

(73) Assignee: ASUS Technology Licensing Inc., Taipei City (TW)

( * ) Notice: Subject to any disclaimer, the term of this patent is extended or adjusted under 35 U.S.C. 154(b) by 0 days.

(21) Appl. No.: 19/242,700

(22) Filed: Jun. 18, 2025

(65) Prior Publication Data

US 2025/0392896 A1     Dec. 25, 2025

Related U.S. Application Data

(60) Provisional application No. 63/664,123, filed on Jun. 25, 2024.

(51) Int. Cl.
*H04W 8/20*        (2009.01)
*H04W 8/00*        (2009.01)
H04W 88/04        (2009.01)

(52) U.S. Cl.
CPC ............ *H04W 8/005* (2013.01); *H04W 88/04* (2013.01)

(58) Field of Classification Search
CPC ...... H04W 76/14; H04W 88/04; H04W 8/005
See application file for complete search history.

(56) References Cited

U.S. PATENT DOCUMENTS

| | | | |
|---|---|---|---|
| 10,674,553 B2 | 6/2020 | Kim et al. | |
| 2025/0024535 A1* | 1/2025 | Pan ....................... | H04W 76/18 |
| 2025/0220408 A1* | 7/2025 | Guo ...................... | H04W 8/005 |

OTHER PUBLICATIONS

3rd Generation Partnership Project; Technical Specification Group Services and System Aspects; Proximity based Services (ProSe) in the SG System (5GS) (Release 19); 3GPP TS 23.304 V19.0.0; Jun. 2024; 150 pages.
Vivo, Interdigital, Nokia, Nokia Shanghai Bell; Clarification on relay operation in mobility restriction; 3GPP TSG-CT WG1 Meeting #133-e; 01-216897; E-meeting, Nov. 11-19, 2021; 10 pages
Catt; CR to R-18 33.503 from Living document for 5G_ProSe_Ph2; 3GPP TSG-SA3 Meeting #112; 83-234331; DRAFT 33.503 CR, Current version 17.4.0; Goteborg, Sweden Aug. 14-18, 2023; 18 pages
5G; Security Aspects of Proximity based Services (ProSe) in the SG System (5GS) (3GPP TS 33.503 version 18.2.0 Release 18); ETSI TS 133 503 V18.2.0; May 2024; 67 pages

* cited by examiner

*Primary Examiner* — Farid Seyedvosoghi
(74) *Attorney, Agent, or Firm* — Skaar Ulbrich Macari, P.A.

(57)     ABSTRACT
Methods, systems, and apparatuses are provided for relay User Equipment (UE) supporting candidate UE-to-UE (U2U) relay discovery, wherein a method for a relay UE comprises receiving, from a target end UE, a discovery solicitation message for candidate U2U relay discovery, and determining to transmit a discovery response message to the target end UE, in response to reception of the discovery solicitation message for candidate U2U relay discovery, wherein the discovery response message indicates the discovery response message being used for candidate U2U relay discovery by at least setting an application layer Identification (ID) indicated in the discovery response message to a specific value.

18 Claims, 29 Drawing Sheets

PROGRAM CODE *312*

APPLICATION LAYER *400*

LAYER 3 *402*

LAYER 2 *404*

LAYER 1 *406*

Initiating UE                                        Target UE

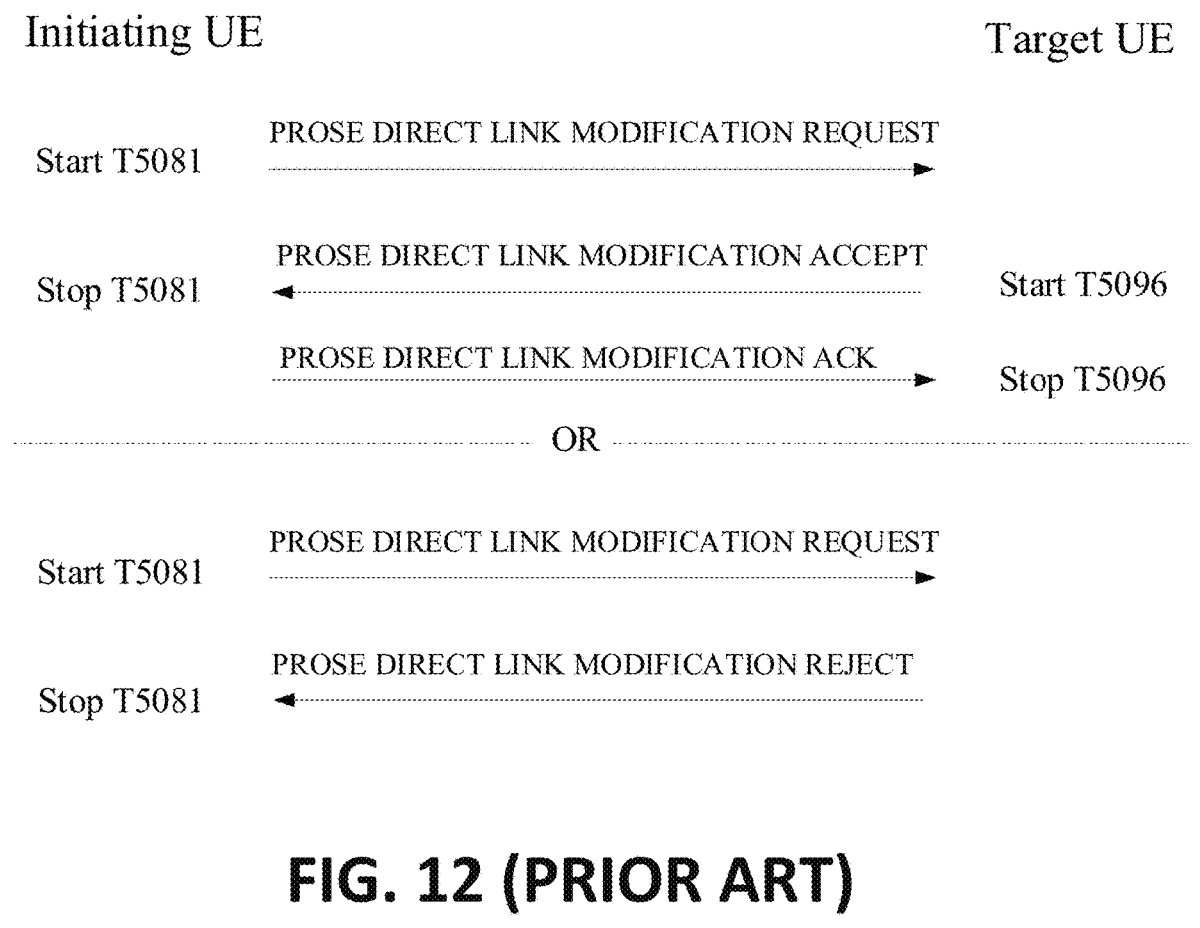

Initiating UE                                           Target UE

Start T5081     PROSE DIRECT LINK MODIFICATION REQUEST  →

Stop T5081     PROSE DIRECT LINK MODIFICATION ACCEPT  ←     Start T5096

PROSE DIRECT LINK MODIFICATION ACK  →     Stop T5096

OR

Start T5081     PROSE DIRECT LINK MODIFICATION REQUEST  →

Stop T5081     PROSE DIRECT LINK MODIFICATION REJECT  ←

FIG. 12 (PRIOR ART)

| 8 | 7 | 6 | 5 | 4 | 3 | 2 | 1 | |
|---|---|---|---|---|---|---|---|---|
| Discovery type | | Content type | | | | Discovery model | | octet 1 |

| 8 | 7 | 6 | 5 | 4 | 3 | 2 | 1 | |
|---|---|---|---|---|---|---|---|---|
| Application layer ID IEI | | | | | | | | octet 1 |
| Length of application layer ID contents | | | | | | | | octet 2 |
| Application layer ID contents | | | | | | | | octet 3 |
| | | | | | | | | octet m |

Announcing
UE

Monitoring
UE

PROSE PC5 DISCOVERY message
( for UE-to-UE Relay Discovery Announcement)

| 8 | 7 | 6 | 5 | 4 | 3 | 2 | 1 | |
|---|---|---|---|---|---|---|---|---|
| Candidate discovery supported indication IEI | | | | Spare | | | CDSI | octet 1 |

| 8 | 7 | 6 | 5 | 4 | 3 | 2 | 1 | |
|---|---|---|---|---|---|---|---|---|
| Candidate discovery indication IEI | | | | Spare | | | CDI | octet 1 |

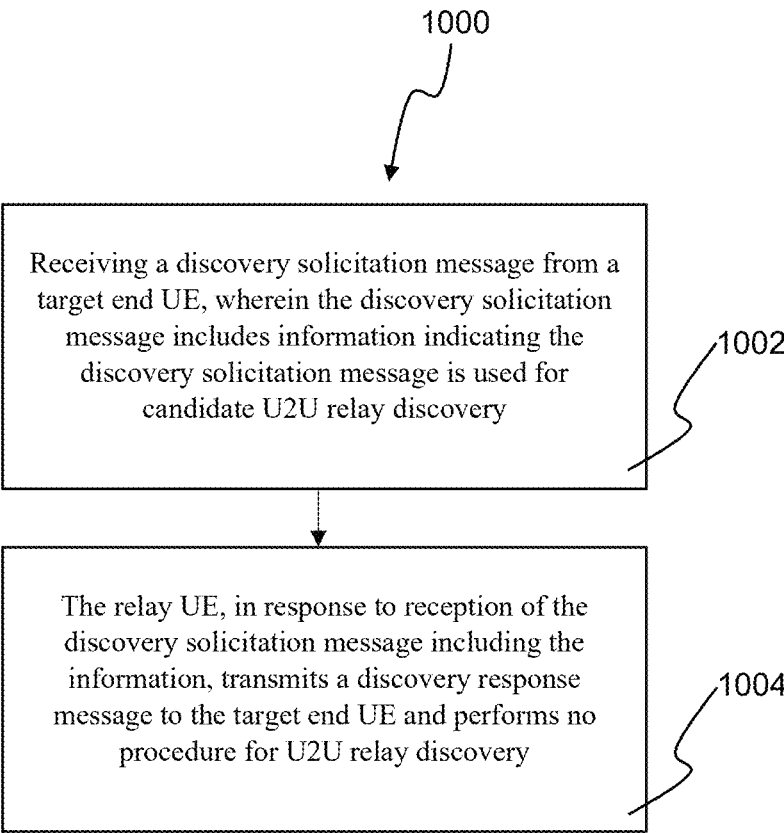

1000

Receiving a discovery solicitation message from a target end UE, wherein the discovery solicitation message includes information indicating the discovery solicitation message is used for candidate U2U relay discovery

1002

The relay UE, in response to reception of the discovery solicitation message including the information, transmits a discovery response message to the target end UE and performs no procedure for U2U relay discovery

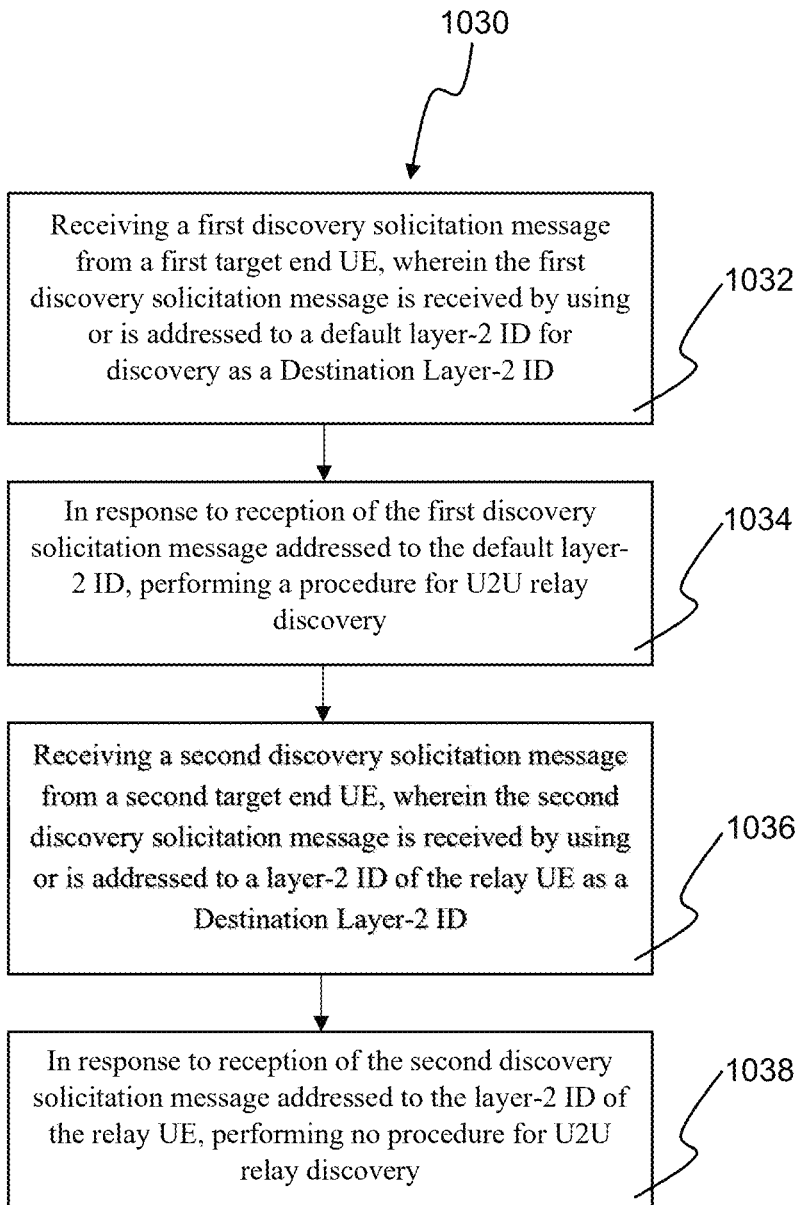

1030

Receiving a first discovery solicitation message from a first target end UE, wherein the first discovery solicitation message is received by using or is addressed to a default layer-2 ID for discovery as a Destination Layer-2 ID — 1032

In response to reception of the first discovery solicitation message addressed to the default layer-2 ID, performing a procedure for U2U relay discovery — 1034

Receiving a second discovery solicitation message from a second target end UE, wherein the second discovery solicitation message is received by using or is addressed to a layer-2 ID of the relay UE as a Destination Layer-2 ID — 1036

In response to reception of the second discovery solicitation message addressed to the layer-2 ID of the relay UE, performing no procedure for U2U relay discovery — 1038

FIG. 34

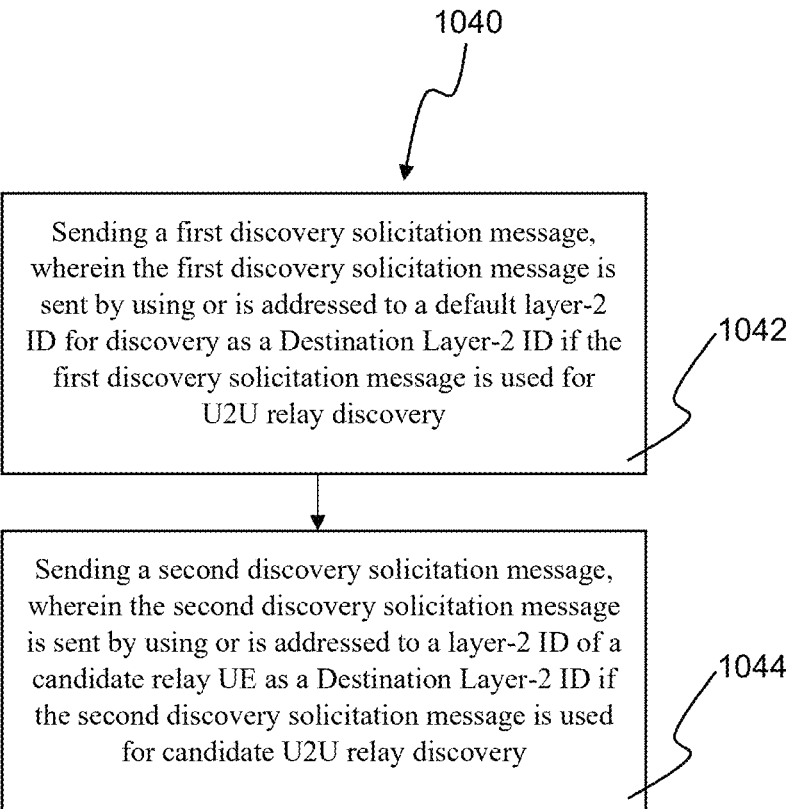

1040

Sending a first discovery solicitation message, wherein the first discovery solicitation message is sent by using or is addressed to a default layer-2 ID for discovery as a Destination Layer-2 ID if the first discovery solicitation message is used for U2U relay discovery

1042

Sending a second discovery solicitation message, wherein the second discovery solicitation message is sent by using or is addressed to a layer-2 ID of a candidate relay UE as a Destination Layer-2 ID if the second discovery solicitation message is used for candidate U2U relay discovery

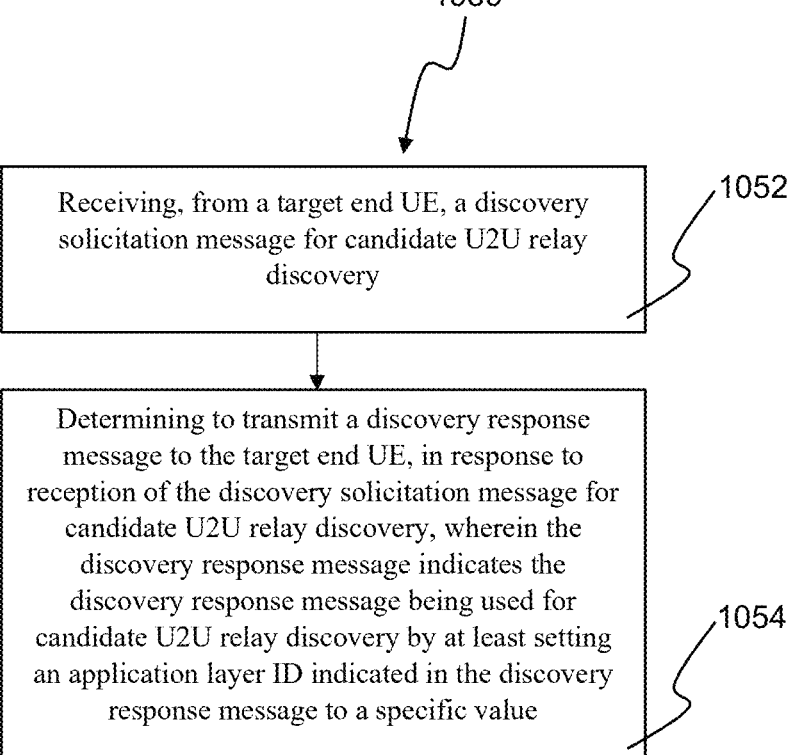

1050

Receiving, from a target end UE, a discovery solicitation message for candidate U2U relay discovery
1052

Determining to transmit a discovery response message to the target end UE, in response to reception of the discovery solicitation message for candidate U2U relay discovery, wherein the discovery response message indicates the discovery response message being used for candidate U2U relay discovery by at least setting an application layer ID indicated in the discovery response message to a specific value
1054

FIG. 36

METHOD AND APPARATUS FOR RELAY UE SUPPORTING CANDIDATE U2U RELAY DISCOVERY IN A WIRELESS COMMUNICATION SYSTEM

CROSS-REFERENCE TO RELATED APPLICATIONS

The present application claims priority to and the benefit of U.S. Provisional Patent Application Ser. No. 63/664,123, filed Jun. 25, 2024, which is hereby fully incorporated herein by reference.

FIELD

This disclosure generally relates to wireless communication networks and, more particularly, to a method and apparatus for relay User Equipment (UE) supporting candidate UE-to-UE (U2U) relay discovery in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for relay User Equipment (UE) supporting candidate UE-to-UE (U2U) relay discovery in a wireless communication system.

In various embodiments, a method for a relay UE in a wireless communication system comprises receiving, from a target end UE, a discovery solicitation message for candidate U2U relay discovery, and determining to transmit a discovery response message to the target end UE, in response to reception of the discovery solicitation message for candidate U2U relay discovery, wherein the discovery response message indicates the discovery response message being used for candidate U2U relay discovery by at least setting an application layer Identification (ID) indicated in the discovery response message to a specific value.

BRIEF DESCRIPTION OF THE DRAWINGS

FIG. 12 is a reproduction of FIG. 7.2.3.2.2: 5G ProSe direct link modification procedure for the negotiated 5G ProSe layer-3 UE-to-UE relay reselection, from 3GPP TS 24.554 v18.4.0.

FIG. 32 is a flow diagram of a method for a relay UE in a wireless communication system comprises receiving a discovery solicitation message from a target end UE, and the relay UE, in response to reception of the discovery solicitation message including the information, transmits a discovery response message to the target end UE and performs no procedure for U2U relay discovery, in accordance with embodiments of the present invention.

FIG. 34 is a flow diagram of a method for a relay UE in a wireless communication system comprises receiving a first discovery solicitation message from a first target end UE, in response to reception of the first discovery solicitation message addressed to the default layer-2 ID, performing a procedure for U2U relay discovery, receiving a second discovery solicitation message from a second target end UE, and in response to reception of the second discovery solicitation message addressed to the layer-2 ID of the relay UE, performing no procedure for U2U relay discovery, in accordance with embodiments of the present invention.

FIG. 35 is a flow diagram of a method for a second end UE in a wireless communication system comprises sending a first discovery solicitation message, and sending a second discovery solicitation message, wherein the second discovery solicitation message is sent by using or is addressed to a layer-2 ID of a candidate relay UE as a Destination Layer-2 ID if the second discovery solicitation message is used for candidate U2U relay discovery, in accordance with embodiments of the present invention.

FIG. 36 is a flow diagram of a method for a relay UE in a wireless communication system comprises receiving, from a target end UE, a discovery solicitation message for candidate U2U relay discovery, and determining to transmit a discovery response message to the target end UE, in response to reception of the discovery solicitation message for candidate U2U relay discovery, in accordance with embodiments of the present invention.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WIMAX®, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1][TS23.304] 3GPP TS 23.304 v18.5.1, "Proximity based Services (ProSe) in the 5G System (5GS) (Release 18)"; and [2] [TS24.554]3GPP TS 24.554 v18.4.0, "Proximity-services (ProSe) in 5G System (5GS) protocol aspects (Release 18)". The standards and documents listed above are hereby expressly and fully incorporated herein by reference in their entirety.

Figure 1:
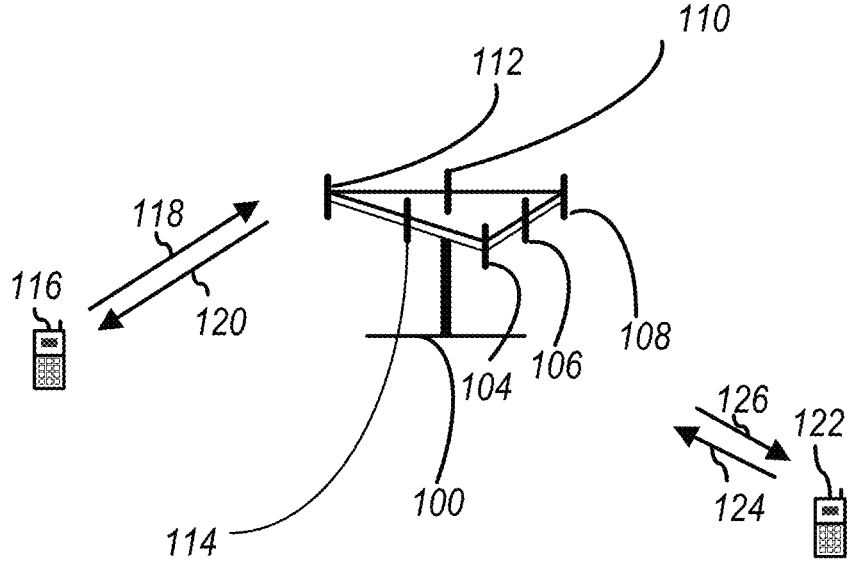
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118.

AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
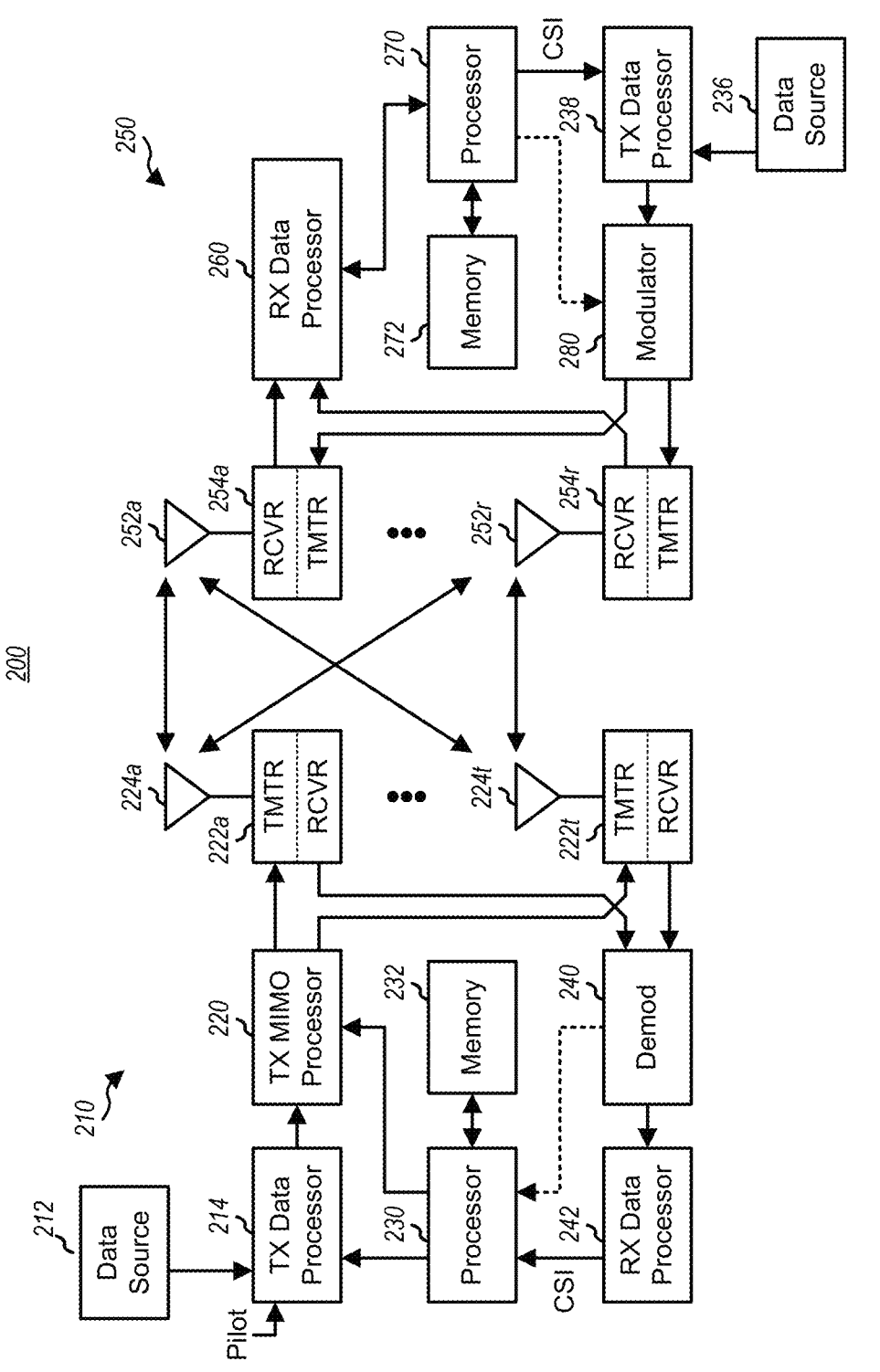
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
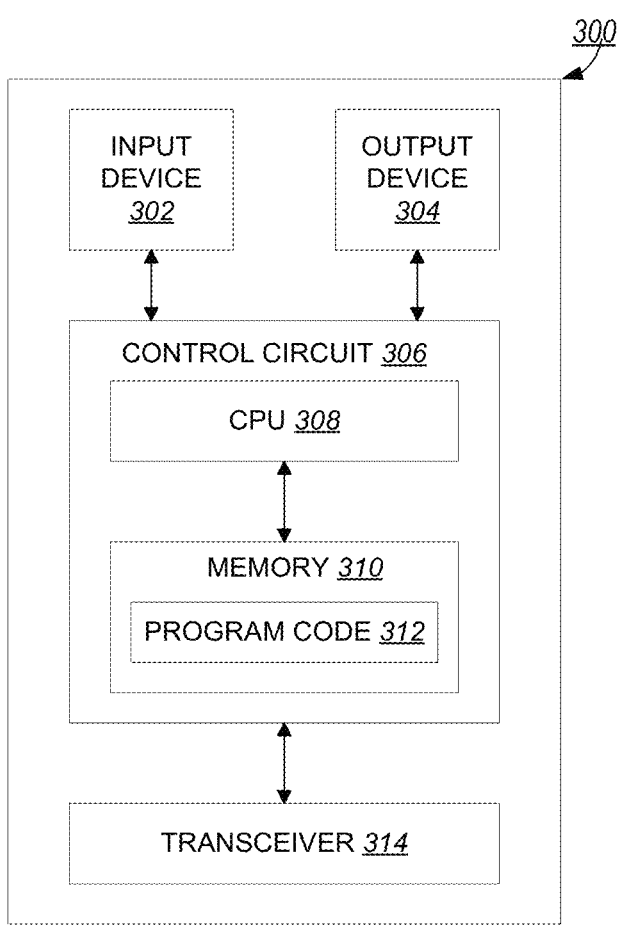
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
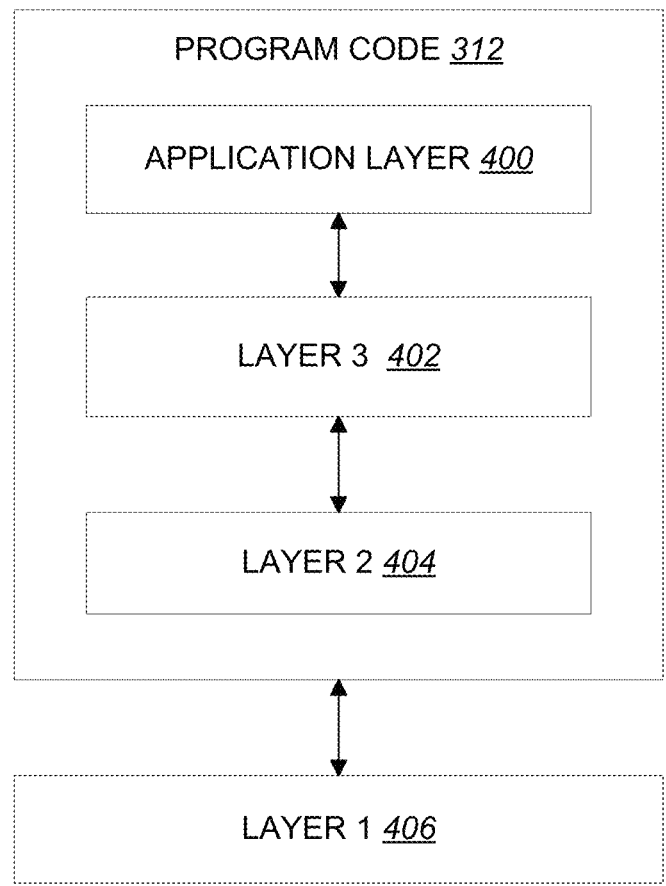
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

3GPP TS 23.304 [TS23.304]([1][TS23.304]3GPP TS 23.304 v18.5.1) specifies procedures related to UE-to-UE Relay in Release 18 as quoted below:

Quotation Start 6.3.2.4 5G ProSe UE-to-UE Relay Discovery 6.3.2.4.1 General

5G ProSe UE-to-UE Relay Discovery is applicable to both 5G ProSe Layer-3 and Layer-2 UE-to-UE Relay Discovery for public safety use and commercial services. To perform 5G ProSe UE-to-UE Relay Discovery, the 5G ProSe End UE and the 5G ProSe UE-to-UE Relay are pre-configured or provisioned with the related information as described in clause 5.1.

A Relay Service Code (RSC) is used in the 5G ProSe UE-to-UE Relay Discovery, to indicate the connectivity service the 5G ProSe UE-to-UE Relay provides to 5G ProSe End UEs. The RSCs are pre-configured or provisioned on the 5G ProSe UE-to-UE Relay and the 5G ProSe End UE as defined in clause 5.1. The 5G ProSe UE-to-UE Relay and the 5G ProSe End UE are aware of whether a RSC is offering 5G ProSe Layer-2 or Layer-3 UE-to-UE Relay service based on the UE-to-UE Relay Layer indicator as specified in clause 5.1. A 5G ProSe UE-to-UE Relay supporting multiple RSCs advertises the RSCs using multiple discovery messages, with one RSC per discovery message.

6.3.2.4.2 Procedure for 5G ProSe UE-to-UE Relay Discovery with Model A

Figure 6:
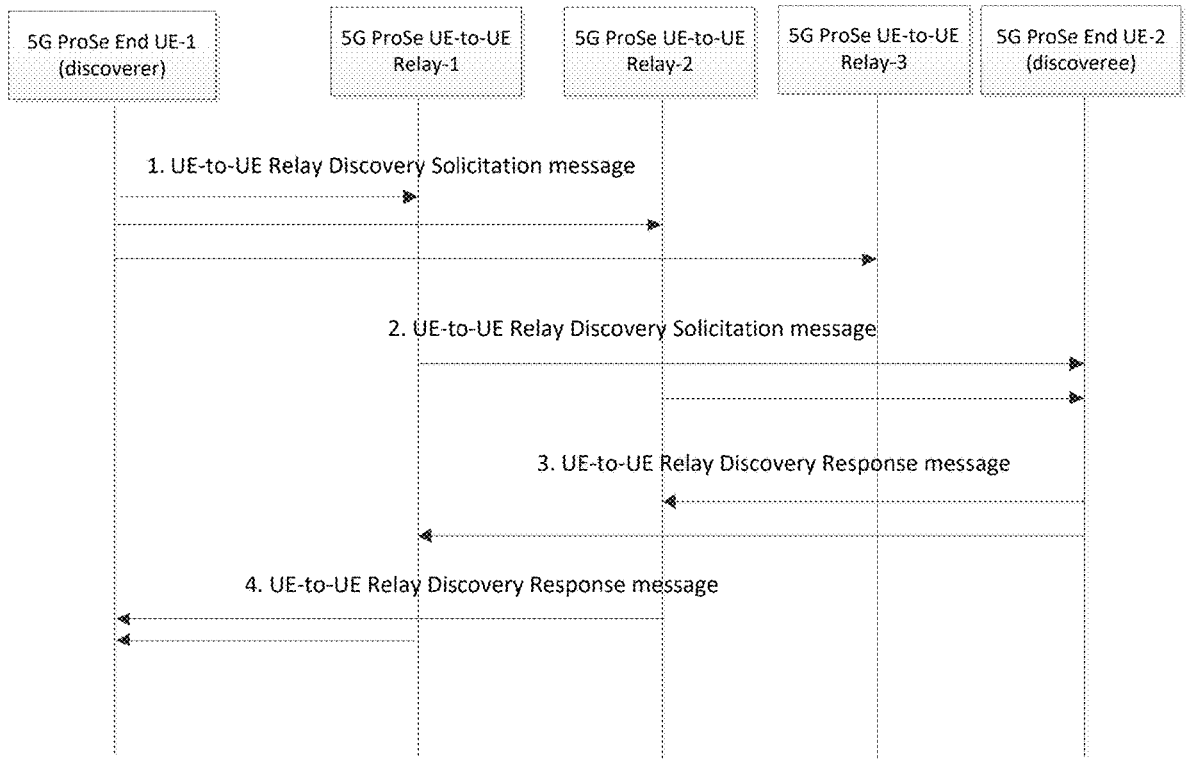
FIG. 6 is a reproduction of FIG. 6.3.2.4.3-1: 5G ProSe UE-to-UE Relay Discovery with Model B, from 3GPP TS 23.304 v18.5.1.

Depicted in FIG. 6.3.2.4.2-1 is the procedure for 5G ProSe UE-to-UE Discovery with Model A.

Figure 5:
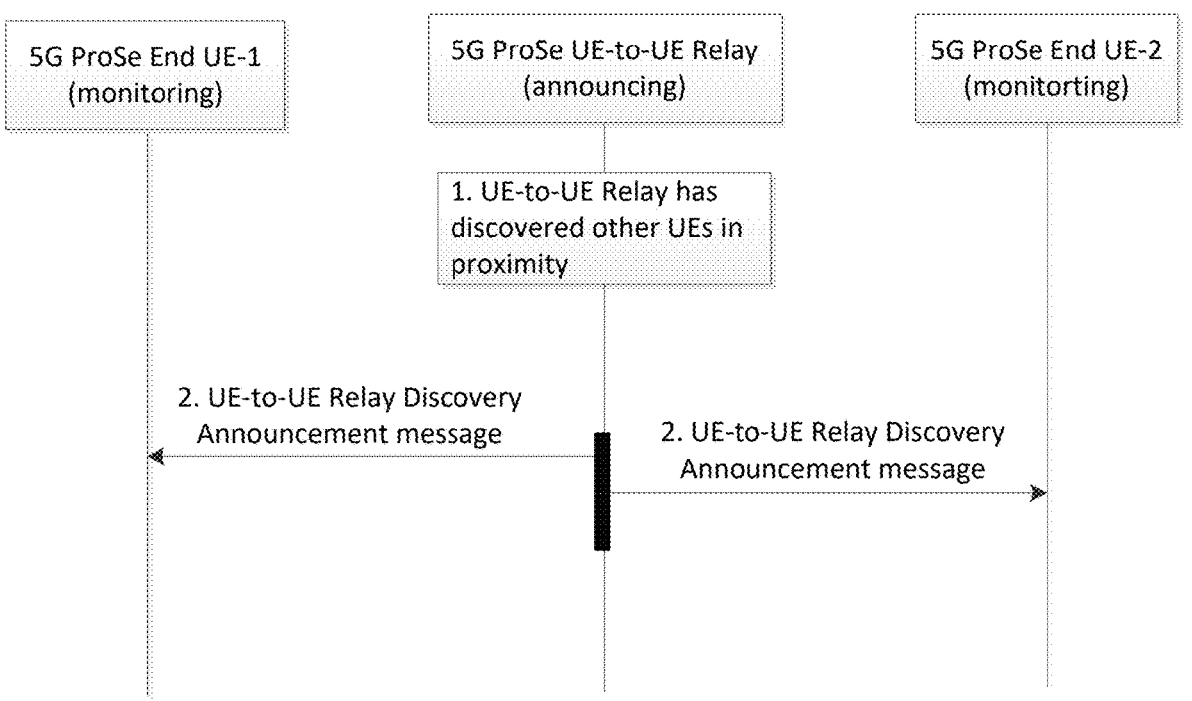
FIG. 5 is a reproduction of FIG. 6.3.2.4.2-1: 5G ProSe UE-to-UE Relay Discovery with Model A, from 3GPP TS 23.304 v18.5.1.

FIG. 5 is a Reproduction of FIG. 6.3.2.4.2-1: 5G ProSe UE-to-UE Relay Discovery with Model a, from 3GPP TS 23.304 v18.5.1.

1. The 5G ProSe UE-to-UE Relay has discovered other UEs in proximity and obtains the Direct discovery set from other UEs in proximity per RSC. (e.g. via a previous 5G ProSe UE-to-UE Relay Discovery or via secure PC5 connection between 5G ProSe U2U Relay and 5G ProSe End UE (refer to TS 33.503 [29])).

2. The 5G ProSe UE-to-UE Relay sends a UE-to-UE Relay Discovery Announcement message. The UE-to-UE Relay Discovery Announcement message contains the Type of Discovery Message, User Info ID of the 5G ProSe UE-to-UE Relay, RSC and list of Direct discovery set received from the 5G ProSe End UEs supporting the RSC. The UE-to-UE Relay Discovery Announcement message is sent using the Source Layer-2 ID and Destination Layer-2 ID as described in clause 5.8.4.

The 5G ProSe UE-to-UE Relay shall only announce User Info IDs of other UEs in proximity that did not include an Announce Prohibited Indication when they were previously discovered.

NOTE: 5G ProSe UE-to-UE Relay announces Direct discovery set from other UEs in proximity only if their PC5 signal strength measured by the 5G ProSe UE-to-UE Relay is above configured signal strength threshold as specified in TS 38.331 [16].

A 5G ProSe End UE monitors announcement messages from a 5G ProSe UE-to-UE Relay. The 5G ProSe End UEs determine the Destination Layer-2 ID for signalling reception as specified in clause 5.1.

6.3.2.4.3 Procedure for 5G ProSe UE-to-UE Relay Discovery with Model B

Depicted in FIG. 6.3.2.4.3-1 is the procedure for 5G ProSe UE-to-UE Relay Discovery with Model B.

FIG. 6 is a Reproduction of FIG. 6.3.2.4.3-1: 5G ProSe UE-to-UE Relay Discovery with Model B, from 3GPP TS 23.304 v18.5.1.

1. The discoverer 5G ProSe End UE (UE-1) sends a 5G ProSe UE-to-UE Relay Discovery Solicitation message. The 5G ProSe UE-to-UE Relay Discovery Solicitation message contains the Type of Discovery Message, RSC and the Direct Discovery set which includes the User Info IDs of the discoverer 5G ProSe End UE (UE-1) and the discoveree 5G ProSe End UE (UE-2). The 5G ProSe UE-to-UE Relay Discovery Solicitation message is sent using the Source Layer-2 ID and Destination Layer-2 ID as described in clause 5.8.4.

A 5G ProSe UE-to-UE Relay determines the Destination Layer-2 ID for signalling reception as specified in clause 5.1.

The discoverer 5G ProSe End UE may include an Announce Prohibited Indication in the UE-to-UE Relay Discovery Solicitation message. If a 5G ProSe UE-to-UE Relay receives a Relay Discovery Solicitation message with an Announce Prohibited Indication it does not consider the 5G ProSe End UE as discovered during this procedure for inclusion in 5G ProSe UE-to-UE Relay Discovery with Model A, see clause 6.3.2.4.2, step 1.

2. If the RSC contained in the solicitation message matches any of the (pre)configured RSC(s), as specified in clause 5.1.5.1, of a 5G ProSe UE-to-UE Relay, the 5G ProSe UE-to-UE Relay sends a 5G ProSe UE-to-UE Relay Discovery Solicitation message. The 5G ProSe UE-to-UE Relay Discovery Solicitation message contains the Type of Discovery Message, the Direct Discovery set which includes the User Info IDs of the discoverer 5G ProSe End UE (UE-1) and the discoveree 5G ProSe End UE (UE-2), User Info ID of UE-to-UE Relay, RSC. 5G ProSe UE-to-UE Relay Discovery Solicitation message is sent using the Source Layer-2 ID and Destination Layer-2 ID as described in clause 5.8.4.

A 5G ProSe End UE determines the Destination Layer-2 ID for signalling reception as specified in clause 5.1.

The 5G ProSe UE-to-UE Relay self-selects the Source Layer-2 ID as specified in clause 5.8.4.2.

3. If the RSC contained in the solicitation message matches any of the (pre)configured RSC(s), as specified in clause 5.1.5.1, of the discoveree 5G ProSe End UE (UE-2), and the discoveree 5G ProSe End UE (UE-2) matches the User Info ID of the discoveree 5G ProSe End UE (UE-2) contained in the solicitation message, then the discoveree 5G ProSe End UE (UE-2) responds to the 5G ProSe UE-to-UE Relay with a 5G ProSe UE-to-UE Relay Discovery Response message. The 5G ProSe UE-to-UE Relay Discovery Response message contains the Type of Discovery Message, RSC, the Direct Discovery set which includes the User Info ID of the discoverer 5G ProSe End UE (UE-1) and User Info ID of discoveree 5G ProSe End UE (UE-2). The 5G ProSe UE-to-UE Relay Discovery Response message is sent using the Source Layer-2 ID and Destination Layer-2 ID as described in clause 5.8.4. If the discoveree 5G ProSe End UE (UE-2) receives multiple UE-to-UE Relay Discovery Solicitation messages from different 5G ProSe UE-to-UE Relays with the same RSC and the User Info ID of the discoveree 5G ProSe End UE (UE-2), it may choose to respond or not to a 5G ProSe UE-to-UE Relay (e.g. based on the PC5 signal strength of each message received).

The discoveree 5G ProSe End UE may include an Announce Prohibited Indication in the UE-to-UE Relay Discovery Response message. If a 5G ProSe UE-to-UE Relay receives a Relay Discovery Response message with an Announce Prohibited Indication it does not consider the 5G ProSe End UE as discovered during this procedure for inclusion in 5G ProSe UE-to-UE Relay Discovery with Model A, see clause 6.3.2.4.2, step 1.

4. The 5G ProSe UE-to-UE Relay sends a 5G ProSe UE-to-UE Relay Discovery Response message. The 5G ProSe UE-to-UE Relay Discovery Response message contains the Type of Discovery Message, User Info ID of UE-to-UE Relay, RSC, User Info ID of the discoverer 5G ProSe End UE (UE-1) and User Info ID of the discoveree 5G ProSe End UE (UE-2). The 5G ProSe UE-to-UE Relay Discovery Response message is sent using the Source Layer-2 ID and Destination Layer-2 ID as described in clause 5.8.4.

6.3.2.4.4 Candidate 5G ProSe UE-to-UE Relay Discovery

This procedure for candidate 5G ProSe UE-to-UE Relay Discovery to support the negotiated Relay reselection as described in clause 6.7.4 when the discoverer End UE discovers a candidate 5G ProSe UE-to-UE Relay.

The procedure for 5G ProSe UE-to-UE Relay Discovery with Model B (see clause 6.3.2.4.3) is used with the following differences:

Step 1: In the 5G ProSe UE-to-UE Relay Discovery Solicitation message the RSC and the User Info ID of a candidate 5G ProSe UE-to-UE Relay are included in the UE-to-UE Relay Discovery set and the Direct Discovery set is not included. If the 5G ProSe End UE receives the Layer-2 ID of the candidate 5G ProSe UE-to-UE Relay in a Link Modification Request message, it may set the Layer-2 ID of the candidate 5G ProSe UE-to-UE Relay as the Destination Layer-2 ID.

NOTE: The User Info ID of the candidate 5G ProSe UE-to-UE Relay and the User Info ID of the discoveree 5G ProSe End UE can be distinguished by the 5G ProSe UE-to-UE Relay as different IEs in the message.

Step 2 and step 3 are skipped because Direct Discovery set is absent, and the User Info ID of the candidate 5G ProSe UE-to-UE Relay in the received 5G ProSe UE-to-UE Relay Discovery Solicitation message matches that of the 5G ProSe UE-to-UE Relay.

Step 4: If a 5G ProSe UE-to-UE Relay matches the User Info ID of a candidate 5G ProSe UE-to-UE Relay received in the 5G ProSe UE-to-UE Relay Discovery Solicitation then it sends the 5G ProSe UE-to-UE Relay Discovery Response (with the RSC received in step 1) and does not include the Direct Discovery set.

6.7.1.1 Layer-2 Link Establishment for PC5 Communication Via 5G ProSe Layer-3 UE-to-UE Relay FIG. 6.7.1.1-1 shows the procedure for Layer-2 link establishment via 5G ProSe Layer-3 UE-to-UE Relay.

Figure 7:
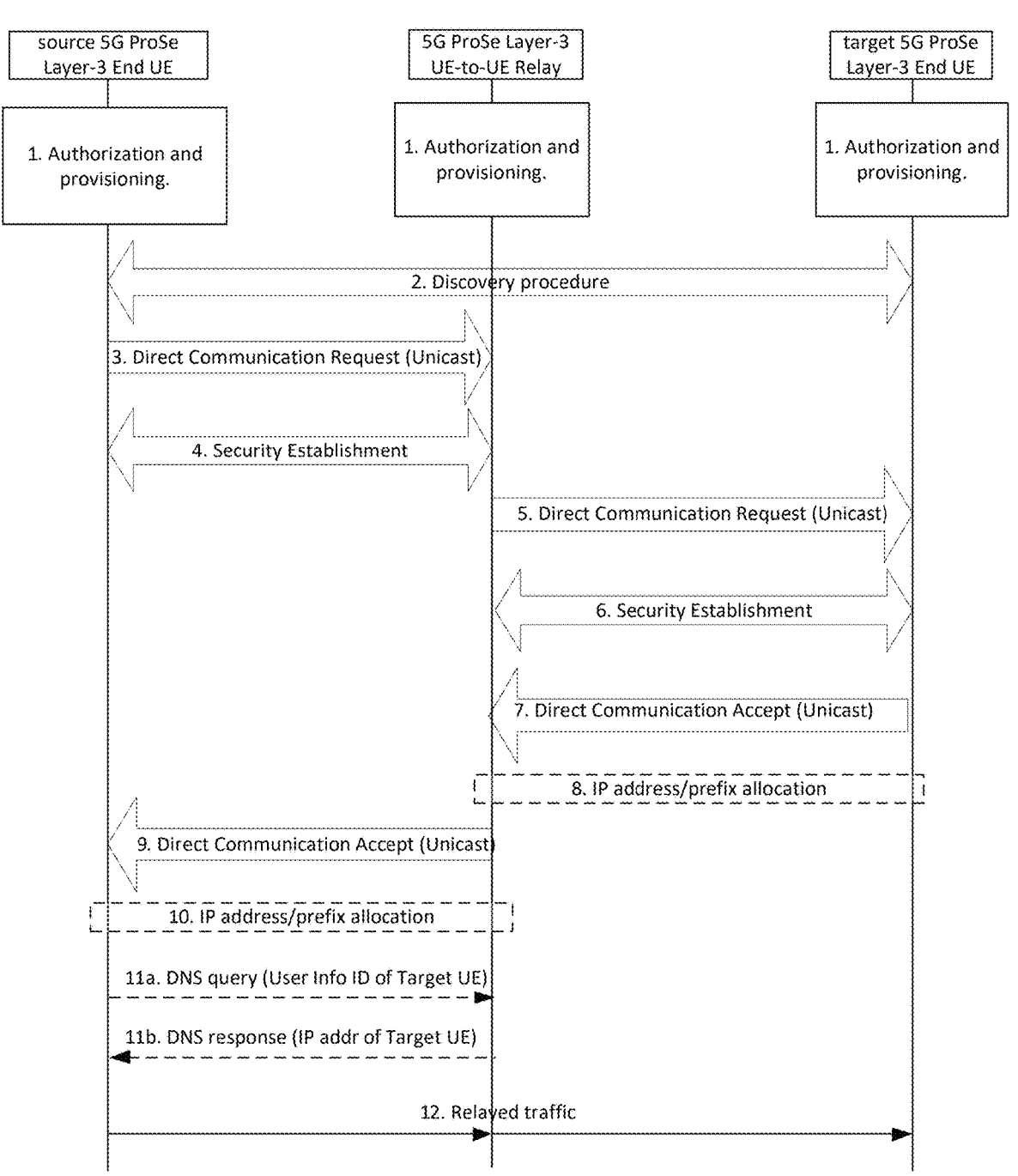
FIG. 7 is a reproduction of FIG. 6.7.1.1-1: Layer-2 link establishment via 5G ProSe Layer-3 UE-to-UE Relay, from 3GPP TS 23.304 v18.5.1.

FIG. 7 is a Reproduction of FIG. 6.7.1.1-1: Layer-2 Link Establishment Via 5G ProSe Layer-3 UE-to-UE Relay, from 3GPP TS 23.304 v18.5.1.

1. Service authorization and provisioning are performed for source 5G ProSe Layer-3 End UE, target 5G ProSe Layer-3 End UE and 5G ProSe Layer-3 UE-to-UE Relay as described in clause 6.2.

2. The source 5G ProSe Layer-3 End UE performs discovery of a 5G ProSe Layer-3 UE-to-UE Relay as described in clause 6.3.2.4.

3. The source 5G ProSe Layer-3 End UE sends a Direct Communication Request message to initiate the unicast Layer-2 link establishment procedure with the 5G ProSe Layer-3 UE-to-UE Relay. The parameters included in the Direct Communication Request message are described in clause 6.4.3.7.

The Source Layer-2 ID of the Direct Communication Request message is self-assigned by the source 5G ProSe Layer-3 End UE and the Destination Layer-2 ID is set to the Source Layer-2 ID of the discovery message of the 5G ProSe Layer-3 UE-to-UE Relay.

The source 5G ProSe Layer-3 End UE gets application information and optional ProSe Application Requirements from ProSe application layer, and determines the end-to-end QoS parameters as described in clause 5.6.3.1.

4. If the User Info ID of 5G ProSe Layer-3 UE-to-UE Relay in the Direct Communication Request message matches the 5G ProSe UE-to-UE Relay's User Info ID and the RSC in the Direct Communication Request matches one RSC that the relay is (pre)configured with, as specified in clause 5.1.5.1, the 5G ProSe Layer-3 UE-to-UE Relay responds by establishing the security with the source 5G ProSe Layer-3 End UE. When the security protection is enabled, the source 5G ProSe Layer-3 End UE sends the parameters as described in clause 6.4.3.7 to the 5G ProSe Layer-3 UE-to-UE Relay.

If the Ethernet MAC address of source 5G ProSe Layer-3 End UE is already used by another 5G ProSe Layer-3 End UE, then the 5G ProSe Layer-3 UE-to-UE Relay rejects the direct link establishment indicating that the MAC address is not unique.

The Source Layer-2 ID used for the security establishment procedure is self-assigned by the 5G ProSe Layer-3 UE-to-UE Relay and the Destination Layer-2 ID is set to the Source Layer-2 ID of the received Direct Communication Request message.

The 5G ProSe Layer-3 UE-to-UE Relay shall choose different Source Layer-2 IDs for PC5 links of different types of traffic, i.e., IP traffic, Ethernet traffic and Unstructured traffic.

If the PC5 link is used for transferring Unstructured traffic, the 5G ProSe Layer-3 UE-to-UE Relay shall choose different Source Layer-2 IDs for different pair of source and target 5G ProSe Layer-3 End UEs.

Upon receiving the security establishment procedure messages, the source 5G ProSe Layer-3 End UE obtains the 5G ProSe Layer-3 UE-to-UE Relay's Layer-2 ID for future communication, for signalling and data traffic for this unicast link.

5. After the Security Establishment procedure in step 4 is completed, the 5G ProSe Layer-3 UE-to-UE Relay decides whether to use an existing unicast Layer-2 link between itself and the target 5G ProSe End UE for the required service. If there is no existing unicast Layer-2 link of the required RSC with the target 5G ProSe Layer-3 End UE, the 5G ProSe Layer-3 UE-to-UE Relay sends a Direct Communication Request message to initiate the unicast Layer-2 link establishment procedure with the target 5G ProSe Layer-3 End UE. The parameters included in the Direct Communication Request message are described in clause 6.4.3.7.

The Source Layer-2 ID of the Direct Communication Request message is self-assigned by the 5G ProSe Layer-3 UE-to-UE Relay and the Destination Layer-2 ID may be broadcast or unicast Layer-2 ID. Unicast Layer-2 ID is used only if the Layer-2 ID of the target 5G ProSe Layer-3 End UE associated with the User Info ID is known to the 5G ProSe Layer-3 UE-to-UE Relay.

The 5G ProSe Layer-3 UE-to-UE Relay shall choose different Source Layer-2 IDs for PC5 links of different types of traffic, i.e., IP traffic, Ethernet traffic and Unstructured traffic.

If the PC5 link is used for transferring Unstructured traffic, the 5G ProSe Layer-3 UE-to-UE Relay shall choose different Source Layer-2 IDs for different pair of source and target 5G ProSe Layer-3 End UEs.

6. If the User Info ID of target 5G ProSe Layer-3 End UE and RSC included in the Direct Communication Request match the target UE's User Info ID and the RSC that the target UE is (pre)configured with as specified in clause 5.1.5.1, the target 5G ProSe Layer-3 End UE responds by establishing the security with the 5G ProSe Layer-3 UE-to-UE Relay. When the security protection is enabled, the 5G ProSe Layer-3 UE-to-UE Relay sends the parameters as described in clause 6.4.3.7 to the target 5G ProSe Layer-3 End UE.

The Source Layer-2 ID used for the security establishment procedure is self-assigned by the target 5G ProSe Layer-3 End UE and the Destination Layer-2 ID is set to the Source Layer-2 ID of the received Direct Communication Request message.

Upon receiving the security establishment procedure messages, the 5G ProSe Layer-3 UE-to-UE Relay obtains the target 5G ProSe Layer-3 End UE's Layer-2 ID for future communication, for signalling and data traffic for this unicast link.

7. The target 5G ProSe Layer-3 End UE sends a Direct Communication Accept message to the 5G ProSe Layer-3 UE-to-UE Relay that has successfully established security with. The parameters included in the Direct Communication Accept message are described in clause 6.4.3.7.

NOTE: The 5G ProSe Layer-3 UE-to-UE Relay can detect that the Ethernet MAC address of target 5G ProSe Layer-3 End UE is already used by another 5G ProSe Layer-3 End UE when it receives the Direct Communication Accept message.

8. For IP traffic, IPv6 prefix or IPv4 address is allocated for the target 5G ProSe Layer-3 End UE as defined in clause 5.5.1.4.

9. After receiving the Direct Communication Accept message from the target 5G ProSe Layer-3 End UE, the 5G ProSe Layer-3 UE-to-UE Relay sends a Direct Communication Accept message to the source 5G ProSe Layer-3 End UE that has successfully established security with. The parameters included in the Direct Communication Accept message are described in clause 6.4.3.7.

10. For IP traffic, IPv6 prefix or IPv4 address is allocated for the source 5G ProSe Layer-3 End UE as defined in clause 5.5.1.4.

11. For IP communication, the 5G ProSe Layer-3 UE-to-UE Relay may store an association of User Info ID and the IP address of target 5G ProSe Layer-3 End UE into its DNS entries and the 5G ProSe Layer-3 UE-to-UE Relay may act as a DNS server to other UEs. The source 5G ProSe Layer-3 End UE may send a DNS query to the 5G ProSe Layer-3 UE-to-UE Relay to request IP address of target 5G ProSe Layer-3 End UE after step 10 if the IP address of target 5G ProSe Layer-3 End UE is not received in step 9 and the 5G ProSe Layer-3 UE-to-UE Relay returns the IP address of the target 5G ProSe Layer-3 End UE to the source 5G ProSe Layer-3 End UE.

For Ethernet communication, the 5G ProSe Layer-3 UE-to-UE Relay maintains the association between PC5 links and Ethernet MAC addresses received from the 5G ProSe Layer-3 End UE.

For Unstructured traffic communication, for each pair of source and target 5G ProSe Layer-3 End UEs, the 5G ProSe Layer-3 UE-to-UE Relay maintains the 1:1 mapping between the PC5 link with source 5G ProSe Layer-3 End UE and the PC5 link with target 5G ProSe Layer-3 End UE.

12. The source 5G ProSe Layer-3 End UE communicates with the target 5G ProSe Layer-3 End UE via the 5G ProSe Layer-3 UE-to-UE Relay.

6.7.2 5G ProSe Communication via 5G ProSe Layer-2 UE-to-UE Relay

This procedure applies to 5G ProSe Layer-2 UE-to-UE Relay.

Figure 8:
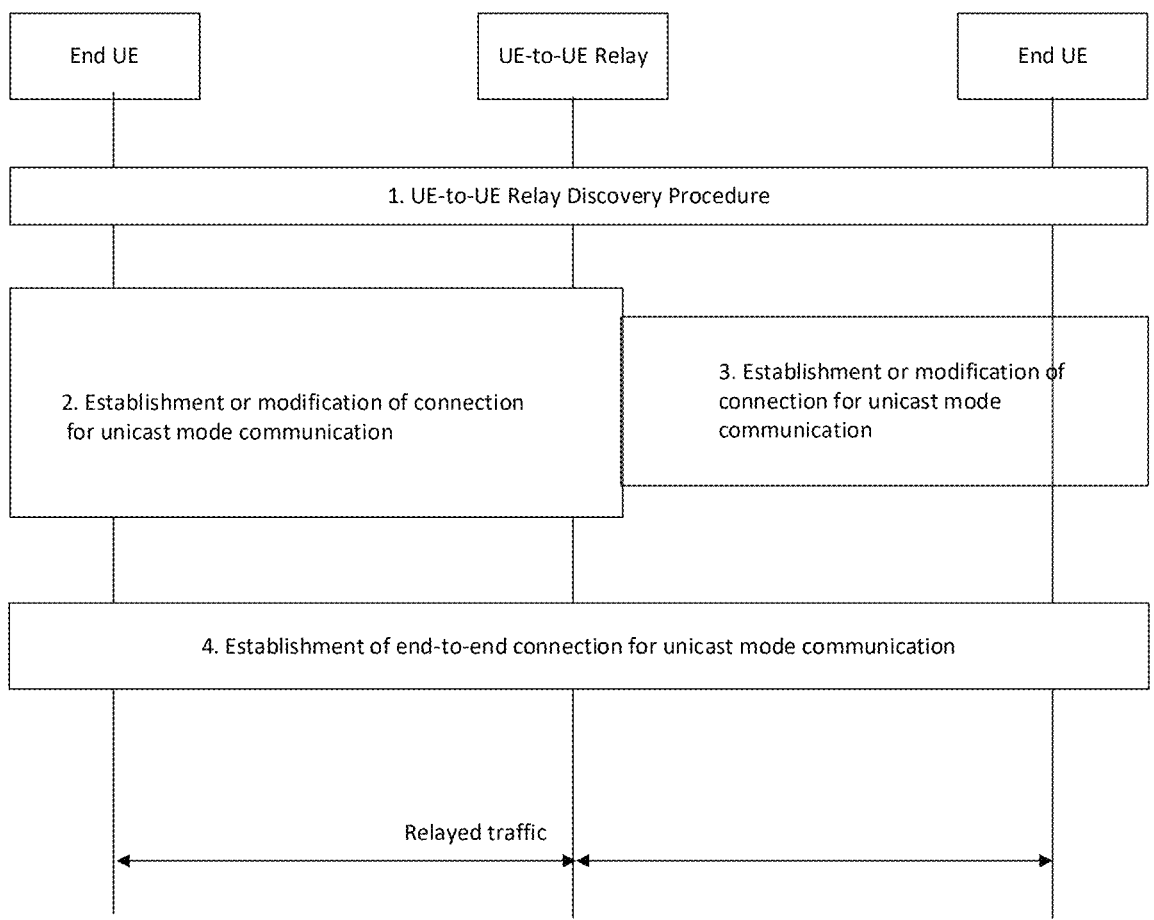
FIG. 8 is a reproduction of FIG. 6.7.2-1: 5G ProSe Communication via 5G ProSe Layer-2 UE-to-UE Relay, from 3GPP TS 23.304 v18.5.1.

FIG. 8 is a reproduction of FIG. 6.7.2-1: 5G ProSe Communication via 5G ProSe Layer-2 UE-to-UE Relay, from 3GPP TS 23.304 v18.5.1.

Service authorization and provisioning has been performed for the 5G ProSe Layer-2 UE-to-UE Relay and the 5G ProSe End UEs as described in clause 6.2 before this procedure.

1. Model A or Model B 5G ProSe UE-to-UE Relay Discovery as described in clause 6.3.2.4 is performed and a source 5G ProSe End UE selects a suitable 5G ProSe Layer-2 UE-to-UE Relay for the communication with a target 5G ProSe End UE.

2. The source 5G ProSe End UE decides whether to use an existing PC5 link with the 5G ProSe UE-to-UE Relay for the required service. If an existing PC5 link is used then the Layer-2 link modification procedure as specified in clause 6.4.3.7 is used towards a 5G ProSe UE-to-UE Relay, otherwise a Layer-2 link establishment procedure is used towards a 5G ProSe UE-to-UE Relay.

This procedure is towards the selected 5G ProSe UE-to-UE Relay and for Layer-2 link establishment, the security establishment is performed before step 3 is initiated.

3. The 5G ProSe Layer-2 UE-to-UE Relay decides whether to use an existing PC5 link between the 5G ProSe UE-to-UE Relay and the target 5G ProSe End UE for the required service and initiates Layer-2 link establishment procedure or Layer-2 link modification procedure as specified in clause 6.4.3.7 with the target 5G ProSe End UE.

If the Layer-2 link establishment procedure is performed towards the target 5G ProSe End UE then either a broadcast or a unicast Layer-2 ID is used as the Destination Layer-2 ID. A Unicast Layer-2 ID is used if the Layer-2 ID of the target 5G ProSe Layer-2 End UE associated with the User Info ID of target 5G ProSe Layer-2 End UE is known to the 5G ProSe Layer-2 UE-to-UE Relay.

If the Layer-2 link modification procedure is performed towards the target 5G ProSe End UE, it uses the unicast Layer-2 ID of target 5G ProSe End UE as the Destination Layer-2 ID.

The 5G ProSe Layer-2 UE-to-UE Relay sends a Direct Communication Accept message or Link Modification Accept message to the source 5G ProSe End UE after step 3 is completed.

4. The source 5G ProSe End UE establishes an end-to-end connection for unicast mode communication with the target 5G ProSe End UE as described in clause 6.4.3.7.

The data and End-to-End PC5-S signalling are transferred between the source 5G ProSe End UE and the target 5G ProSe End UE via the 5G ProSe Layer-2 UE-to-UE Relay. The 5G ProSe Layer-2 UE-to-UE Relay forwards all the data traffic and End-to-End PC5-S signalling between the source 5G ProSe End UE and the target 5G ProSe End UE, as specified in TS 38.300 [12].

6.7.4 5G ProSe UE-to-UE Relay Reselection 6.7.4.1 General

After being connected to the 5G ProSe UE-to-UE Relay, the 5G ProSe End UEs may trigger the 5G ProSe UE-to-UE Relay reselection based on conditions (e.g. the measured signal strength of PC5 unicast link with the 5G ProSe UE-to-UE Relay) as specified in TS 38.300 [12].

For 5G ProSe UE-to-UE Relay reselection, a 5G ProSe UE-to-UE Relay may be discovered by either the discovery procedures defined in clause 6.3.2.4 or by the negotiated 5G ProSe UE-to-UE Relay reselection procedure defined in clause 6.7.4.2 or clause 6.7.4.3.

In the negotiated UE-to-UE Relay reselection defined in clause 6.7.4.2 or clause 6.7.4.3, one 5G ProSe End UE initiates the UE-to-UE Relay reselection procedure, the 5G ProSe End UEs can negotiate a new 5G ProSe UE-to-UE Relay using the existing connection and to establish the communication via the reselected 5G ProSe UE-to-UE Relay prior to releasing the communication via the current 5G ProSe UE-to-UE Relay.

6.7.4.2 Negotiated 5G ProSe Layer-2 UE-to-UE Relay Reselection

Depicted in FIG. 6.7.4.2-1 is the procedure for the negotiated 5G ProSe Layer-2 UE-to-UE Relay reselection.

Figure 9:
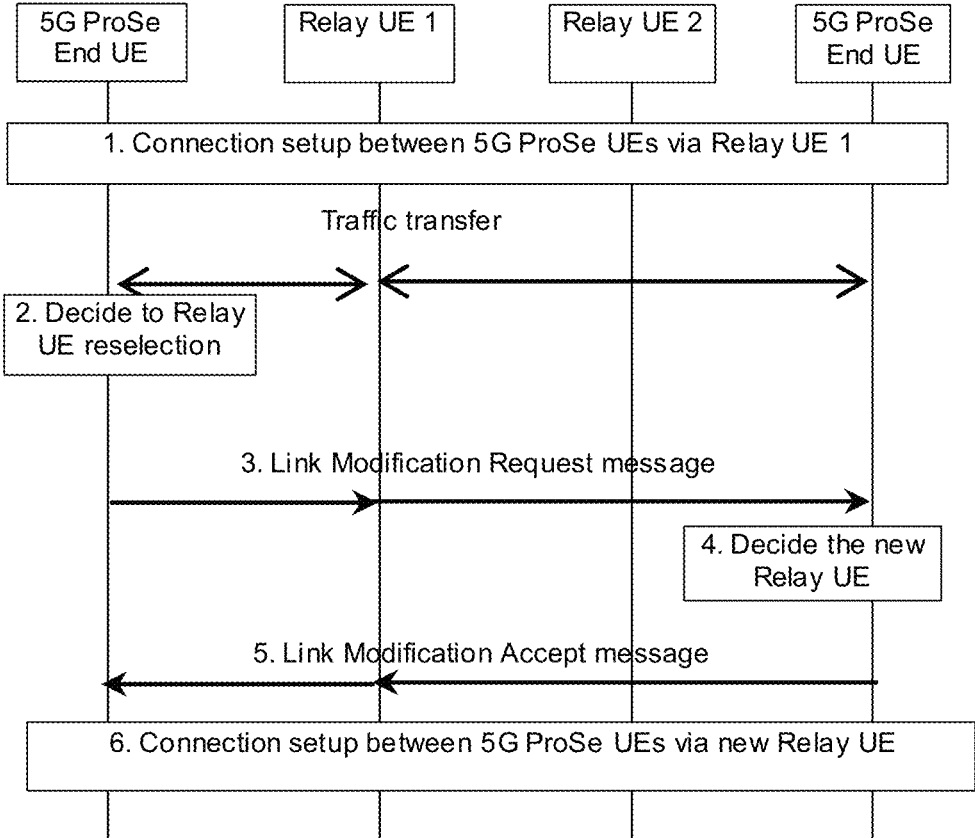
FIG. 9 is a reproduction of FIG. 6.7.4.2-1: Negotiated 5G ProSe Layer-2 UE-to-UE Relay reselection, from 3GPP TS 23.304 v18.5.1.

FIG. 9 is a Reproduction of FIG. 6.7.4.2-1: Negotiated 5G ProSe Layer-2 UE-to-UE Relay Reselection, from 3GPP TS 23.304 v18.5.1.

1. A PC5 unicast link is established between the 5G ProSe End UEs via a 5G ProSe UE-to-UE Relay, based on the procedure defined in clause 6.7.2.

2. The initiating 5G ProSe End UE determines, e.g. based on PC5 signal strength, to perform UE-to-UE Relay reselection and obtains a list of candidate UE-to-UE Relays per RSC. The initiating 5G ProSe End UE may receive UE-to-UE Relay Discovery Announcement messages from 5G ProSe UE-to-UE Relays or initiate the 5G ProSe UE-to-UE Relay discovery procedures to find the candidate 5G ProSe UE-to-UE Relays. The initiating 5G ProSe End UE determines the candidate 5G ProSe UE-to-UE Relays e.g., based on the PC5 signal strength of the received UE-to-UE Relay Discovery Announcement message, RSC within the UE-to-UE Relay Discovery Announcement message. The candidate 5G ProSe UE-to-UE Relays support the same RSC which is associated with the PC5 unicast link between the initiating 5G ProSe End UE and the 5G ProSe UE-to-UE Relay.

3. The initiating 5G ProSe End UE sends a Link Modification Request message to the responding 5G ProSe End UE which includes a Relay re-selection indication, the User Info ID(s) of the candidate 5G ProSe UE-to-UE Relay(s) and optionally the Layer-2 ID(s) of the candidate 5G ProSe UE-to-UE Relay(s) and security information.

4. The responding 5G ProSe End UE selects a new 5G ProSe UE-to-UE Relay from the candidate 5G ProSe UE-to-UE Relays per RSC, based on the Relay re-selection indication in the Link Modification Request message. If the responding 5G ProSe End UE has not received a UE-to-UE Relay Discovery Announcement message from a candidate 5G ProSe UE-to-UE Relay (e.g. during a previous 5G ProSe UE-to-UE Relay Discovery procedure) or does not have a PC5 connection with the candidate 5G ProSe UE-to-UE Relay associated with the same RSC, then the responding 5G ProSe End UE may perform the Candidate 5G ProSe UE-to-UE Relay Discovery procedure defined in clause 6.3.2.4.4. The responding 5G ProSe End UE sets the candidate relay User Info ID to that of a candidate 5G ProSe UE-to-UE Relay in the discovery message and may set the Layer-2 ID of the candidate 5G ProSe UE-to-UE Relay, if received at step 3, as the Destination Layer-2 ID to carry the discovery message. The PC5 signal strength of the UE-to-UE Relay Discovery Announcement message or UE-to-UE Relay Discovery Response message may be used to select the new 5G ProSe UE-to-UE Relay.

5. The responding 5G ProSe End UE sends a Link Modification Accept message to the initiating 5G ProSe End UE, including the User Info ID of the new 5G ProSe UE-to-UE Relay and security information.

6. 5G ProSe End UEs set up PC5 unicast links, if not already set up, with the new 5G ProSe UE-to-UE Relay, by reusing the procedure defined in clause 6.7.2 and the PC5 unicast is link established between 5G ProSe End UEs via the new 5G ProSe UE-to-UE Relay. The 5G ProSe End UEs switch the data traffic via the new 5G ProSe UE-to-UE Relay. The security information is used to verify that the new link has been set up successfully.

6.7.4.3 Negotiated 5G ProSe Layer-3 UE-to-UE Relay Reselection

Depicted in FIG. 6.7.4.3-1 is the procedure for the negotiated 5G ProSe Layer-3 UE-to-UE Relay reselection.

15

Figure 10:
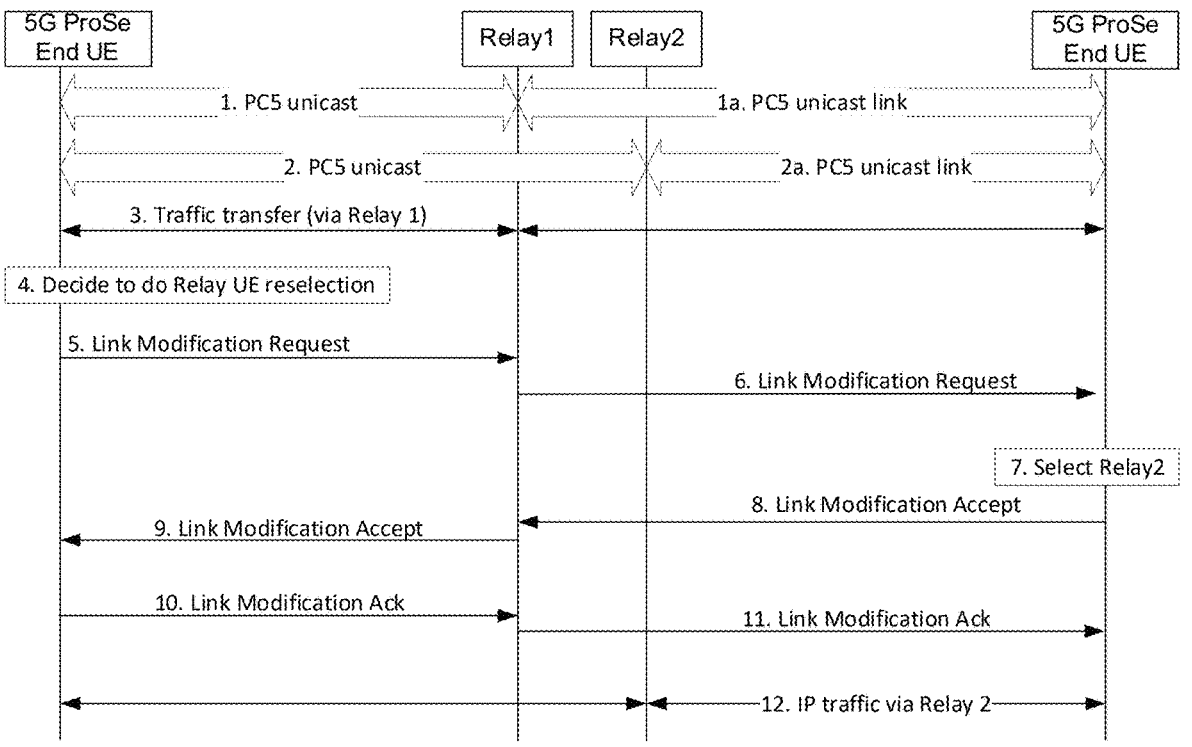
FIG. 10 is a reproduction of FIG. 6.7.4.3-1: Negotiated 5G ProSe Layer-3 UE-to-UE Relay reselection, from 3GPP TS 23.304 v18.5.1.

FIG. 10 is a Reproduction of FIG. 6.7.4.3-1: Negotiated 5G ProSe Layer-3 UE-to-UE Relay Reselection, from 3GPP TS 23.304 v18.5.1.

1. 5G ProSe End UEs have set up PC5 unicast links with a 5G ProSe UE-to-UE Relay, based on the procedure defined in clause 6.7.1.
2. The 5G ProSe End UEs have additionally set up PC5 unicast links with a 5G ProSe UE-to-UE Relay, based on the procedure defined in clause 6.7.1.
3. The 5G ProSe End UEs are transferring traffic via the 5G ProSe UE-to-UE Relay.
4. The initiating 5G ProSe End UE determines, e.g. based on PC5 signal strength, to perform UE-to-UE Relay reselection and obtains a list of candidate UE-to-UE Relays per RSC. The initiating 5G ProSe End UE may receive UE-to-UE Relay Discovery Announcement messages from 5G ProSe UE-to-UE Relays or initiate the 5G ProSe UE-to-UE Relay discovery procedures to find the candidate 5G ProSe UE-to-UE Relays. The initiating 5G ProSe End UE determines the candidate 5G ProSe UE-to-UE Relays e.g., based on the PC5 signal strength of the received UE-to-UE Relay Discovery Announcement message, RSC within the UE-to-UE Relay Discovery Announcement message. The candidate 5G ProSe UE-to-UE Relays support the same RSC which is associated with the PC5 unicast link between the initiating 5G ProSe End UE and the 5G ProSe UE-to-UE Relay.
5. The initiating 5G ProSe End UE sends a Link Modification Request message to the responding 5G ProSe UE-to-UE Relay, which includes a Relay re-selection indication, the User Info ID(s) of the candidate 5G ProSe UE-to-UE Relay(s), the IP addresses of the responding 5G ProSe End UEs and optionally the Layer-2 ID(s) of the candidate 5G ProSe UE-to-UE Relay(s).
   Multiple 5G ProSe End UEs IP addresses may be included when the initiating 5G ProSe End UE is communicating with multiple 5G ProSe End UEs via the 5G ProSe UE-to-UE Relay.
6. 5G ProSe UE-to-UE Relay determines the responding 5G ProSe End UE based on the IP address received from the initiating 5G ProSe End UE and sends a Link Modification Request message to the responding 5G ProSe End UE. The Link Modification Request message includes a Relay re-selection indication, User Info ID(s) of the candidate 5G ProSe UE-to-UE Relay(s), IP address of the initiating 5G ProSe End UE and optionally the Layer-2 ID(s) of the candidate 5G ProSe UE-to-UE Relay(s).
   If multiple 5G ProSe End UEs are specified in the Link Modification Request message received from the initiating 5G ProSe End UE, the 5G ProSe UE-to-UE Relay sends a PC5 Link Modification Request to each of the 5G ProSe End UEs.
7. The responding 5G ProSe End UE selects a new 5G ProSe UE-to-UE Relay from the candidate 5G ProSe UE-to-UE Relays per RSC, based on the Relay re-selection indication in the Link Modification Request message. If the responding 5G ProSe End UE has not received a UE-to-UE Relay Discovery Announcement message from a candidate 5G ProSe UE-to-UE Relay (e.g. during a previous 5G ProSe UE-to-UE Relay Discovery procedure) or does not have a PC5 connection with the candidate 5G ProSe UE-to-UE Relay associated with the same RSC, then the responding 5G ProSe End UE may perform the Candidate 5G ProSe UE-to-UE Relay Discovery procedure defined in clause 6.3.2.4.4. The responding 5G ProSe End UE sets the candidate relay User Info ID to that of a candidate 5G ProSe UE-to-UE Relay in the discovery message and may set the Layer-2 ID of the candidate 5G ProSe UE-to-UE Relay, if received at step 6, as the Destination Layer-2 ID to carry the discovery message. The responding 5G ProSe End UE may initiate the procedure to set up PC5 unicast links with the new 5G ProSe UE-to-UE Relay, by reusing the procedure defined in clause 6.7.1. The PC5 signal strength of the UE-to-UE Relay Discovery Announcement message or UE-to-UE Relay Discovery Response message may be used to select the new 5G ProSe UE-to-UE Relay.

8. The responding 5G ProSe End UE sends a Link Modification Accept message to the 5G ProSe UE-to-UE Relay, including the User Info ID of the new 5G ProSe UE-to-UE Relay, IP address of the initiating 5G ProSe End UE, IP address of the responding 5G ProSe End UE for communication via the newly selected 5G ProSe UE-to-UE Relay and Relay re-selection indication.
9. 5G ProSe UE-to-UE Relay sends a Link Modification Accept message to the initiating 5G ProSe End UE, including the User Info ID of the new 5G ProSe UE-to-UE Relay, IP address of the responding 5G ProSe End UE, IP address of the responding 5G ProSe End UE for communication via the newly selected 5G ProSe UE-to-UE Relay and Relay re-selection indication.
10-11. Link Modification Ack is sent from the initiating 5G ProSe End UE to the responding the 5G ProSe End UE via the 5G ProSE UE-to-UE Relay, including the IP address of the initiating 5G ProSe End UE for communication via the newly selected 5G ProSe UE-to-UE Relay, the IP address of the responding 5G ProSe End UE and Relay re-selection indication.
12. The 5G ProSe End UEs transfer traffic via the newly selected 5G ProSe UE-to-UE Relay.

Quotation Start
   3GPP TS 24.554 [TS24.554]([2][TS24.554]3GPP TS 24.554 v18.4.0) specifies procedures related to UE-to-UE Relay in Release 18 as quoted below:
Quotation Start
7.2.3 5G ProSe Direct Link Modification Procedure
7.2.3.1 General
   The purpose of the 5G ProSe direct link modification procedure is to modify the existing ProSe direct link to:
   a) add new PC5 QoS flow(s) to the existing 5G ProSe direct link;
   b) modify existing PC5 QoS flow(s) for updating PC5 QoS parameters of the existing PC5 QoS flow(s);
   c) modify existing PC5 QoS flow(s) for associating new ProSe application(s) with the existing PC5 QoS flow (s);
   d) modify existing PC5 QoS flow(s) for removing the associated ProSe application(s) from the existing PC5 QoS flow(s);
   e) remove existing PC5 QoS flow(s) from the existing 5G ProSe direct link;
   f) negotiate a new 5G ProSe UE-to-UE relay UE over the existing 5G ProSe direct link;
   g) establish 5G ProSe UE-to-UE relay communication with additional 5G ProSe layer-3 end UE(s) using the existing 5G ProSe direct link between the 5G ProSe layer-3 end UE and 5G ProSe layer-3 UE-to-UE relay UE;

h) release 5G ProSe UE-to-UE relay communication with one of the peer 5G ProSe layer-3 end UEs using the shared 5G ProSe direct link between the 5G ProSe layer-3 end UE and 5G ProSe layer-3 UE-to-UE relay UE; or i) establish 5G ProSe UE-to-UE relay communication with additional 5G ProSe layer-2 end UE(s) using the existing 5G ProSe direct link between the 5G ProSe layer-2 end UE and 5G ProSe layer-2 UE-to-UE relay UE.

In this procedure, the UE sending the PROSE DIRECT LINK MODIFICATION REQUEST message is called the "initiating UE" and the other UE is called the "target UE".

7.2.3.2 5G ProSe Direct Link Modification Procedure Initiated by Initiating UE

The initiating UE shall meet the following pre-conditions before initiating this procedure for adding a new ProSe application to the existing 5G ProSe direct link:

a) there is a 5G ProSe direct link between the initiating UE and the target UE;

b) the pair of application layer IDs and the network layer protocol of this 5G ProSe direct link are identical to those required by the application layer in the initiating UE for this ProSe application;

c) the security policy corresponding to the ProSe identifier is aligned with the security policy of the existing 5G ProSe direct link;

d) the timer T5091 is not running; and e) the initiating UE is not performing the 5G ProSe direct link re-keying procedure initiated by the target UE.

The initiating UE shall meet the following pre-conditions before initiating this procedure for negotiating a new 5G ProSe UE-to-UE relay UE over the existing 5G ProSe direct link:

a) there is a 5G ProSe direct link between the initiating UE and the target UE;

b) the initiating UE is a source 5G ProSe end UE communicating with the target 5G ProSe end UE via a 5G ProSe UE-to-UE relay UE;

c) the initiating UE determines, e.g., based on PC5 signal strength, to perform UE-to-UE relay reselection; and d) the initiating UE obtains a list of candidate UE-to-UE relays via UE-to-UE discovery procedure.

The initiating UE shall meet the following pre-conditions before initiating this procedure for establishing 5G ProSe UE-to-UE relay communication with an additional 5G ProSe layer-3 end UE over the existing 5G ProSe direct link:

a) there is a 5G ProSe direct link between the initiating UE and the target UE;

b) the initiating UE acts as a 5G ProSe layer-3 end UE and the target UE acts as a 5G ProSe layer-3 UE-to-UE relay UE, or vice versa;

c) the initiating UE, if acting as a 5G ProSe layer-3 end UE, determines to communicate with an additional 5G ProSe layer-3 end UE using the same RSC as that of the existing 5G ProSe direct link; and d) the initiating UE, if acting as a 5G ProSe layer-3 UE-to-UE relay UE, receives a request from another 5G ProSe layer-3 end UE to communicate with the target UE using the same RSC as that of the existing 5G ProSe direct link.

After receiving the service data or request from the upper layers, the initiating UE shall perform the PC5 QoS flow match as specified in clause 7.2.8. If there is no matched PC5 QoS flow, the initiating UE shall derive the PC5 QoS parameters and assign the PQFI(s) for the PC5 QoS flows(s) to be established as specified in clause 7.2.7.

If the 5G ProSe direct link modification procedure is to add new PC5 QoS flow(s) to the existing 5G ProSe direct link, the initiating UE shall create a PROSE DIRECT LINK MODIFICATION REQUEST message. In this message, initiating UE:

a) shall include the PQFI(s), the corresponding PC5 QoS parameters and optionally the ProSe identifier(s);

b) shall include the link modification operation code set to "Add new PC5 QoS flow(s) to the existing 5G ProSe direct link";

c) may include the PC5 QoS rule(s) to indicate the packet filters of the PC5 QoS flow(s);

d) shall include the source end UE info set to the user info of the source 5G ProSe layer-3 end UE, if the UE acts as a 5G ProSe layer-3 UE-to-UE relay UE, the 5G ProSe direct link is between the 5G ProSe layer-3 UE-to-UE relay UE and the target 5G ProSe layer-3 end UE, and multiple source 5G ProSe layer-3 end UEs have established direct communication with the target 5G ProSe layer-3 end UE via the 5G ProSe layer-3 UE-to-UE relay UE using the same 5G ProSe direct link;

e) may include the source end UE info set to the user info of the source 5G ProSe end UE, if the UE acts as a 5G ProSe UE-to-UE relay UE, the 5G ProSe direct link is between the 5G ProSe UE-to-UE relay UE and the target 5G ProSe end UE, and only one source 5G ProSe end UE has established direct communication with the target 5G ProSe end UE via the 5G ProSe UE-to-UE relay UE using the 5G ProSe direct link;

f) shall include the target end UE info set to the user info of the target 5G ProSe layer-3 end UE, if the UE acts as a source 5G ProSe layer-3 end UE, the 5G ProSe direct link is between the source 5G ProSe layer-3 end UE and the 5G ProSe layer-3 UE-to-UE relay UE, and the source 5G ProSe layer-3 end UE has established direct communication with multiple target 5G ProSe layer-3 end UEs via the 5G ProSe layer-3 UE-to-UE relay UE using the same 5G ProSe direct link;

g) may include the target end UE info set to the user info of the target 5G ProSe end UE, if:

1) the UE acts as a source 5G ProSe end UE, the 5G ProSe direct link is between the source 5G ProSe end UE and the 5G ProSe UE-to-UE relay UE, and the source 5G ProSe end UE has established direct communication with only one target 5G ProSe end UE via the 5G ProSe UE-to-UE relay UE using the 5G ProSe direct link; or 2) the UE acts as a 5G ProSe UE-to-UE relay UE and the 5G ProSe direct link is between the 5G ProSe UE-to-UE relay UE and the target 5G ProSe end UE; and h) may include the target end UE layer-2 ID set to the layer-2 ID of the target 5G ProSe end UE, if the UE acts as a source 5G ProSe end UE and the 5G ProSe direct link is between the source 5G ProSe end UE and the 5G ProSe UE-to-UE relay UE.

If the 5G ProSe direct link modification procedure is to modify the PC5 QoS parameters for existing PC5 QoS flow(s) in the existing 5G ProSe direct link, the initiating UE shall create a PROSE DIRECT LINK MODIFICATION REQUEST message. In this message, the initiating UE:

a) shall include the PQFI(s) and the corresponding PC5 QoS parameters, including the ProSe identifier(s);

b) shall include the link modification operation code set to "Modify PC5 QoS parameters of the existing PC5 QoS flow(s)";

c) may include the PC5 QoS rule(s) to indicate the packet filters of the PC5 QoS flow(s);

d) shall include the source end UE info set to the user info of the source 5G ProSe layer-3 end UE, if the UE acts as a 5G ProSe layer-3 UE-to-UE relay UE, the 5G ProSe direct link is between the 5G ProSe layer-3 UE-to-UE relay UE and the target 5G ProSe layer-3 end UE, and multiple source 5G ProSe layer-3 end UEs have established direct communication with the target 5G ProSe layer-3 end UE via the 5G ProSe layer-3 UE-to-UE relay UE using the same 5G ProSe direct link;

e) may include the source end UE info set to the user info of the source 5G ProSe end UE, if the UE acts as a 5G ProSe UE-to-UE relay UE, the 5G ProSe direct link is between the 5G ProSe UE-to-UE relay UE and the target 5G ProSe end UE, and only one source 5G ProSe end UE has established direct communication with the target 5G ProSe end UE via the 5G ProSe UE-to-UE relay UE using the 5G ProSe direct link;

f) shall include the target end UE info set to the user info of the target 5G ProSe layer-3 end UE, if the UE acts as a source 5G ProSe layer-3 end UE, the 5G ProSe direct link is between the source 5G ProSe layer-3 end UE and the 5G ProSe layer-3 UE-to-UE relay UE, and the source 5G ProSe layer-3 end UE has established direct communication multiple target 5G ProSe layer-3 end UEs via the 5G ProSe layer-3 UE-to-UE relay UE using the same 5G ProSe direct link;

g) may include the target end UE info set to the user info of the target 5G ProSe end UE, if:
  1) the UE acts as a source 5G ProSe end UE, the 5G ProSe direct link is between the source 5G ProSe end UE and the 5G ProSe UE-to-UE relay UE, and the source 5G ProSe end UE has established direct communication with only one target 5G ProSe end UE via the 5G ProSe UE-to-UE relay UE using the 5G ProSe direct link; or
  2) the UE acts as a 5G ProSe UE-to-UE relay UE and the 5G ProSe direct link is between the 5G ProSe UE-to-UE relay UE and the target 5G ProSe end UE; and h) may include the target end UE layer-2 ID set to the destination layer-2 ID of the target 5G ProSe end UE, if the UE acts as a source 5G ProSe end UE and the 5G ProSe direct link is between the source 5G ProSe end UE and the 5G ProSe UE-to-UE relay UE.

If the 5G ProSe direct link modification procedure is to associate new ProSe application(s) with existing PC5 QoS flow(s), the initiating UE shall create a PROSE DIRECT LINK MODIFICATION REQUEST message. In this message, the initiating UE:

a) shall include the PQFI(s) and the corresponding PC5 QoS parameters, including the ProSe identifier(s);

b) shall include the link modification operation code set to "Associate new ProSe application(s) with existing PC5 QoS flow(s)";

c) may include the PC5 QoS rule(s) to indicate the packet filters of the PC5 QoS flow(s);

d) shall include the source end UE info set to the user info of the source 5G ProSe layer-3 end UE, if the UE acts as a 5G ProSe layer-3 UE-to-UE relay UE, the 5G ProSe direct link is between the 5G ProSe layer-3 UE-to-UE relay UE and the target 5G ProSe layer-3 end UE, and multiple source 5G ProSe layer-3 end UEs have established direct communication with the target 5G ProSe layer-3 end UE via the 5G ProSe layer-3 UE-to-UE relay UE using the same 5G ProSe direct link;

e) may include the source end UE info set to the user info of the source 5G ProSe end UE, if the UE acts as a 5G ProSe UE-to-UE relay UE, the 5G ProSe direct link is between the 5G ProSe UE-to-UE relay UE and the target 5G ProSe end UE, and only one source 5G ProSe end UE has established direct communication with the target 5G ProSe end UE via the 5G ProSe UE-to-UE relay UE using the 5G ProSe direct link;

f) shall include the target end UE info set to the user info of the target 5G ProSe layer-3 end UE, if the UE acts as a source 5G ProSe layer-3 end UE, the 5G ProSe direct link is between the source 5G ProSe layer-3 end UE and the 5G ProSe layer-3 UE-to-UE relay UE, and the source 5G ProSe layer-3 end UE has established direct communication with multiple target 5G ProSe layer-3 end UEs via the 5G ProSe layer-3 UE-to-UE relay UE using the same 5G ProSe direct link;

g) may include the target end UE info set to the user info of the target 5G ProSe end UE, if:
  1) the UE acts as a source 5G ProSe end UE, the 5G ProSe direct link is between the source 5G ProSe end UE and the 5G ProSe UE-to-UE relay UE, and the source 5G ProSe end UE has established direct communication with only one target 5G ProSe end UE via the 5G ProSe UE-to-UE relay UE using the 5G ProSe direct link; or
  2) the UE acts as a 5G ProSe UE-to-UE relay UE and the 5G ProSe direct link is between the 5G ProSe UE-to-UE relay UE and the target 5G ProSe end UE; and h) may include the target end UE layer-2 ID set to the layer-2 ID of the target 5G ProSe end UE, if the UE acts as a source 5G ProSe end UE and the 5G ProSe direct link is between the source 5G ProSe end UE and the 5G ProSe UE-to-UE relay UE.

If the PC5 5G ProSe direct link modification procedure is to remove the associated ProSe application(s) from existing PC5 QoS flow(s), the initiating UE shall create a PROSE DIRECT LINK MODIFICATION REQUEST message. In this message, the initiating UE:

a) shall include the PQFI(s) and the corresponding PC5 QoS parameters including the ProSe identifier(s); and b) shall include the link modification operation code set to "Remove ProSe application(s) from existing PC5 QoS flow(s)".

If the direct link modification procedure is to remove any PC5 QoS flow(s) from the existing 5G ProSe direct link, the initiating UE shall create a PROSE DIRECT LINK MODIFICATION REQUEST message. In this message, the initiating UE:

a) shall include the PQFI(s); and b) shall include the link modification operation code set to "Remove existing PC5 QoS flow(s) from the existing 5G ProSe direct link".

If the 5G ProSe direct link modification procedure is to establish 5G ProSe UE-to-UE relay communication with additional 5G ProSe layer-3 end UE using the existing 5G ProSe direct link between the 5G ProSe layer-3 end UE and 5G ProSe layer-3 UE-to-UE relay UE, the initiating UE shall create a PROSE DIRECT LINK MODIFICATION REQUEST message. In this message, the initiating UE:

a) shall include the source end UE info set to the user info of the source 5G ProSe layer-3 end UE and the target end UE info set to the user info of the target 5G ProSe layer-3 end UE received in PROSE DIRECT LINK ESTABLISHMENT REQUEST message, if the UE acts as a 5G ProSe layer-3 UE-to-UE relay UE and the 5G ProSe direct link is between the 5G ProSe layer-3 UE-to-UE relay UE and the target 5G ProSe layer-3 end UE;

b) for Ethernet traffic, shall include the MAC address of the source 5G ProSe layer-3 end UE, if the UE acts as a 5G ProSe layer-3 UE-to-UE relay UE and the 5G ProSe direct link is between the 5G ProSe layer-3 UE-to-UE relay UE and the target 5G ProSe layer-3 end UE and shall include the MAC address of the source 5G ProSe layer-3 end UE, if:

1) the UE acts as a source 5G ProSe layer-3 UE-to-UE end UE;

2) the MAC address of the source 5G ProSe layer-3 end UE changed; and 3) the 5G ProSe direct link is between the 5G ProSe layer-3 UE-to-UE relay UE and the source 5G ProSe layer-3 end UE;

c) shall include the target end UE info set to the user info of the additional target 5G ProSe layer-3 end UE to which the 5G ProSe UE-to-UE relay communication is requested, if the UE acts as a source 5G ProSe layer-3 end UE and the 5G ProSe direct link is between the source 5G ProSe layer-3 end UE and the 5G ProSe layer-3 UE-to-UE relay UE;

d) shall include the link modification operation code set to "Add new 5G ProSe layer-3 end UE to the existing 5G ProSe direct link";

e) may include the PQFI(s) and the corresponding PC5 QoS parameters including the ProSe identifier(s);

f) may include the PC5 QoS rule(s) to indicate the packet filters of the PC5 QoS flow(s); and g) may include the target end UE layer-2 ID set to the layer-2 ID of the target 5G ProSe layer-3 end UE, if the UE acts as a source 5G ProSe layer-3 end UE and the 5G ProSe direct link is between the source 5G ProSe layer-3 end UE and the 5G ProSe layer-3 UE-to-UE relay UE.

If the 5G ProSe direct link modification procedure is to establish 5G ProSe UE-to-UE relay communication with additional 5G ProSe layer-2 end UE using the existing 5G ProSe direct link between the 5G ProSe layer-2 end UE and 5G ProSe layer-2 UE-to-UE relay UE, the initiating UE shall create a PROSE DIRECT LINK MODIFICATION REQUEST message. In this message, the initiating UE:

a) shall include the source end UE info set to the user info of the source 5G ProSe layer-2 end UE and the target end UE info set to the user info of the target 5G ProSe layer-2 end UE received in PROSE DIRECT LINK ESTABLISHMENT REQUEST message, if the UE acts as a 5G ProSe layer-2 UE-to-UE relay UE and the 5G ProSe direct link is between the 5G ProSe layer-2 UE-to-UE relay UE and the target 5G ProSe layer-2 end UE;

b) shall include the target end UE info set to the user info of the additional target 5G ProSe layer-2 end UE to which the 5G ProSe UE-to-UE relay communication is requested, if the UE acts as a source 5G ProSe layer-2 end UE and the 5G ProSe direct link is between the source 5G ProSe layer-2 end UE and the 5G ProSe layer-2 UE-to-UE relay UE; and c) shall include the link modification operation code set to "Add new 5G ProSe layer-2 end UE to the existing 5G ProSe direct link".

If the 5G ProSe direct link modification procedure is to release 5G ProSe UE-to-UE relay communication with one of the peer 5G ProSe layer-3 end UEs using the shared 5G ProSe direct link between the 5G ProSe layer-3 end UE and 5G ProSe layer-3 UE-to-UE relay UE, the initiating UE shall create a PROSE DIRECT LINK MODIFICATION REQUEST message. In this message, initiating UE:

a) shall include the source end UE info set to the source user info of the 5G ProSe layer-3 end UE received in the PROSE DIRECT LINK RELEASE REQUEST message, if the UE acts as a 5G ProSe layer-3 UE-to-UE relay UE and the 5G ProSe direct link is between the 5G ProSe layer-3 UE-to-UE relay UE and the 5G ProSe layer-3 end UE;

b) shall include the target end UE info set to the user info of the peer 5G ProSe layer-3 end UE with which the 5G ProSe UE-to-UE relay communication is to be released, if the UE acts as a 5G ProSe layer-3 end UE and the 5G ProSe direct link is between the 5G ProSe layer-3 end UE and the 5G ProSe layer-3 UE-to-UE relay UE; and c) shall include the link modification operation code set to "Remove 5G ProSe layer-3 end UE from the existing 5G ProSe direct link".

If the 5G ProSe direct link modification procedure is to trigger the negotiated 5G ProSe layer-3 UE-to-UE relay reselection, the initiating UE shall create a PROSE DIRECT LINK MODIFICATION REQUEST message. In this message:

a) If the initiating UE acts as a source 5G ProSe layer-3 end UE and the 5G ProSe direct link is between the source 5G ProSe layer-3 end UE and the 5G ProSe layer-3 UE-to-UE relay UE, the initiating UE:

1) shall include the relay reselection indication;

2) shall include the list of user info IDs of the candidates 5G ProSe UE-to-UE relay UEs supporting the same RSC used for the existing 5G ProSe direct link;

3) shall include the list of target 5G ProSe end UEs IP address/prefix, if IP communication is used; and 4) may include the list of layer-2 IDs of the candidates 5G ProSe UE-to-UE relay UEs supporting the same RSC used for the existing 5G ProSe direct link; or b) If the initiating UE acts as a 5G ProSe layer-3 UE-to-UE relay UE and the 5G ProSe direct link is between the 5G ProSe layer-3 UE-to-UE relay UE and the target 5G ProSe end UE, the initiating UE:

1) shall include the relay reselection indication;

2) shall include the list of user info IDs of the candidates 5G ProSe UE-to-UE relay UEs supporting the same RSC used for the existing 5G ProSe direct link;

3) shall include the initiating source 5G ProSe UE IP address/prefix, if IP communication is used; and 4) may include list of layer-2 IDs of the candidates 5G ProSe UE-to-UE relay UEs supporting the same RSC used for the existing 5G ProSe direct link.

If the 5G ProSe direct link modification procedure is to trigger the negotiated 5G ProSe layer-3 UE-to-UE relay reselection and the initiating UE acts as a 5G ProSe layer-3 UE-to-UE relay UE, the initiating UE shall create a PROSE DIRECT LINK MODIFICATION REQUEST message for every IP address/prefix of the target 5G ProSe layer-3 end UEs received on the associated PROSE DIRECT LINK MODIFICATION REQUEST message from the source 5G ProSe layer-3 end UE.

If the 5G ProSe direct link modification procedure is to trigger the negotiated 5G ProSe layer-2 UE-to-UE relay reselection, the initiating UE shall create a PROSE DIRECT LINK MODIFICATION REQUEST message. In this message:

a) shall include the relay reselection indication;

b) shall include the list of candidates 5G ProSe UE-to-UE relay UE user info ID;

c) shall include the new MSBs of $K_{NRP}$ ID; and d) may include the list of candidates 5G ProSe UE-to-UE relay UE layer-2 ID.

After the PROSE DIRECT LINK MODIFICATION REQUEST message is generated, the initiating UE shall pass this message to the lower layers for transmission along with the initiating UE's layer-2 ID for 5G ProSe direct communication and the target UE's layer-2 ID for 5G ProSe direct communication and start timer T5081. The UE shall not send a new PROSE DIRECT LINK MODIFICATION REQUEST message to the same target UE while timer T5081 is running.

Figure 11:
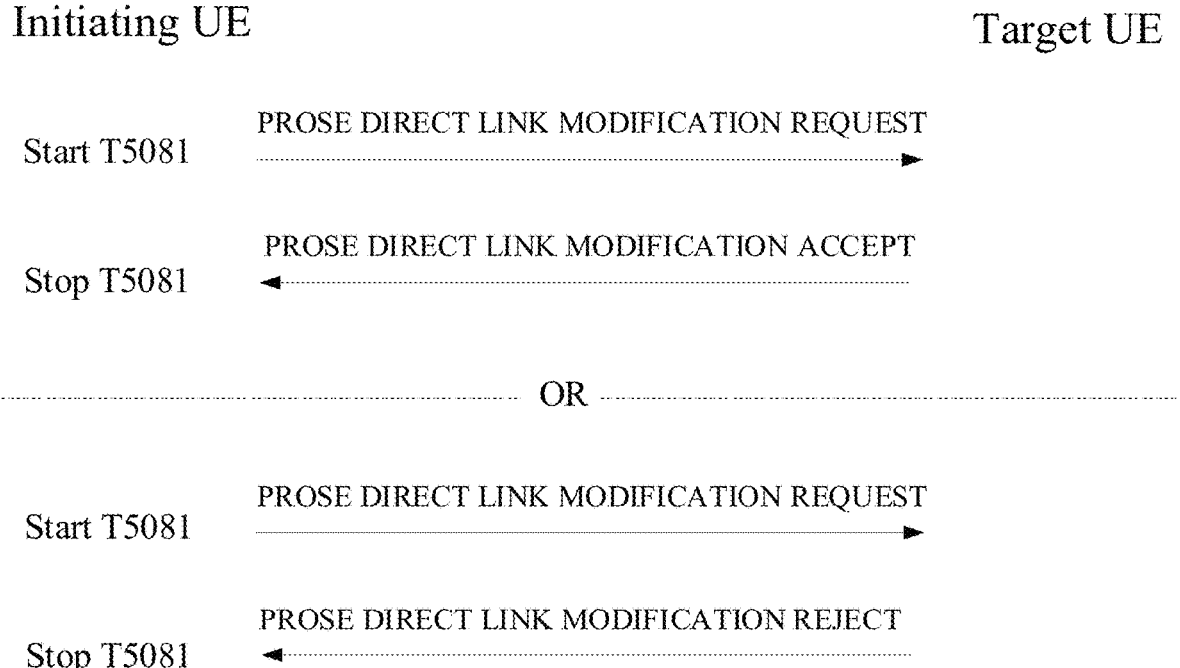
FIG. 11 is a reproduction of FIG. 7.2.3.2.1: 5G ProSe direct link modification procedure, from 3GPP TS 24.554 v18.4.0.

FIG. 11 is a Reproduction of FIG. 7.2.3.2.1: 5G ProSe Direct Link Modification Procedure, from 3GPP TS 24.554 v18.4.0.

FIG. 12 is a Reproduction of FIG. 7.2.3.2.2: 5G ProSe Direct Link Modification Procedure for the Negotiated 5G ProSe Layer-3 UE-to-UE Relay Reselection, from 3GPP TS 24.554 v18.4.0.

7.2.3.3 5G ProSe Direct Link Modification Procedure Accepted by the Target UE

If the PROSE DIRECT LINK MODIFICATION REQUEST message is accepted, the target UE shall respond with the PROSE DIRECT LINK MODIFICATION ACCEPT message.

If the PROSE DIRECT LINK MODIFICATION REQUEST message is to add a new ProSe application, add new PC5 QoS flow(s) or modify any existing PC5 QoS flow(s) in the 5G ProSe direct link, the target UE:

a) shall include the PQFI(s), the corresponding PC5 QoS parameters and optionally the ProSe identifier(s) that the target UE accepts;

b) may include the PC5 QoS rule(s) to indicate the packet filters of the PC5 QoS flow(s);

c) shall include the source end UE info set to the user info of the source 5G ProSe layer-3 end UE, if the UE acts as a target 5G ProSe layer-3 end UE, the 5G ProSe direct link is between the 5G ProSe layer-3 UE-to-UE relay UE and the target 5G ProSe layer-3 end UE, and the target 5G ProSe layer-3 end UE has established direct communication with multiple source 5G ProSe layer-3 end UEs via the 5G ProSe layer-3 UE-to-UE relay UE using the same 5G ProSe direct link;

d) may include the source end UE info set to the user info of the source 5G ProSe end UE, if the UE acts as a target 5G ProSe end UE, the 5G ProSe direct link is between the 5G ProSe UE-to-UE relay UE and the target 5G ProSe end UE, and the target 5G ProSe end UE has established direct communication with only one source 5G ProSe end UEs via the 5G ProSe UE-to-UE relay UE using the 5G ProSe direct link;

e) shall include the target end UE info set to the user info of the target 5G ProSe end UE, if the UE acts as a 5G ProSe UE-to-UE relay UE and, the 5G ProSe direct link is between the source 5G ProSe end UE and the 5G ProSe UE-to-UE relay UE, and the source 5G ProSe layer-3 end UE has established direct communication with multiple target 5G ProSe layer-3 end UEs via the 5G ProSe layer-3 UE-to-UE relay UE using the same 5G ProSe direct link; and f) may include the target end UE info set to the user info of the target 5G ProSe end UE, if the UE acts as a 5G ProSe UE-to-UE relay UE, the 5G ProSe direct link is between the source 5G ProSe end UE and the 5G ProSe UE-to-UE relay UE, and the source 5G ProSe end UE has established direct communication with only one target 5G ProSe end UE via the 5G ProSe UE-to-UE relay UE using the 5G ProSe direct link;

In the PROSE DIRECT LINK MODIFICATION ACCEPT Message.

If the PROSE DIRECT LINK MODIFICATION REQUEST message is to remove an existing ProSe application from the 5G ProSe direct link, the target UE shall delete the ProSe identifier received in the PROSE DIRECT LINK MODIFICATION REQUEST message and the corresponding PQFI(s) and PC5 QoS parameters from the profile associated with the 5G ProSe direct link.

If the PROSE DIRECT LINK MODIFICATION REQUEST message is to remove existing PC5 QoS flow(s) from the PC5 5G ProSe direct link, the target UE shall delete the PQFI(s) and the corresponding PC5 QoS parameters from the profile associated with the 5G ProSe direct link.

If the PROSE DIRECT LINK MODIFICATION REQUEST message is to add a new ProSe application, add new PC5 QoS flow(s) or modify any existing PC5 QoS flow(s) in the 5G ProSe direct link, after sending the PROSE DIRECT LINK MODIFICATION ACCEPT message, the target UE shall provide the added or modified PQFI(s) and corresponding PC5 QoS parameters along with PC5 link identifier to the lower layer.

If the PROSE DIRECT LINK MODIFICATION REQUEST message is to remove an existing ProSe application or to remove the existing PC5 QoS flow(s) from the 5G ProSe direct link, after sending the PROSE DIRECT LINK MODIFICATION ACCEPT message, the target UE shall provide the removed PQFI(s) along with the PC5 link identifier to the lower layer.

If the PROSE DIRECT LINK MODIFICATION REQUEST message is to establish 5G ProSe UE-to-UE relay communication with additional 5G ProSe layer-3 end UE using the existing 5G ProSe direct link between the 5G ProSe layer-3 end UE and 5G ProSe layer-3 UE-to-UE relay UE, the target UE:

a) if acting as the 5G ProSe layer-3 UE-to-UE relay UE, shall perform the 5G ProSe direct link establishment procedure towards the target 5G ProSe layer-3 end UE as specified in clause 7.2.2.2; and after receiving the PROSE DIRECT LINK ESTABLISHMENT ACCEPT message from the target 5G ProSe layer-3 end UE, shall create a PROSE DIRECT LINK MODIFICATION ACCEPT message;

b) if acting as the target 5G ProSe layer-3 end UE, shall create a PROSE DIRECT LINK MODIFICATION ACCEPT message; and c) in the PROSE DIRECT LINK MODIFICATION ACCEPT message, the target UE:

1) if the UE acts as the target 5G ProSe layer-3 end UE:

i) shall include the source end UE info set to the user info of the source 5G ProSe layer-3 end UE and the target end UE info set to the user info of the target 5G ProSe layer-3 end UE; and ii) for Ethernet traffic, shall include the MAC address of the target 5G ProSe layer-3 end UE if the MAC address of the target 5G ProSe layer-3 end UE changed;

2) if the UE acts as the 5G ProSe layer-3 UE-to-UE relay UE:

i) shall include the target end UE info set to the user info of the target 5G ProSe layer-3 end UE;

ii) for IP traffic, may include the target 5G ProSe layer-3 end UE IP address IE set to the IP address of the additional target 5G ProSe layer-3 end UE; and iii) for Ethernet traffic, shall include the MAC address of the target 5G ProSe layer-3 end UE.

3) may include the PQFI(s) and the corresponding PC5 QoS parameters optionally including the ProSe identifier(s) for the PC5 QoS flow(s) that the target 5G ProSe layer-3 end UE accepts; and 4) may include the PC5 QoS rule(s) to indicate the packet filters of the PC5 QoS flow(s).

If the PROSE DIRECT LINK MODIFICATION REQUEST message is to establish 5G ProSe UE-to-UE relay communication with additional 5G ProSe layer-2 end UE using the existing 5G ProSe direct link between the 5G ProSe layer-2 end UE and 5G ProSe layer-2 UE-to-UE relay UE, the target UE:

a) if acting as the 5G ProSe layer-2 UE-to-UE relay UE, shall perform the 5G ProSe direct link establishment procedure towards the target 5G ProSe layer-2 end UE as specified in clause 7.2.2.2; and after receiving the PROSE DIRECT LINK ESTABLISHMENT ACCEPT message from the target 5G ProSe layer-2 end UE, shall create a PROSE DIRECT LINK MODIFICATION ACCEPT message;

b) if acting as the target 5G ProSe layer-2 end UE, shall create a PROSE DIRECT LINK MODIFICATION ACCEPT message; and c) in the PROSE DIRECT LINK MODIFICATION ACCEPT message, the target UE:

1) if the UE acts as the target 5G ProSe layer-2 end UE:

i) shall include the source end UE info set to the user info of the source 5G ProSe layer-2 end UE and the target end UE info set to the user info of the target 5G ProSe layer-2 end UE; or 2) if the UE acts as the 5G ProSe layer-2 UE-to-UE relay UE:

i) shall include the target end UE info set to the user info of the target 5G ProSe layer-2 end UE.

If the PROSE DIRECT LINK MODIFICATION REQUEST message is to release 5G ProSe UE-to-UE relay communication with one of the peer 5G ProSe layer-3 end UEs using the shared 5G ProSe direct link between the 5G ProSe layer-3 end UE and 5G ProSe layer-3 UE-to-UE relay UE, the target UE:

a) if acting as the 5G ProSe layer-3 UE-to-UE relay UE, may initiate one of the following procedures towards the target 5G ProSe layer-3 end UE:

1) 5G ProSe direct link release procedure as specified in clause 7.2.6.2 to release the 5G ProSe direct link with the peer 5G ProSe layer-3 end UE; or 2) 5G ProSe direct link modification procedure as specified in clause 7.2.3.2 to remove the corresponding PC5 QoS flow(s), if the UE determines to keep the 5G ProSe direct link with the peer 5G ProSe layer-3 end UE; and b) shall create a PROSE DIRECT LINK MODIFICATION ACCEPT message, and in this message, the target UE:

1) shall include the source end UE info set to the user info of the source 5G ProSe layer-3 end UE, if the UE acts as the target 5G ProSe layer-3 end UE; or 2) shall include the target end UE info set to the user info of the target 5G ProSe layer-3 end UE, if the UE acts as the 5G ProSe layer-3 UE-to-UE relay UE.

If the 5G ProSe direct link is for 5G ProSe direct communication between the 5G ProSe remote UE and the 5G ProSe layer-3 UE-to-network relay UE, and if the initiating UE is the 5G ProSe remote UE, then the target UE (as the 5G ProSe layer-3 UE-to-network relay UE) performs the QoS flows handling procedure as specified in clause 8.2.6.3.3 and clause 8.2.6.4.2.

If the PROSE DIRECT LINK MODIFICATION REQUEST message is accepted by the target 5G ProSe end UE to trigger UE-to-UE relay reselection and the 5G PC5 direct link is between the 5G ProSe UE-to-UE relay UE and the target 5G ProSe end UE, the target UE acting as the target 5G ProSe end UE may perform the candidate 5G ProSe UE-to-UE relay discovery procedure as specified in clause 8a.2.3.3. The target UE shall set up a PC5 unicast link with the selected new 5G ProSe UE-to-UE relay UE, if no such PC5 unicast link already exists.

If the PROSE DIRECT LINK MODIFICATION REQUEST message is accepted to trigger the negotiated 5G ProSe layer-3 UE-to-UE relay reselection, the target UE shall respond with PROSE DIRECT LINK MODIFICATION ACCEPT message. In this message:

a) if the target UE acts as a target 5G ProSe layer-3 end UE and the 5G ProSe direct link is between the target 5G ProSe layer-3 end UE and the 5G ProSe layer-3 UE-to-UE relay UE, the target UE:

1) shall include the relay reselection indication;

2) shall include the newly selected 5G ProSe UE-to-UE relay UE user info ID;

3) shall include the initiating 5G ProSe end UE IP address; and 4) shall include the target 5G ProSe end UE IP address to be used with the newly selected 5G ProSe UE-to-UE relay UE, if IP communication is used; and b) if the target UE acts as a 5G ProSe layer-3 UE-to-UE relay UE and the 5G ProSe direct link is between the 5G ProSe layer-3 UE-to-UE relay UE and the source 5G ProSe layer-3 end UE, after receiving the PROSE DIRECT LINK MODIFICATION ACCEPT message from the target 5G ProSe layer-3 end UE, the target UE.

1) shall include the relay reselection indication;

2) shall include the newly selected 5G ProSe UE-to-UE relay UE user info ID;

3) shall include the target 5G ProSe end UE IP address; and 4) shall include the target 5G ProSe end UE IP address to be used with the newly selected 5G ProSe UE-to-UE relay UE, if IP communication is used.

If the PROSE DIRECT LINK MODIFICATION REQUEST message is accepted to trigger the negotiated 5G ProSe layer-2 UE-to-UE relay reselection, the target UE acting as the target 5G ProSe layer-2 end UE shall respond with PROSE DIRECT LINK MODIFICATION ACCEPT message. In this message:

a) shall include the new 5G ProSe UE-to-UE relay UE user info ID; and b) shall include the new LBSs of $K_{NRP}$ ID.

After the PROSE DIRECT LINK MODIFICATION ACCEPT message is generated, the target UE shall pass this message to the lower layers for transmission along with the initiating UE's layer-2 ID for 5G ProSe direct communication and the target UE's layer-2 ID for 5G ProSe direct communication.

If this procedure is performed for the negotiated 5G ProSe layer-3 UE-to-UE relay reselection, the target UE shall start timer T5096. The target UE shall not send a new PROSE DIRECT LINK MODIFICATION ACCEPT message to the same initiating UE while timer T5096 is running.

If the target UE accepts the 5G ProSe direct link modification request, then the target UE may perform the PC5 QoS flow establishment over 5G ProSe direct link as specified in clause 7.2.7 and perform the PC5 QoS flow match over 5G ProSe direct link as specified in clause 7.2.8.

The target UE shall form the new $K_{NRP}$ ID from the new MSBs of $K_{NRP}$ ID received in the PROSE DIRECT LINK MODIFICATION REQUEST message and the new LSBs of $K_{NRP}$ ID included in the PROSE DIRECT LINK MODIFICATION ACCEPT message. The target UE shall replace the existing $K_{NRP}$ ID with the new $K_{NRP}$ ID. The target UE may include the new $K_{NRP}$ ID in DIRECT LINK ESTABLISHMENT REQUEST message with the initiating UE as specified in clause 7.2.2.2.

7.2.3.4 5G ProSe direct link modification procedure completion by the initiating UE Upon receipt of the PROSE DIRECT LINK MODIFICATION ACCEPT message, the initiating UE shall stop timer T5081.

Upon receipt of the PROSE DIRECT LINK MODIFICATION ACCEPT message, if the PROSE DIRECT LINK MODIFICATION REQUEST message is to add a new ProSe application, add new PC5 QoS flow(s) or modify any existing PC5 QoS flow(s) in the 5G ProSe direct link, the initiating UE shall provide the added or modified PQFI(s) and corresponding PC5 QoS parameters along with PC5 link identifier to the lower layer.

Upon receipt of the PROSE DIRECT LINK MODIFICATION ACCEPT message, if the PROSE DIRECT LINK MODIFICATION REQUEST message is to remove an existing ProSe application or to remove the existing PC5 QoS flow(s) from the 5G ProSe direct link, the initiating UE shall provide the removed PQFI(s) along with the PC5 link identifier to the lower layer.

Upon receipt of the PROSE DIRECT LINK MODIFICATION ACCEPT message, if the initiating UE acts as the 5G ProSe layer-3 UE-to-UE relay UE and the PROSE DIRECT LINK MODIFICATION REQUEST message is to establish 5G ProSe UE-to-UE relay communication with additional 5G ProSe layer-3 end UE using the existing 5G ProSe direct link between the 5G ProSe layer-3 end UE and 5G ProSe layer-3 UE-to-UE relay UE, the initiating UE shall send a PROSE DIRECT LINK ESTABLISHMENT ACCEPT message to the source 5G ProSe layer-3 end UE as specified in clause 7.2.2.3.

Upon receipt of the PROSE DIRECT LINK MODIFICATION ACCEPT message, if the initiating UE acts as the 5G ProSe layer-3 UE-to-UE relay UE and the PROSE DIRECT LINK MODIFICATION REQUEST message is to add new PC5 QoS flow(s) or modify any existing PC5 QoS flow(s) in the existing 5G ProSe direct link or to remove any PC5 QoS flow(s) from the existing 5G ProSe direct link between the 5G ProSe layer-3 end UE and 5G ProSe layer-3 UE-to-UE relay UE, the initiating UE shall send a PROSE DIRECT LINK MODIFICATION ACCEPT message to the source 5G ProSe layer-3 end UE as specified in clause 7.2.3.3.

When the 5G ProSe direct link is between the source 5G ProSe end UE and the 5G ProSe UE-to-UE relay UE, upon receiving PROSE DIRECT LINK MODIFICATION ACCEPT message, which includes relay reselection indication, and the PROSE DIRECT LINK MODIFICATION REQUEST message is for the negotiated 5G ProSe UE-to-UE relay reselection, the initiating UE, acting as the source 5G ProSe end UE, shall set up a PC5 unicast link with the newly selected 5G ProSe UE-to-UE relay UE whose user info ID is included in the PROSE DIRECT LINK MODIFICATION ACCEPT message, if no such PC5 unicast link already exists. If the initiating UE acts as a source 5G ProSe layer-3 end UE, the initiating UE shall create a PROSE DIRECT LINK MODIFICATION ACK message. In this message, the initiating UE:

a) shall include the relay reselection indication, source end UE IP address for new relay IE set to IP address of the source 5G ProSe layer-3 end UE's IP address to be used with the newly selected 5G ProSe layer-3 UE-to-UE relay UE and target end UE IP address IE set to the IP address of the target 5G ProSe layer-3 end UE, if IP communication is used.

When the 5G ProSe direct link is between the 5G ProSe layer-3 UE-to-UE relay UE and the target 5G ProSe layer-3 end UE, and the 5G ProSe layer-3 UE-to-UE relay UE receives PROSE DIRECT LINK MODIFICATION ACK message from the source 5G ProSe end UE which includes relay reselection indication, the 5G ProSe layer-3 UE-to-UE relay UE shall create a PROSE DIRECT LINK MODIFICATION ACK message. In this message, the 5G ProSe layer-3 UE-to-UE relay UE:

a) shall include the relay reselection indication, source end UE IP address for new relay IE set to the IP address of the source 5G ProSe layer-3 end UE to be used with the newly selected 5G ProSe layer-3 UE-to-UE relay UE, and source end UE IP address IE set to the IP address of the source 5G ProSe layer-3 end UE, if IP communication is used.

Upon receiving PROSE DIRECT LINK MODIFICATION ACCEPT message, that includes relay reselection indication, if the PROSE DIRECT LINK MODIFICATION REQUEST message is for relay reselection, the initiating UE shall form the new $K_{NRP}$ ID from the MSBs of $K_{NRP}$ ID included in the PROSE DIRECT LINK MODIFICATION REQUEST message and the LSBs of $K_{NRP}$ ID received in the PROSE DIRECT LINK MODIFICATION ACCEPT message. The initiating UE shall replace the existing $K_{NRP}$ ID with the new $K_{NRP}$ ID. The initiating UE may include the new $K_{NRP}$ ID in PROSE DIRECT LINK ESTABLISHMENT REQUEST message with the target UE as specified in clause 7.2.2.2 when the initiating UE reconnects with the same target UE.

After the PROSE DIRECT LINK MODIFICATION ACK message is generated, the initiating UE shall pass this message to the lower layers for transmission along with the initiating UE's layer-2 ID for 5G ProSe direct communication and the target UE's layer-2 ID for 5G ProSe direct communication.

If the source UE acknowledges the 5G ProSe direct link modification accept, then the source UE starts to receive and/or transmit traffic via the newly selected 5G ProSe UE-to-UE relay UE.

If the 5G ProSe direct link modification procedure is for 5G ProSe direct communication between the 5G ProSe layer-3 UE-to-UE relay UE and the target 5G ProSe layer-3 end UE, for Ethernet traffic, the PROSE DIRECT LINK MODIFICATION ACCEPT message contains target 5G ProSe layer-3 end UE MAC address, and the initiating UE acting as the 5G ProSe layer-3 UE-to-UE relay UE detects that the MAC address of the target 5G ProSe layer-3 end UE is not unique, i.e., the MAC address of the target 5G ProSe layer-3 end UE was also provided by another 5G ProSe layer-3 end UE in an existing ProSe 5G direct link, the 5G ProSe layer-3 UE-to-UE relay UE shall perform 5G ProSe direct link release procedure as specified in clause 7.2.6.

7.2.3.4a 5G ProSe Direct Link Modification Procedure Completion by the Target UE Upon receipt of the PROSE DIRECT LINK MODIFI-CATION ACK message, the target layer-3 5G ProSe end UE starts to receive traffic, transmit traffic, or both, via the newly selected 5G ProSe UE-to-UE relay UE and shall stop T5096.

Upon receipt of the PROSE DIRECT LINK MODIFI-CATION ACK message, the layer-3 5G ProSe UE-to-UE relay UE shall stop T5096.

7.2.3.5 5G ProSe Direct Link Modification Procedure not Accepted by the Target UE If the 5G ProSe direct link modification request cannot be accepted, the target UE shall send a PROSE DIRECT LINK MODIFICATION REJECT message. The PROSE DIRECT LINK MODIFICATION REJECT message contains a PC5 signalling protocol cause IE set to one of the following cause values:

5 lack of resources for 5G ProSe direct link;

6 required service not allowed;

12 security policy not aligned;

16 lack of local capabilities;

20 Failure from 5G ProSe end UE;

23 MAC address not unique;

24 relay UE is not selected for link setup with integrated discovery; or

111 protocol error, unspecified.

8a.2.1.3 UE-to-UE Relay Discovery Over PC5 Interface with Model B 8a.2.1.3.1 General In the following procedures, the 5G ProSe end UE sending the PROSE PC5 DISCOVERY message for UE-to-UE relay discovery solicitation is called the "discoverer end UE" and the other 5G ProSe end UE is called the "discoveree end UE".

8a.2.1.3.2 Discoverer End UE Procedure for UE-to-UE Relay Discovery 8a.2.1.3.2.1 General The purpose of the discoverer end UE procedure for UE-to-UE Relay discovery is:

a) to enable a ProSe-enabled UE to solicit proximity of a connectivity service provided by a 5G ProSe UE-to-UE relay UE, upon a request from upper layers; or b) to enable a ProSe-enabled UE to measure the PROSE PC5 DISCOVERY message signal strength between the ProSe-enabled UE and the 5G ProSe UE-to-UE relay UE(s) for UE-to-UE relay selection/reselection.

8a.2.1.3.2.2 Discoverer End UE Procedure for UE-to-UE Relay Discovery Initiation The UE is authorised to perform the discoverer end UE procedure for UE-to-UE relay discovery if:

a) one of the following is true:

1) the UE is not served by NG-RAN, is authorised to act as a 5G ProSe end UE towards a 5G ProSe UE-to-UE relay UE and is configured with the radio parameters to be used for ProSe UE-to-UE relay discovery when not served by NG-RAN;

2) the UE is served by NG-RAN, is authorised to act as a 5G ProSe end UE towards a 5G ProSe UE-to-UE relay UE; or 3) the UE is:

i) in 5GMM-IDLE mode, in limited service state as specified in 3GPP TS 23.122 [14] and the reason for the UE being in limited service state is one of the following:

A) the UE is unable to find a suitable cell in the selected PLMN as specified in 3GPP TS 38.304 [15];

B) the UE received a REGISTRATION REJECT message or a SERVICE REJECT message with the 5GMM cause #11 "PLMN not allowed" as specified in 3GPP TS 24.501 [11]; or C) the UE received a REGISTRATION REJECT message or a SERVICE REJECT message with the 5GMM cause #7 "5GS services not allowed" as specified in 3GPP TS 24.501 [11]; and ii) authorised to act as a 5G ProSe end UE towards a 5G ProSe UE-to-UE relay UE when the UE is not served by NG-RAN and configured with the radio parameters to be used for ProSe UE-to-UE relay discovery use when not served by NG-RAN; and b) the UE is configured with:

1) the relay service code parameter identifying the connectivity service provided by a 5G ProSe UE-to-UE relay to be solicited as specified in clause 5.2.7 and the indicated security procedure for the relay service code is supported by the UE;

otherwise, the UE is not authorised to perform the discoverer end UE procedure for UE-to-UE relay discovery.

FIG. 8a.2.1.3.2.2.1 illustrates the interaction of the UEs in the discoverer end UE procedure for UE-to-UE relay discovery.

Figure 13:
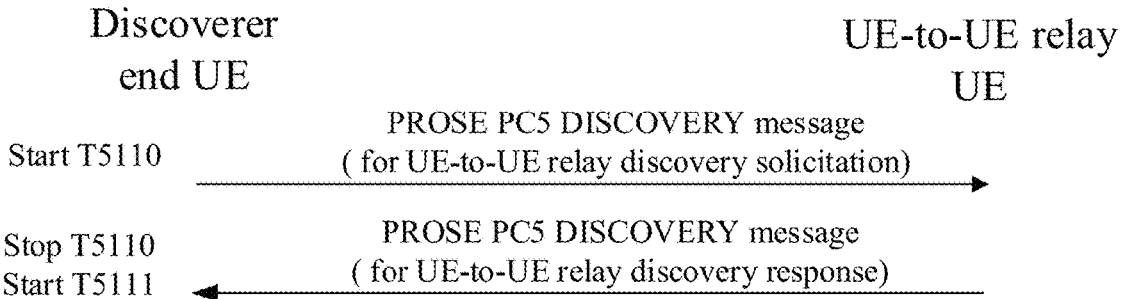
FIG. 13 is a reproduction of FIG. 8a.2.1.3.3.2.2.1: Discoverer end UE procedure for UE-to-UE Relay discovery, from 3GPP TS 24.554 v18.4.0.

FIG. 13 is a Reproduction of FIG. 8a.2.1.3.2.2.1: Discoverer End UE Procedure for UE-to-UE Relay Discovery, from 3GPP TS 24.554 v18.4.0.

For PROSE PC5 DISCOVERY message signal strength measurement, the UE manages a periodic measurement timer T5111, which is used to trigger the periodic PROSE PC5 DISCOVERY message signal strength measurement between the UE and the 5G ProSe UE-to-UE relay UE with which the UE has a link established. It is started whenever the UE has established a direct link with a 5G ProSe UE-to-UE relay UE and restarted whenever the UE receives the PROSE PC5 DISCOVERY message for UE-to-UE relay discovery response from the 5G ProSe UE-to-UE relay UE with which the UE has a link established.

When the UE is triggered by the upper layers to solicit proximity of a connectivity service provided by a 5G ProSe UE-to-UE relay UE to communicate with a target discoveree end UE, or when the periodic measurement timer T5111 expires and if the UE is authorised to perform the discoverer end UE procedure for UE-to-UE relay discovery, then the UE:

a) if the UE is served by NG-RAN and the UE in 5GMM-IDLE mode needs to request resources for sending PROSE PC5 DISCOVERY messages for relay discovery as specified in 3GPP TS 38.331 [13], shall perform a service request procedure as specified in 3GPP TS 24.501 [11];

b) shall obtain a valid UTC time for the discovery transmission from the lower layers and generate the UTC-based counter corresponding to this UTC time;

c) shall generate a PROSE PC5 DISCOVERY message for UE-to-UE relay discovery solicitation. In the PROSE PC5 DISCOVERY message for UE-to-UE relay discovery solicitation, the UE:

1) shall include the direct discovery set IE which contains:

i) the discoveree user info parameter set to the application layer ID of the discoveree end UE as provided by the upper layers, the corresponding MIC field computed as described in 3GPP TS 33.503 [34] for the direct discovery set, and the corresponding UTC-based counter LSB parameter set to the 4 least significant bits of the UTC-based counter; and;

ii) the discoverer user info parameter set to the application layer ID of the discoverer end UE as provided by the upper layers, the corresponding MIC field computed as described in 3GPP TS 33.503 [34] for the direct discovery set, and the corresponding UTC-based counter LSB parameter set to the 4 least significant bits of the UTC-based counter;

and shall apply the DUIK, DUSK or DUCK with the associated encrypted bitmask in the code-sending security parameter for the ProSe service received from the DDNMF (see clause 6.2), along with the UTC-based counter, to the direct discovery set IE as specified in 3GPP TS 33.503 [34];

2) void;

3) shall set the relay service code parameter to the relay service code parameter identifying the connectivity service to be solicited, configured in clause 5.2.7. The security procedure selection is based on the relay service codes configured at the UE.

4) shall include the MIC field computed as described in 3GPP TS 33.503 [34];

5) shall set the UTC-based counter LSB parameter to the 4 least significant bits of the UTC-based counter;

6) shall set the ProSe direct discovery PC5 message type parameter as specified in table 10.2.1.13;

7) may set the UE-to-UE relay UE info parameter to user info ID for the 5G ProSe UE-to-UE relay UE, if known e.g. during previous 5G ProSe UE-to-UE relay discovery or 5G ProSe UE-to-UE relay communication procedure(s); and 8) shall include the announce prohibited indication with its value set as "It is prohibited to broadcast the user info" in the PC5 DISCOVERY message for UE-to-UE relay discovery solicitation if the discoverer UE needs to indicate to a 5G ProSe UE-to-UE relay UE that it is prohibited from broadcasting the user info of the discoverer end UE included in the direct discovery set during the procedure of 5G ProSe UE-to-UE relay discovery over PC5 interface with model A;

d) shall apply the DUIK, DUSK or DUCK with the associated encrypted bitmask for the relay service code for 5G ProSe UE-to-UE relay discovery, along with the UTC-based counter, to the PROSE PC5 DISCOVERY message for whichever security mechanism(s) configured to be applied, e.g., integrity protection, message scrambling or confidentiality protection of one or more of the above parameters, as specified in 3GPP TS 33.503 [34];

e) shall set the destination layer-2 ID to the default destination layer-2 ID as specified in clause 5.2.7 and self-assign a source layer-2 ID for sending the UE-to-UE relay discovery solicitation message; and NOTE 1: The UE implementation ensures that the value of the self-assigned source layer-2 ID is different from any other self-assigned source layer-2 ID(s) in use for 5G ProSe direct communication as specified in clause 7.2, is different from any other provisioned destination layer-2 ID(s) as specified in clause 5.2 and is different from any other self-assigned source layer-2 ID in use for a simultaneous 5G ProSe direct discovery procedure over PC5 with a different discovery model as specified in clause 6.2.14.2.1.2, clause 6.2.15.2.1.2, clause 8.2.1.2.2.2, clause 8.2.1.2.4.2 and clause 8a.2.1.2.2.2.

f) shall pass the resulting PROSE PC5 DISCOVERY message for UE-to-UE relay discovery solicitation along with the source layer-2 ID, destination layer-2 ID and an indication that the message is for 5G ProSe direct discovery to the lower layers for transmission over the PC5 interface.

If the PROSE PC5 DISCOVERY message for UE-to-UE relay discovery solicitation is used to solicit proximity of a connectivity service provided by a 5G ProSe UE-to-UE relay UE, the UE shall ensure that it keeps on passing the PROSE PC5 DISCOVERY message for UE-to-UE relay discovery solicitation for transmission until the UE is triggered by the upper layers to stop soliciting proximity of a connectivity service provided by a 5G ProSe UE-to-UE relay UE, or until the UE stops being authorised to perform the discoverer end UE procedure for UE-to-UE relay discovery. How this is achieved is left up to UE implementation.

NOTE 2: The discoverer end UE can stop discoverer end UE procedure for UE-to-UE relay discovery for power saving by implementation specific means e.g. an implementation-specific maximum number of 5G ProSe direct links configured in the UE, or an implementation-specific timer expires.

If the PROSE PC5 DISCOVERY message for UE-to-UE relay discovery solicitation is used to trigger the PROSE PC5 DISCOVERY message signal strength measurement between the UE and the 5G ProSe UE-to-UE relay UE with which the UE has a link established, the UE shall start the retransmission timer T5110. If retransmission timer T5110 expires, the UE shall retransmit the PROSE PC5 DISCOVERY message for UE-to-UE relay discovery solicitation and restart timer T5110. If no response is received from the 5G ProSe UE-to-UE relay UE with which the UE has a link established after reaching the maximum number of allowed retransmissions, the UE shall trigger UE-to-UE relay reselection procedure.

NOTE 3: The maximum number of allowed retransmissions is UE implementation specific.

Upon reception of a PROSE PC5 DISCOVERY message for UE-to-UE relay discovery response, for the target relay service code of the connectivity service which the UE is authorized to discover, the UE shall obtain a valid UTC time from the lower layers and generate a UTC-based counter corresponding to this UTC time and use it to recover the UTC-based counter associated with the PROSE PC5 DISCOVERY message and the UTC-based counter associated with the direct discovery set. The UE shall use the associated DUSK, if received from the 5G DDNMF or 5G PKMF (if security procedure over user plane for 5G ProSe UE-to-UE relay is used) and the UTC-based counter associated with the PROSE PC5 DISCOVERY message to unscramble the PROSE PC5 DISCOVERY message as described in 3GPP TS 33.503 [34]. Then, if a DUCK is received from the 5G DDNMF or 5G PKMF (if security procedure over user plane for 5G ProSe UE-to-UE relay is used), the UE shall use the DUCK and the UTC-based counter associated with the PROSE PC5 DISCOVERY message to decrypt the configured message-specific confidentiality-protected portion, as described in 3GPP TS 33.503 [34]. Finally, if a DUIK is received from the 5G DDNMF or 5G PKMF (if security procedure over user plane for 5G ProSe UE-to-UE relay is used), the UE shall use the DUIK and the UTC-based counter associated with the PROSE PC5 DISCOVERY message to verify the MIC field in the unscrambled PROSE PC5 DISCOVERY message for UE-to-UE relay discovery response.

The UE shall further use the DUSK in code-receiving security parameter for the ProSe service which the UE is authorized to discover (see clause 6.2.7) and the UTC-based counter associated with the direct discovery set to unscramble the direct discovery set IE in the PROSE PC5 DISCOVERY message as described in 3GPP TS 33.503 [34]. Then if a DUCK is included in the code-receiving security parameter, the UE shall use the DUCK and the UTC-based counter associated with the direct discovery set to decrypt the direct discovery set IE, as described in 3GPP TS 33.503 [34]. The UE shall verify whether the application layer ID of the discoveree end UE in the decrypted direct discovery set matches the application layer ID of target discoveree end UE provided by the upper layers; if not, the UE shall discard the direct discovery set. Finally, if the application layer IDs match and a DUIK is included in the code-receiving security parameter, the UE shall use the DUIK and the UTC-based counter associated with the direct discovery set to verify the MIC for the direct discovery set IE in the PROSE PC5 DISCOVERY message for UE-to-UE relay discovery response.

NOTE 4: The UE can determine the received PROSE PC5 DISCOVERY message for UE-to-UE relay discovery response is for 5G ProSe direct discovery based on an indication from the lower layer.

Then if:
  a) the relay service code parameter of the PROSE PC5 DISCOVERY message for UE-to-UE relay discovery response is the same as the relay service code parameter of the PROSE PC5 DISCOVERY message for UE-to-UE relay discovery solicitation; and
  b) the application layer ID of the discoveree end UE received in the PROSE PC5 DISCOVERY message for UE-to-UE relay discovery response is the same as the application layer ID of targeted discoveree end UE provided by upper layers for the connectivity service being solicited, then the UE shall consider that the connectivity service the UE seeks to discover has been discovered. In addition, the UE can measure the signal strength of the PROSE PC5 DISCOVERY message for UE-to-UE relay discovery response for relay selection or reselection. If the UE has received the PROSE PC5 DISCOVERY message for UE-to-UE relay discovery response from the 5G ProSe UE-to-UE relay UE with which the UE has a link established, the UE shall stop the retransmission timer T5110 and start the periodic measurement timer T5111.

8a.2.1.3.2.3 Discoverer End UE Procedure for UE-to-UE Relay Discovery Completion When the UE is triggered by the upper layers to stop soliciting for proximity of a connectivity service provided by a 5G ProSe UE-to-UE relay UE, or when the UE stops being authorised to perform the discoverer end UE procedure for UE-to-UE relay discovery, the UE shall instruct the lower layers to stop the discoverer operation.

NOTE: The discoverer end UE can stop discoverer end UE procedure for UE-to-UE relay discovery for power saving by implementation specific means e.g. an implementation-specific maximum number of 5G ProSe direct links configured in the UE, or an implementation-specific timer expires.

When the UE stops discoverer operation, if the UE is in 5GMM-CONNECTED mode, the UE shall trigger the corresponding procedure in lower layers as specified in 3GPP TS 38.331 [13].

8a.2.1.3.3 Relay UE Procedure for UE-to-UE Relay Discovery 8a.2.1.3.3.1 General

The purpose of the relay UE procedure for UE-to-UE relay discovery is to enable a ProSe-enabled UE with a UE-to-UE relay to respond to solicitation from other ProSe-enabled UEs on proximity of a connectivity service provided by the 5G ProSe UE-to-UE relay UE, upon a request from upper layers.

8a.2.1.3.3.2 Relay UE Procedure for UE-to-UE Relay Discovery Initiation

The UE is authorised to perform the relay UE procedure for UE-to-UE relay discovery if:
  a) the UE is authorised to act as a 5G ProSe UE-to-UE relay UE in the PLMN indicated by the serving cell, and
    1) the UE is served by NG-RAN; or
    2) the UE is not served by NG-RAN and intends to use the provisioned radio resources for 5G ProSe UE-to-UE relay discovery;
  b) the UE is configured with:
    1) the relay service code parameter identifying the connectivity service to be responded to as specified in clause 5.2.7 and the indicated security procedure for the relay service code is supported by the UE; and
    2) the user info ID for the 5G ProSe UE-to-UE relay discovery, as specified in clause 5.2.7. Otherwise, the UE is not authorised to perform the relay UE procedure for UE-to-UE relay discovery.

FIG. 8a.2.1.3.3.2.1 illustrates the interactions between the 5G ProSe UE-to-UE relay UE and discoveree end UE in the relay UE procedure for UE-to-UE relay discovery.

Figure 14:
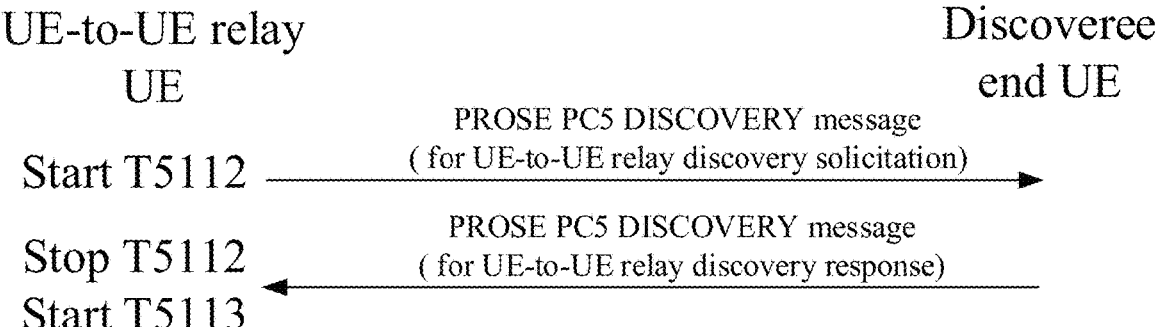
FIG. 14 is a reproduction of FIG. 8a.2.1.3.3.2.1: Relay UE procedure for UE-to-UE Relay discovery with the discoveree end UE, from 3GPP TS 24.554 v18.4.0.

FIG. 14 is a Reproduction of FIG. 8a.2.1.3.3.2.1: Relay UE Procedure for UE-to-UE Relay Discovery With the Discoveree End UE, from 3GPP TS 24.554 v18.4.0.

When the UE is triggered by the upper layers to start responding to solicitation on proximity of a connectivity service provided by the UE-to-UE relay and if the UE is authorised to perform the relay UE procedure for UE-to-UE relay discovery, then the UE:
  a) if the UE is served by NG-RAN and the UE in 5GMM-IDLE mode needs to request resources for sending PROSE PC5 DISCOVERY messages as specified in 3GPP TS 38.331 [13], shall perform a service request procedure as specified in 3GPP TS 24.501 [11]; and
  b) shall instruct the lower layers to start monitoring for PROSE PC5 DISCOVERY messages.

Upon reception of a PROSE PC5 DISCOVERY message for UE-to-UE relay discovery solicitation, for the relay service code of the connectivity service which the UE is authorized to respond, the UE shall use the associated DUSK, if received from the 5G DDNMF or 5G PKMF (if security procedure over user plane for 5G ProSe UE-to-UE relay is used) and the UTC-based counter obtained during the reception operation to unscramble the PROSE PC5 DISCOVERY message as described in 3GPP TS 33.503 [34]. Then, if a DUCK is received from the 5G DDNMF or 5G PKMF (if security procedure over user plane for 5G ProSe UE-to-UE relay is used), the UE shall use the DUCK and the UTC-based counter to decrypt the configured message-specific confidentiality-protected portion, as described in 3GPP TS 33.503 [34]. Finally, if a DUIK is received from the 5G DDNMF or 5G PKMF (if security procedure over user plane for 5G ProSe UE-to-UE relay is used), the UE shall use the DUIK and the UTC-based counter to verify the MIC field in the unscrambled PROSE PC5 DISCOVERY message for UE-to-UE relay discovery solicitation.

NOTE 1: The UE can determine the received PROSE PC5 DISCOVERY message for 5G ProSe UE-to-UE relay discovery solicitation is for 5G ProSe direct discovery based on an indication from the lower layer.

If the UE receives a PROSE PC5 DISCOVERY message for UE-to-UE relay discovery solicitation which includes a relay service code associated with the network assistance security indication indicating the security procedure with network assistance is to be used and the UE is not served by NG-RAN, the UE shall ignore the PROSE PC5 DISCOVERY message.

If:

a) the UE receives a PROSE PC5 DISCOVERY message for UE-to-UE relay discovery solicitation, and in this message:

1) the relay service code parameter is the same as the relay service code parameter configured for the connectivity service as specified in clause 5.2.7; and i) the UE is served by NG-RAN; or ii) the UE is not served by NG-RAN and the relay service code is associated with the network assistance security indication indicating the security procedure without network assistance is to be used; or 2) the UE-to-UE relay UE info parameter is not included, or the UE-to-UE relay UE info parameter is included and the same as the configured user info ID for the UE-to-UE relay discovery as specified in clause 5.2.7; or b) the periodic measurement timer T5113 expires, then the UE:

a) shall store the protected user info of the discoverer end UE, its validity time and the relay service code, if the announce prohibited indication is not included in the received PROSE PC5 DISCOVERY message for UE-to-UE relay discovery solicitation, or if the announce prohibited indication is included therein and its value is set to "It is not prohibited to broadcast the user info".

b) shall obtain a valid UTC time for the discovery transmission from the lower layers and generate the UTC-based counter corresponding to this UTC time;

c) shall generate a PROSE PC5 DISCOVERY message for UE-to-UE relay discovery solicitation to the discoveree end UE. In the PROSE PC5 DISCOVERY message for UE-to-UE relay discovery solicitation, the UE:

1) shall set the direct discovery set IE to the direct discovery set as included in the PROSE PC5 DISCOVERY message for UE-to-UE relay discovery solicitation received from the discoverer end UE;

2) shall set the UE-to-UE relay UE info parameter to the configured user info ID for the 5G ProSe UE-to-UE relay discovery, as specified in clause 5.2.7;

3) shall set the relay service code parameter to the relay service code parameter of the PROSE PC5 DISCOVERY message for UE-to-UE relay discovery solicitation received from the discoverer end UE;

4) shall set the Resource status indicator bit of the status indicator parameter to indicate whether or not the UE has resources available to provide a connectivity service for additional ProSe-enabled UEs;

5) shall include the MIC field computed as described in 3GPP TS 33.503 [34];

6) shall set the UTC-based counter LSB parameter to the 4 least significant bits of the UTC-based counter; and 7) shall set the ProSe direct discovery PC5 message type parameter as specified in table 10.2.1.14;

d) shall apply the DUIK, DUSK, or DUCK with the associated encrypted bitmask for the relay service code for 5G ProSe UE-to-UE relay discovery, along with the UTC-based counter, to the PROSE PC5 DISCOVERY message for whichever security mechanism(s) configured to be applied, e.g., integrity protection, message scrambling or confidentiality protection of one or more of the above parameters, as specified in 3GPP TS 33.503 [34];

e) shall set the destination layer-2 ID to the default destination layer-2 ID as specified in clause 5.2.7 and self-assign a source layer-2 ID for sending the UE-to-UE relay discovery solicitation message; and NOTE 2: The UE implementation ensures that the value of the self-assigned source layer-2 ID is different from any other self-assigned source layer-2 ID(s) in use for 5G ProSe direct communication as specified in clause 7.2, is different from any other provisioned destination layer-2 ID(s) as specified in clause 5.2, and is different from any other self-assigned source layer-2 ID in use for a simultaneous 5G ProSe discovery procedure over PC5 with a different discovery model e.g. as specified in clause 6.2.14.2.1.2, clause 6.2.15.2.1.2, clause 8.2.1.2.2.2, clause 8.2.1.2.4.2 and clause 8a.2.1.2.2.2.

NOTE 3: The UE implementation ensures that the value of the self-assigned source layer-2 ID is also different from any other self-assigned source layer-2 ID in use for a simultaneous 5G ProSe UE-to-UE relay discovery over PC5 with Model B. The source layer-2 ID is used to correlate the PROSE PC5 DISCOVERY message for UE-to-UE relay discovery response with the PROSE PC5 DISCOVERY message for UE-to-UE relay discovery solicitation, so that the UE can correctly send the PROSE PC5 DISCOVERY message for UE-to-UE relay discovery response to the discoverer end UE which initiated the Model B PROSE PC5 DISCOVERY procedure.

f) shall pass the resulting PROSE PC5 DISCOVERY message for UE-to-UE relay discovery solicitation along with the source layer-2 ID, destination layer-2 ID and an indication that the message is for 5G ProSe direct discovery to the lower layers for transmission over the PC5 interface.

For PROSE PC5 DISCOVERY message signal strength measurement, the UE manages a periodic measurement timer T5113, which is used to trigger the periodic PROSE PC5 DISCOVERY message signal strength measurement between the UE and the discoveree end UE with which the UE has a link established. It is started whenever the UE has established a direct link with a discoveree end UE and restarted whenever the UE receives the PROSE PC5 DISCOVERY message for UE-to-UE relay discovery response from the discoveree end UE with which the UE has a link established.

If the PROSE PC5 DISCOVERY message for UE-to-UE relay discovery solicitation is used to trigger the PROSE PC5 DISCOVERY message signal strength measurement between the UE and the discoveree end UE with which the UE has a link established, the UE shall start the retransmission timer T5112. If retransmission timer T5112 expires, the UE shall retransmit the PROSE PC5 DISCOVERY message for UE-to-UE relay discovery solicitation and restart timer T5112. If no response is received from the discoveree end UE with which the UE has a link established after reaching the maximum number of allowed retransmissions, the UE shall trigger the 5G ProSe direct link release procedure.

> NOTE 4: The maximum number of allowed retransmissions is UE implementation specific.

The UE shall instruct the lower layers to start monitoring for PROSE PC5 DISCOVERY messages for UE-to-UE relay discovery response from the discoveree end UE.

Upon reception of a PROSE PC5 DISCOVERY message for UE-to-UE relay discovery response, for the target relay service code of the connectivity service which the UE is authorized to respond, the UE shall use the associated DUSK, if received from the 5G DDNMF or 5G PKMF (if security procedure over user plane for 5G ProSe UE-to-UE relay is used) and the UTC-based counter obtained during the reception operation to unscramble the PROSE PC5 DISCOVERY message as described in 3GPP TS 33.503 [34]. Then, if a DUCK is received from the 5G DDNMF or 5G PKMF (if security procedure over user plane for 5G ProSe UE-to-UE relay is used), the UE shall use the DUCK and the UTC-based counter to decrypt the configured message-specific confidentiality-protected portion, as described in 3GPP TS 33.503 [34]. Finally, if a DUIK is received from the 5G DDNMF or 5G PKMF (if security procedure over user plane for 5G ProSe UE-to-UE relay is used), the UE shall use the DUIK and the UTC-based counter to verify the MIC field in the unscrambled PROSE PC5 DISCOVERY message for UE-to-UE relay discovery response.

> NOTE 5: The UE can determine the received PROSE PC5 DISCOVERY message for 5G ProSe UE-to-UE relay discovery response is for 5G ProSe direct discovery based on an indication from the lower layer.

If the relay service code parameter of the PROSE PC5 DISCOVERY message for UE-to-UE relay discovery response is the same as the relay service code parameter of the PROSE PC5 DISCOVERY message for UE-to-UE relay discovery solicitation, then the UE:

a) shall store the protected user info of the discoveree end UE, its validity time, and the relay service code, if the announce prohibited indication is not included in the received PROSE PC5 DISCOVERY message for UE-to-UE relay discovery response, or if the announce prohibited indication is included with the value set to "It is not prohibited to broadcast user info".

b) shall obtain a valid UTC time for the discovery transmission from the lower layers and generate the UTC-based counter corresponding to this UTC time;

c) shall generate a PROSE PC5 DISCOVERY message for UE-to-UE relay discovery response. In the PROSE PC5 DISCOVERY message for UE-to-UE relay discovery response, the UE:

1) shall set the direct discovery set IE to the direct discovery set as included in the PROSE PC5 DISCOVERY message for UE-to-UE relay discovery response received from the discoveree end UE;

2) shall set the UE-to-UE relay UE info parameter to the configured user info ID for the 5G ProSe UE-to-UE relay discovery, as specified in clause 5.2.7;

3) shall set the relay service code parameter to the relay service code parameter of the PROSE PC5 DISCOVERY message for UE-to-UE relay discovery response received from the discoveree end UE;

4) shall set the Resource status indicator bit of the status indicator parameter to indicate whether or not the UE has resources available to provide a connectivity service for 5G ProSe UE-to-UE relay for additional ProSe-enabled UEs;

5) shall include the MIC field computed as described in 3GPP TS 33.503 [34];

6) shall set the UTC-based counter LSB parameter to the 4 least significant bits of the UTC-based counter; and 7) shall set the ProSe direct discovery PC5 message type parameter as specified in table 10.2.1.14;

d) shall apply the DUIK, DUSK, or DUCK with the associated encrypted bitmask for the relay service code for 5G ProSe UE-to-UE relay discovery, along with the UTC-based counter to the PROSE PC5 DISCOVERY message for whichever security mechanism(s) configured to be applied, e.g., integrity protection, message scrambling or confidentiality protection of one or more of the above parameters, as specified in 3GPP TS 33.503 [34];

e) shall set the destination layer-2 ID to the source layer-2 ID from the discoverer end UE used in the transportation of the PROSE PC5 DISCOVERY message for UE-to-UE relay discovery solicitation and self-assign a source layer-2 ID for sending the UE-to-UE relay discovery response message; and > NOTE 6: The UE implementation ensures that the value of the self-assigned source layer-2 ID is different from any other self-assigned source layer-2 ID(s) in use for 5G ProSe direct communication as specified in clause 7.2 and is different from any other provisioned destination layer-2 ID(s) as specified in clause 5.2.

f) shall pass the resulting PROSE PC5 DISCOVERY message for UE-to-UE relay discovery response along with the source layer-2 ID, destination layer-2 ID and an indication that the message is for 5G ProSe direct discovery to the lower layers for transmission over the PC5 interface.

> NOTE 7: If the UE is processing a PROSE DIRECT LINK ESTABLISHMENT REQUEST message from the same source layer-2 ID of the received PROSE PC5 DISCOVERY message for UE-to-UE relay discovery solicitation, it depends on UE implementation to avoid the conflict of destination layer-2 ID (e.g. send a PROSE DIRECT LINK ESTABLISHMENT REJECT message containing PC5 signalling protocol cause value #3 "conflict of layer-2 ID for unicast communication is detected", or ignore the PROSE DIRECT DISCOVERY message for UE-to-UE relay discovery solicitation).

FIG. 8a.2.1.3.3.2.2 illustrates the interactions between the 5G ProSe UE-to-UE relay UE and discoverer end UE in the relay UE procedure for UE-to-UE relay discovery.

Figure 15:
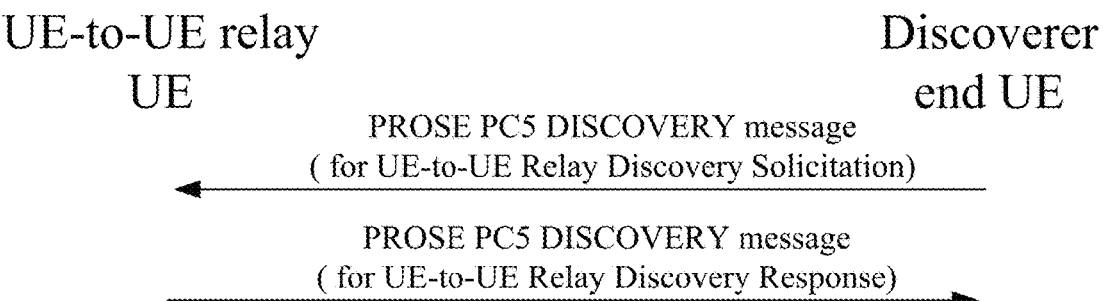
FIG. 15 is a reproduction of FIG. 8a.2.1.3.3.2.2: Relay UE procedure for UE-to-UE relay discovery with the discoverer end UE, from 3GPP TS 24.554 v18.4.0.

FIG. 15 is a Reproduction of FIG. 8a.2.1.3.3.2.2: Relay UE Procedure for UE-to-UE Relay Discovery With the Discoverer End UE, from 3GPP TS 24.554 v18.4.0.

8a.2.1.3.3.3 Relay UE Procedure for UE-to-UE Relay Discovery Completion

When the UE is triggered by the upper layers to stop responding to solicitation on proximity of a connectivity service provided by a 5G ProSe UE-to-UE relay UE, or when the UE stops being authorised to perform the relay UE procedure for UE-to-UE relay discovery, the UE shall instruct the lower layers to stop monitoring.

> NOTE: The 5G ProSe UE-to-UE relay UE can stop Relay UE procedure for UE-to-UE relay discovery for power saving by implementation specific means e.g. an implementation-specific maximum number of 5G ProSe direct links configured in the UE, or an implementation-specific timer expires.

When the UE stops monitoring, if the UE is in 5GMM-CONNECTED mode, the UE shall trigger the corresponding procedure in lower layers as specified in 3GPP TS 38.331 [13].

8a.2.1.3.4 Discoveree End UE Procedure for UE-to-UE Relay Discovery 8a.2.1.3.4.1 General The purpose of the discoveree end UE procedure for UE-to-UE relay discovery is to enable a ProSe-enabled UE to respond to solicitation from other ProSe-enabled UEs on proximity of a connectivity service via a 5G ProSe UE-to-UE relay UE, upon a request from upper layers.

8a.2.1.3.4.2 Discoveree End UE Procedure for UE-to-UE Relay Discovery Initiation The UE is authorised to perform the discoveree end UE procedure for UE-to-UE relay discovery if:

a) the UE is authorised to act as a 5G ProSe end UE in the PLMN indicated by the serving cell, and
   1) the UE is served by NG-RAN; or
   2) the UE is not served by NG-RAN and intends to use the provisioned radio resources for 5G ProSe UE-to-UE relay discovery; and
b) the UE is configured with:
   1) the relay service code parameter identifying the connectivity service to be responded to as specified in clause 5.2.7 and the indicated security procedure for the relay service code is supported by the UE; otherwise, the UE is not authorised to perform the discoveree end UE procedure for UE-to-UE relay discovery.

FIG. 8a.2.1.3.4.2.1 illustrates the interaction of the UEs in the discoveree end UE procedure for UE-to-UE relay discovery.

Figure 16:
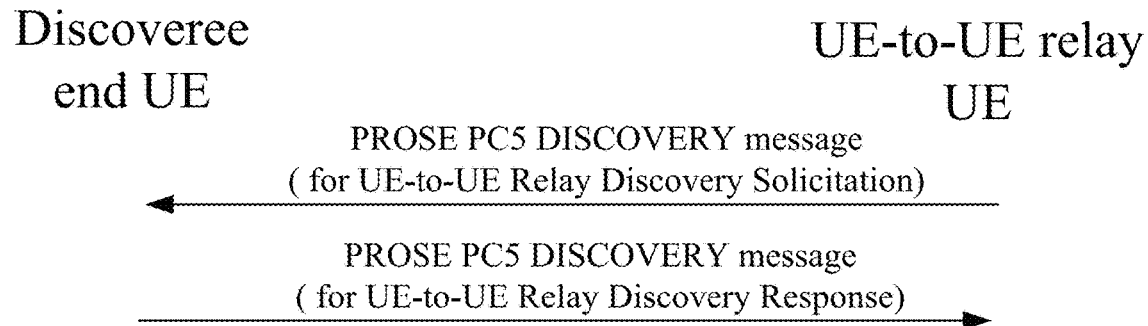
FIG. 16 is a reproduction of FIG. 8a.2.1.3.4.2.1: Discoveree end UE procedure for UE-to-UE relay discovery, from 3GPP TS 24.554 v18.4.0.

FIG. 16 is a Reproduction of FIG. 8a.2.1.3.4.2.1: Discoveree End UE Procedure for UE-to-UE Relay Discovery, from 3GPP TS 24.554 v18.4.0.

When the UE is triggered by the upper layers to start responding to solicitation on proximity of a connectivity service provided by a 5G ProSe UE-to-UE relay UE and if the UE is authorised to perform the discoveree end UE procedure for UE-to-UE relay discovery, then the UE:

a) if the UE is served by NG-RAN and the UE in 5GMM-IDLE mode needs to request resources for sending PROSE PC5 DISCOVERY messages as specified in 3GPP TS 38.331 [13], shall perform a service request procedure as specified in 3GPP TS 24.501 [11]; and
b) shall instruct the lower layers to start monitoring for PROSE PC5 DISCOVERY messages.

Upon reception of a PROSE PC5 DISCOVERY message for UE-to-UE relay discovery solicitation, for the relay service code of the connectivity service which the UE is authorized to respond, the UE shall obtain a valid UTC time from the lower layers and generate a UTC-based counter corresponding to this UTC time, and use it to recover the UTC-based counter associated with the PROSE PC5 DISCOVERY message and the UTC-based counter associated with the direct discovery set. The UE shall use the associated DUSK, if received from the 5G DDNMF or 5G PKMF (if security procedure over user plane for 5G ProSe UE-to-UE relay is used) and the UTC-based counter associated with the PROSE PC5 DISCOVERY message to unscramble the PROSE PC5 DISCOVERY message as described in 3GPP TS 33.503 [34]. Then, if a DUCK is received from the 5G DDNMF or 5G PKMF (if security procedure over user plane for 5G ProSe UE-to-UE relay is used), the UE shall use the DUCK and the UTC-based counter associated with the PROSE PC5 DISCOVERY message to decrypt the configured message-specific confidentiality-protected portion, as described in 3GPP TS 33.503 [34]. Finally, if a DUIK is received from the 5G DDNMF or 5G PKMF (if security procedure over user plane for 5G ProSe UE-to-UE relay is used), the UE shall use the DUIK and the UTC-based counter associated with the PROSE PC5 DISCOVERY message to verify the MIC field in the unscrambled PROSE PC5 DISCOVERY message for UE-to-UE relay discovery solicitation.

The UE shall further use the DUSK in code-receiving security parameter for the ProSe service which the UE is authorized for discovery (see clause 6.2.6) and the UTC-based counter associated with the direct discovery set to unscramble the direct discovery set IE in the PROSE PC5 DISCOVERY message as described in 3GPP TS 33.503 [34]. Then if a DUCK is included in the code-receiving security parameter, the UE shall use the DUCK and the UTC-based counter associated with the direct discovery set to decrypt the direct discovery set IE, as described in 3GPP TS 33.503 [34]. The UE shall verify whether the application layer ID of the discoveree end UE in the decrypted direct discovery set matches the application layer ID of the UE as provided by the upper layers; if not, the UE shall discard the direct discovery set. Finally, if the application layer IDs match and a DUIK is included in the code-receiving security parameter, the UE shall use the DUIK and the UTC-based counter associated with the direct discovery set to verify the MIC for the direct discovery set IE in the PROSE PC5 DISCOVERY message for UE-to-UE relay discovery solicitation.

NOTE 1: The UE can determine the received PROSE PC5 DISCOVERY message for 5G ProSe UE-to-UE relay discovery solicitation is for 5G ProSe direct discovery based on an indication from the lower layer.

Then, if:

a) the relay service code parameter of the received PROSE PC5 DISCOVERY message for UE-to-UE relay discovery solicitation is the same as the relay service code parameter configured as specified in clause 5.2.7 for the connectivity service; and
b) the application layer ID of discoveree end UE in the received PROSE PC5 DISCOVERY message for UE-to-UE relay discovery solicitation is the same as the application layer ID of the UE provided by upper layers;

then the UE:

a) shall obtain a valid UTC time for the discovery transmission from the lower layers and generate the UTC-based counter corresponding to this UTC time;
b) shall generate a PROSE PC5 DISCOVERY message for UE-to-UE relay discovery response. In the PROSE PC5 DISCOVERY message for UE-to-UE relay discovery response, the UE:
   1) shall include the direct discovery set IE which contains:
      i) the discoveree user info parameter set to the application layer ID of the UE provided by the upper layers, which is the same as the application layer ID of the discoveree end UE received in the PROSE PC5 DISCOVERY message for UE-to-UE relay discovery solicitation, the corresponding MIC field computed as described in 3GPP TS 33.503 [34] for the discoveree user info, and the corresponding UTC-based counter LSB parameter set to the 4 least significant bits of the UTC-based counter; and;

ii) the discoverer user info parameter set to the application layer ID of the discoverer end UE received in the PROSE PC5 DISCOVERY message for UE-to-UE relay discovery solicitation from the 5G ProSe UE-to-UE relay UE, the corresponding MIC field computed as described in 3GPP TS 33.503 [34] for the discoverer user info, and the corresponding UTC-based counter LSB parameter set to the 4 least significant bits of the UTC-based counter;

and shall apply the DUIK, DUSK or DUCK with the associated encrypted bitmask in the code-sending security parameter for the ProSe service received from the DDNMF (see clause 6.2), along with the UTC-based counter, to each user info as specified in 3GPP TS 33.503 [34];

2) void;

3) shall set the relay service code parameter to the relay service code parameter of the PROSE PC5 DISCOVERY message for UE-to-UE relay discovery solicitation;

4) shall include the MIC field computed as described in 3GPP TS 33.503 [34];

5) shall set the UTC-based counter LSB parameter to the 4 least significant bits of the UTC-based counter; and 6) shall set the ProSe direct discovery PC5 message type parameter as specified in table 10.2.1.14; and 7) shall include the announce prohibited indication with its value set as "It is prohibited to broadcast the user info" in the PC5 DISCOVERY message for UE-to-UE relay discovery response if the discoveree UE needs to indicate to the 5G ProSe UE-to-UE relay UE that it is prohibited from broadcasting user info of the discoveree end UE included in the direct discovery set during the procedure of 5G ProSe UE-to-UE relay discovery over PC5 interface with model A;

c) shall apply the DUIK, DUSK, or DUCK with the associated encrypted bitmask for the relay service code for 5G ProSe UE-to-UE relay discovery, along with the UTC-based counter, to the PROSE PC5 DISCOVERY message for whichever security mechanism(s) configured to be applied, e.g., integrity protection, message scrambling or confidentiality protection of one or more of the above parameters, as specified in 3GPP TS 33.503 [34];

d) shall set the destination layer-2 ID to the source layer-2 ID from the 5G ProSe UE-to-UE relay UE used in the transportation of the PROSE PC5 DISCOVERY message for UE-to-UE relay discovery solicitation and self-assign a source layer-2 ID for sending the UE-to-UE relay discovery response message; and NOTE 2: The UE implementation ensures that the value of the self-assigned source layer-2 ID is different from any other self-assigned source layer-2 ID(s) in use for 5G ProSe direct communication as specified in clause 7.2 and is different from any other provisioned destination layer-2 ID(s) as specified in clause 5.2.

e) shall pass the resulting PROSE PC5 DISCOVERY message for UE-to-UE relay discovery response along with the source layer-2 ID, destination layer-2 ID and an indication that the message is for 5G ProSe direct discovery to the lower layers for transmission over the PC5 interface.

8a.2.1.3.4.3 Discoveree End UE Procedure for UE-to-UE Relay Discovery Completion When the UE is triggered by the upper layers to stop responding to solicitation on proximity of a connectivity service via a 5G ProSe UE-to-UE relay UE, or when the UE stops being authorised to perform the discoveree end UE procedure for UE-to-UE relay discovery, the UE shall instruct the lower layers to stop monitoring.

When the UE stops monitoring, if the UE is in 5GMM-CONNECTED mode, the UE shall trigger the corresponding procedure in lower layers as specified in 3GPP TS 38.331 [13].

8a.2.3 5G ProSe UE-to-UE Relay Reselection Procedure 8a.2.3.1 General

The purpose of the 5G ProSe UE-to-UE relay reselection procedure is to enable a 5G ProSe end UE to reselect a 5G ProSe UE-to-UE relay UE to obtain a connectivity service to another 5G ProSe end UE when the serving 5G ProSe UE-to-UE relay UE is no longer suitable.

8a.2.3.2 UE-to-UE Relay Reselection Procedure Initiation

The 5G ProSe end UE shall trigger the UE-to-UE relay reselection procedure if one of the following conditions is met:

a) the UE has received an indication from lower layers that the serving 5G ProSe UE-to-UE relay UE no longer fulfills the lower layers criteria as specified in 3GPP TS 38.300 [21];

b) the parameters related to 5G ProSe UE-to-UE relay in the configuration parameters for 5G ProSe UE-to-UE relay as specified in clause 5.2.7 (e.g., relay service code, etc.) have been updated and the serving 5G ProSe UE-to-UE relay UE no longer fulfills the conditions specified in clause 8a.2.2.2;

c) the UE has received a PROSE DIRECT LINK ESTABLISHMENT REJECT message from the 5G ProSe UE-to-UE relay UE with the PC5 signalling protocol cause value #1 "direct communication to the target UE not allowed";

d) the UE has received a PROSE DIRECT LINK RELEASE REQUEST message from the 5G ProSe UE-to-UE relay UE with the PC5 signalling protocol cause value #1 "direct communication to the target UE not allowed";

e) the UE has received a PROSE DIRECT LINK RELEASE REQUEST message from the 5G ProSe UE-to-UE relay UE with the PC5 signalling protocol cause value #4 "direct connection is not available anymore";

f) the UE has not received any response from the 5G ProSe UE-to-UE relay UE after M consecutive retransmissions of PROSE DIRECT LINK ESTABLISHMENT REQUEST or PROSE DIRECT LINK KEEPALIVE REQUEST messages;

g) the UE has not received any response from the 5G ProSe UE-to-UE relay UE after M consecutive retransmissions of PROSE PC5 DISCOVERY message for UE-to-UE relay discovery solicitation used to trigger the PROSE PC5 DISCOVERY message signal strength measurement between the UE and the 5G ProSe UE-to-UE relay UE with which the UE has a link established;

NOTE 1: The value of M is implementation specific and is less than or equal to the maximum number of retransmissions allowed for PC5 signalling protocol.

h) the UE has received a PROSE DIRECT LINK ESTAB-
LISHMENT REJECT message from the 5G ProSe
UE-to-UE relay UE with the PC5 signalling protocol
cause value #13 "congestion situation";

i) the UE has received a PROSE DIRECT LINK
RELEASE REQUEST message from the 5G ProSe
UE-to-UE relay UE with the PC5 signalling protocol
cause value #13 "congestion situation"; or j) the UE has received a PROSE DIRECT LINK ESTAB-
LISHMENT REJECT message from the 5G ProSe
UE-to-UE relay UE with the PC5 signalling protocol
cause value #22 "security procedure failure of 5G
ProSe UE-to-UE relay".

In cases c), d), h), i) and j), the 5G ProSe end UE shall
exclude the 5G ProSe UE-to-UE relay UE which sent the
message specified in cases c), d), h), i) or j) from the
UE-to-UE relay reselection process described below (at least
for the indicated back-off time period if provided from the
ProSe UE-to-UE relay UE in cases h) and i)).

To conduct UE-to-UE relay reselection process, the UE
shall first initiate one of the following procedures or both:

a) monitoring UE relay discovery for UE-to-UE relay
discovery as specified in clause 8a.2.1.2.3; or b) discoverer end UE procedure for UE-to-UE relay
discovery as specified in clause 8a.2.1.3.2.

After the execution of the above discovery procedure(s),
the 5G ProSe end UE, based on UE implementation, may
perform the 5G ProSe direct link modification procedure for
the negotiated 5G ProSe UE-to-UE relay reselection or may
perform the 5G ProSe direct link establishment procedure
with the selected 5G ProSe UE-to-UE relay UE.

8a.2.3.3 Candidate 5G ProSe UE-to-UE Relay Discovery
Procedure

The purpose of the candidate 5G ProSe UE-to-UE relay
discovery procedure is to support the target 5G ProSe end
UE to discover the candidate 5G ProSe UE-to-UE relay UE
when the target 5G ProSe end UE needs to discover the
candidate 5G ProSe UE-to-UE relay UE for the negotiated
5G ProSe layer-3 UE-to-UE relay reselection, as specified in
clause 6.7.4 of 3GPP TS 23.304 [2]. This procedure is based
on UE-to-UE relay discovery over PC5 interface with model
B procedure as specified in clause 8a.2.1.3 with the follow-
ing modifications:

a) when the target 5G ProSe end UE as a discoverer UE
generates a PROSE PC5 DISCOVERY message for
UE-to-UE relay discovery solicitation, in the PROSE
PC5 DISCOVERY message for UE-to-UE relay dis-
covery solicitation, the UE shall:

1) set the relay service code parameter to the relay
service code parameter currently being used with the
serving 5G UE-to-UE relay UE for which the UE-to-
UE relay reselection is needed;

2) set the UE-to-UE relay UE info parameter to user
info ID for the candidate 5G ProSe UE-to-UE relay
UE; and 3) not include the direct discovery set parameter, and shall set the destination layer-2 ID to the destination
layer-2 ID of the candidate 5G ProSe UE-to-UE relay
UE as received in the PROSE DIRECT LINK MODI-
FICATION REQUEST message during the negotiated
5G ProSe layer-3 UE-to-UE relay reselection procedure. If there is no layer-2 ID of the candidate 5G ProSe
UE-to-UE relay UE received in the PROSE DIRECT
LINK MODIFICATION REQUEST message during
the negotiated 5G ProSe layer-3 UE-to-UE relay rese-
lection procedure, the UE shall set the destination
layer-2 ID to the default layer-2 ID for discovery as
specified in clause 5.2.7;

b) when the 5G ProSe UE-to-UE relay UE receives the
PROSE PC5 DISCOVERY message for UE-to-UE
relay discovery solicitation, the 5G ProSe UE-to-UE
relay does not perform the Relay UE procedure for
UE-to-UE relay discovery if:

1) the PROSE PC5 DISCOVERY message for UE-to-
UE relay discovery solicitation does not include the
direct discovery set parameter; and 2) the UE-to-UE relay UE info parameter in the
PROSE PC5 DISCOVERY message for UE-to-UE
relay discovery solicitation matches with the user
info ID for 5G ProSe UE-to-UE relay UE;

c) after b), the 5G ProSe UE-to-UE relay UE shall send
the PROSE PC5 DISCOVERY message for UE-to-UE
relay discovery response to the discoverer UE. In the
PROSE PC5 DISCOVERY message for UE-to-UE
relay discovery response, the UE shall:

1) set the relay service code parameter to the relay
service code parameter of the PROSE PC5 DISCOV-
ERY message for UE-to-UE relay discovery solici-
tation received from the target 5G ProSe end UE; and 2) not include the direct discovery set parameter; and d) after c), when the target 5G ProSe end UE receives the
PROSE PC5 DISCOVERY message for UE-to-UE
relay discovery response and if 1) the relay service code parameter of the PROSE PC5
DISCOVERY message for UE-to-UE relay discov-
ery response is the same as the relay service code
parameter of the PROSE PC5 DISCOVERY mes-
sage for UE-to-UE relay discovery solicitation;

b) the direct discover set parameter of the PROSE PC5
DISCOVERY message for UE-to-UE relay discov-
ery response is not included; and c) the UE-to-UE relay UE info parameter of the
PROSE PC5 DISCOVERY message for UE-to-UE
relay discovery response is the same as the user info
ID for the candidate 5G ProSe UE-to-UE relay UE of
the PROSE PC5 DISCOVERY message for UE-to-
UE relay discovery solicitation, then the 5G ProSe end UE shall consider the candidate 5G
ProSe UE-to-UE relay UE is discovered, and proceed
the 5G ProSe direct link modification procedure for
UE-to-UE relay UE reselection.

10.2.1 Message Definition

This message is sent by the UE over the PC5 interface for
open 5G ProSe direct discovery and restricted 5G ProSe
direct discovery. See table 10.2.1.1, table 10.2.1.2, table
10.2.1.3, table 10.2.1.4, table 10.2.1.5, table 10.2.1.6, table
10.2.1.7, table 10.2.1.8, table 10.2.1.9, table 10.2.1.10, table
10.2.1.11, table 10.2.1.12, table 10.2.1.13, and table
10.2.1.14.

Message type: PROSE PC5 DISCOVERY
Significance: dual
Direction: UE to peer UE

TABLE 10.2.1.13

PROSE PC5 DISCOVERY message for UE-to-UE relay discovery solicitation

| IEI | Information Element | Type/Reference | Presence | Format | Length |
|-----|---------------------|----------------|----------|--------|--------|
| | ProSe direct discovery PC5 message type (NOTE 1) | ProSe direct discovery PC5 message type 11.2.1 | M | V | 1 |
| | UTC-based counter LSB | UTC-based counter LSB 11.2.11 | M | V | 1 |
| | MIC | MIC 11.2.4 | M | V | 4 |
| | Relay service code | Relay service code 11.2.8 | M | V | 3 |
| | Direct discovery set | Direct discovery set 11.2.17 | M | LV-E | 12-520 |
| 2C | UE-to-UE relay UE info | User info ID 11.2.7 | O | TLV | 8 |
| 2D | Status indicator | Status indicator 11.2.9 | O | TV | 2 |
| 8 | Announce prohibited indication | Announce prohibited indication 11.2.y | O | TV | 1 |

1. (NOTE 1):

The discovery type is set to "Restricted discovery", the content type is set to "UE-to-UE relay discovery solicitation" and the discovery model is set to "Model B".

TABLE 10.2.1.14

PROSE PC5 DISCOVERY message for UE-to-UE relay discovery response

| IEI | Information Element | Type/Reference | Presence | Format | Length |
|-----|---------------------|----------------|----------|--------|--------|
| | ProSe direct discovery PC5 message type (NOTE 1) | ProSe direct discovery PC5 message type 11.2.1 | M | V | 1 |
| | UTC-based counter LSB | UTC-based counter LSB 11.2.11 | M | V | 1 |
| | MIC | MIC 11.2.4 | M | V | 4 |
| | Relay service code | Relay service code 11.2.8 | M | V | 3 |
| | Direct discovery set | Direct discovery set 11.2.17 | M | LV-E | 12-520 |
| 2C | UE-to-UE relay UE info | User info ID 11.2.7 | O | TLV | 8 |
| 2D | Status indicator | Status indicator 11.2.9 | O | TV | 2 |
| 8- | Announce prohibited indication | Announce prohibited indication 11.2.y | O | TV | 1 |

(NOTE 1):

The discovery type is set to "Restricted discovery", the content type is set to "UE-to-UE relay discovery response" and the discovery model is set to "Model B".

11.2.1 ProSe Direct Discovery PC5 Message Type

This parameter is used to indicate the type of ProSe direct discovery message over PC5 interface.

This parameter is coded as shown in FIG. 11.2.1.1 and table 11.2.1.1.

The ProSe direct discovery PC5 message type is a type 1 information element, with the length of 1 octet.

Figure 17:
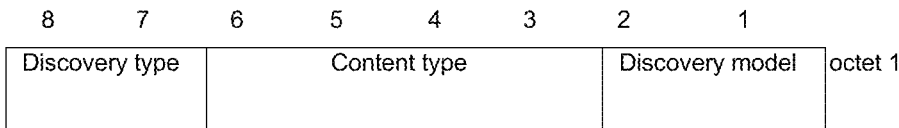
FIG. 17 is a reproduction of FIG. 11.2.1.1: ProSe direct discovery PC5 message type parameter, from 3GPP TS 24.554 v18.4.0.

FIG. 17 is a Reproduction of FIG. 11.2.1.1: ProSe Direct Discovery PC5 Message Type Parameter, from 3GPP TS 24.554 v18.4.0.

TABLE 11.2.1.1

ProSe direct discovery PC5 message type parameter

Discovery type value (octet 1):

| Bit | | |
| --- | --- | --- |
| 8 | 7 | |
| 0 | 0 | Reserved |
| 0 | 1 | Open discovery |
| 1 | 0 | Restricted discovery |
| 1 | 1 | Reserved |

Content type value (octet 1):

| Bit | | | | |
| --- | --- | --- | --- | --- |
| 6 | 5 | 4 | 3 | |
| 0 | 0 | 0 | 0 | Announcement/response |
| 0 | 0 | 0 | 1 | Solicitation |
| 0 | 0 | 1 | 0 | UE-to-UE relay discovery announcement/UE-to-UE relay discovery response |
| 0 | 0 | 1 | 1 | UE-to-UE relay discovery solicitation |
| 0 | 1 | 0 | 0 | UE-to-network relay discovery announcement/UE-to-network relay discovery response |
| 0 | 1 | 0 | 1 | UE-to-network relay discovery solicitation |
| 0 | 1 | 1 | 0 | Group member discovery announcement/group member discovery response |
| 0 | 1 | 1 | 1 | Group member discovery solicitation |
| 1 | 0 | 0 | 0 | Relay discovery additional information |
| 1 | 0 | 0 | 1 | Ranging and sidelink positioning UE discovery announcement/Ranging and sidelink positioning UE discovery response |
| 1 | 0 | 1 | 0 | Ranging and sidelink positioning UE discovery solicitation |
| 1 | 0 | 1 | 1 | Group member discovery announcement for ranging and sidelink positioning/group member discovery response for ranging and sidelink positioning |
| 1 | 1 | 0 | 0 | Group member discovery solicitation for ranging and sidelink positioning |
| | | | | The other values are reserved. |

TABLE 11.2.1.1-continued

ProSe direct discovery PC5 message type parameter

Discovery model value (octet 1):

| Bit | | |
| --- | --- | --- |
| 2 | 1 | |
| 0 | 0 | Reserved |
| 0 | 1 | Model A |
| 1 | 0 | Model B |
| 1 | 1 | Reserved |

NOTE 1:
Content type '0000' (announce/response) is used for model A announcing and for model B discoveree operation.
NOTE 2:
Content type '0100' (UE-to-network relay discovery announcement or UE-to-network relay discovery response) is used for model A announcing and for model B discoveree operation.
NOTE 3:
Content type '0110' (group member discovery announcement or group member discovery response) is used for model A announcing and for model B discoveree operation.
NOTE 4:
Content type '1001' (ranging and sidelink positioning UE discovery announcement/ Ranging and sidelink positioning UE discovery response) is used for model A announcing and for model B discoveree operation.
NOTE 5:
Content type '1011' (group member discovery announcement for ranging and sidelink positioning/group member discovery response for ranging and sidelink positioning) is used for model A announcing and for model B discoveree operation.

11.2.15 Application Layer ID

The purpose of the application layer ID parameter information element carries an application layer ID as specified in 3GPP TS 23.304 [2].

The application layer ID information element is coded as shown in FIG. 11.2.15.1 and table 11.2.15.1.

The application layer ID is a type 4 information element.

Figure 18:
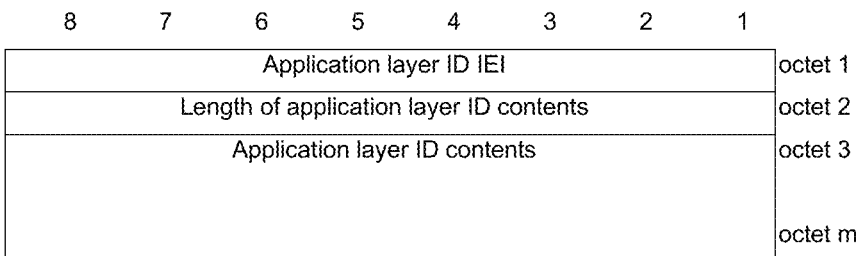
FIG. 18 is a reproduction of FIG. 11.2.15.1: Application layer ID information element, from 3GPP TS 24.554 v18.4.0.

FIG. 18 is a Reproduction of FIG. 11.2.15.1: Application Layer ID Information Element, from 3GPP TS 24.554 v18.4.0.

TABLE 11.2.15.1

Application layer ID information element

The length of application layer ID contents field contains the binary coded representation of the length of the application layer ID contents field. The application layer ID contents field contains the octets indicating the application layer ID. The format of the application layer ID parameter is out of scope of this specification.

11.2.17 Direct Discovery Set

The purpose of the direct discovery set information element is to carry the direct discovery set as specified in 3GPP TS 33.503 [34].

The direct discovery set information element is a type 6 information element with the minimum length of 12 octets and the maximum length of 520 octets.

The direct discovery set information element is coded as shown in FIG. 11.2.17.1 and table 11.2.17.1.

Figure 19:
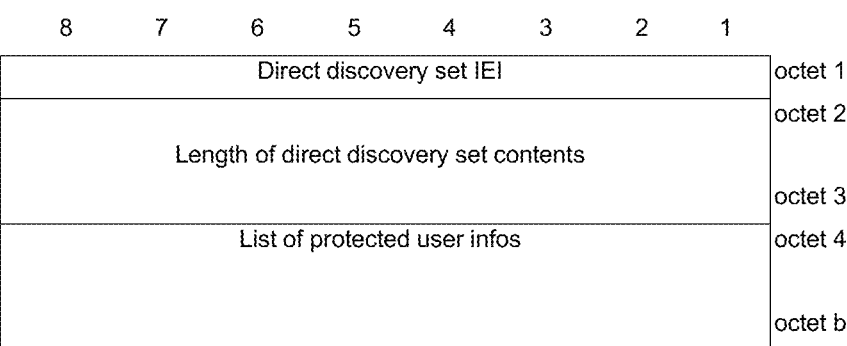
FIG. 19 is a reproduction of FIG. 11.2.17.1: Direct discovery set information element, from 3GPP TS 24.554 v18.4.0.

FIG. 19 is a Reproduction of FIG. 11.2.17.1: Direct Discovery Set Information Element, from 3GPP TS 24.554 v18.4.0.

Figure 20:
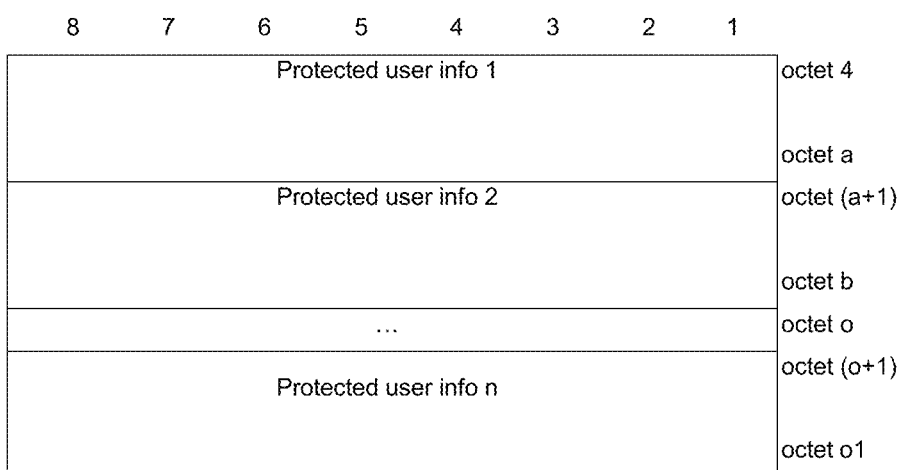
FIG. 20 is a reproduction of FIG. 11.2.17.2: List of Protected user info ID, from 3GPP TS 24.554 v18.4.0.

FIG. 20 is a Reproduction of FIG. 11.2.17.2: List of Protected User Info ID, from 3GPP TS 24.554 v18.4.0.

Figure 21:
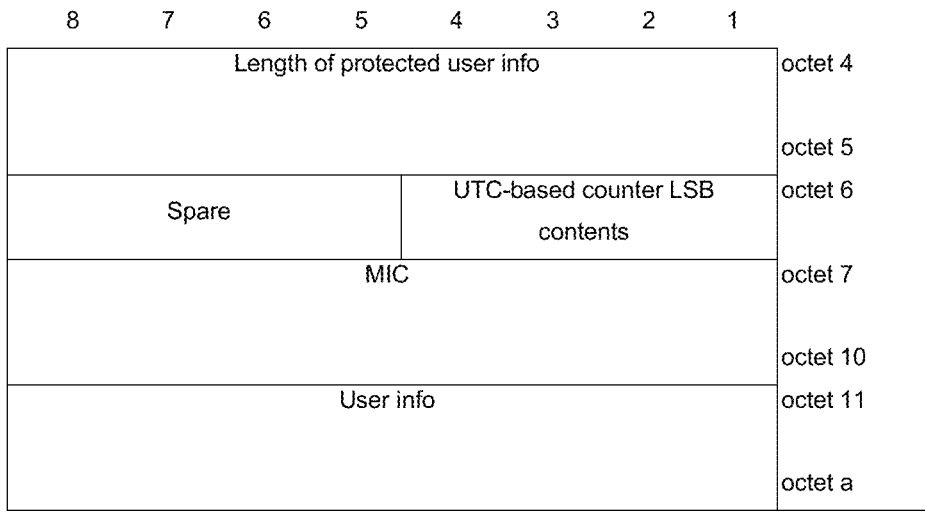
FIG. 21 is a reproduction of FIG. 11.2.17.3: Protected user info, from 3GPP TS 24.554 v18.4.0.

FIG. 21 is a Reproduction of FIG. 11.2.17.3: Protected User Info, from 3GPP TS 24.554 v18.4.0.

TABLE 11.2.17.1

| Direct discovery set information element |
| --- |
| UTC-based counter LSB (bits 1 to 4 of octet b + 5)<br>The UTC-based counter LSB field contains the four least significant bits of the UTC-based counter associated with the discovery transmission opportunity used by the UE. UTC-based counter LSB field is coded as the value part of UTC-based counter LSB information element as specified in clause 11.2.11.<br>MIC (octet 7 to 10)<br>The MIC field contains the MIC (Message Integrity Check) for integrity protection of the direct discovery set. MIC field is coded as the value part of MIC information element as specified in clause 11.3.38.<br>User info (octet 4 to a)<br>The user info field is discoveree user info or discoverer user info containing the Application layer ID of the 5G ProSe end UE. The encrypted user info field is coded as the length and value part of Application layer ID information element as specified in clause 11.2.15 starting with the second octet.<br>Bits 5 to 8 of octet (b + 5) are spare and shall be coded as zero. |

Quotation Start

User Equipment (UE)-to-UE (U2U) Relays were specified in Release 18. A relay UE may be used to support connectivity between an end UE and a peer UE if the end UE cannot communicate with the peer UE directly. In order to find the peer end UE, the end UE may first initiate the U2U relay discovery procedure. According to [1][TS23.304] 3GPP TS 23.304 v18.5.1, for U2U relay discovery, two models of discovery, model A and model B, are supported. For model A, a PROSE PC5 DISCOVERY message for a UE-to-UE relay discovery announcement is used. The 5G Proximity Services (ProSe) UE-to-UE relay UE announces the direct discovery set, which includes the user info of other end UEs that are in proximity of this relay UE, while the 5G ProSe end UEs monitor the announcement message and save the user info of the UEs in proximity of that relay UE. As for model B, the discoverer 5G ProSe UE-to-UE end UE sends a PROSE PC5 DISCOVERY message for UE-to-UE relay discovery solicitation with the direct discovery set, which includes the user info of the discoverer 5G ProSe end UE and the discoveree 5G ProSe end UE. In response to reception of the PROSE PC5 DISCOVERY message for UE-to-UE relay discovery solicitation from the discoverer 5G ProSe UE-to-UE end UE, the 5G ProSe UE-to-UE Relay may then send another PROSE PC5 DISCOVERY message for UE-to-UE relay discovery solicitation. In response to reception of the PROSE PC5 DISCOVERY message for UE-to-UE relay discovery solicitation from the 5G ProSe UE-to-UE Relay, the discoveree 5G ProSe end UE may send a PROSE PC5 DISCOVERY message for a UE-to-UE relay discovery response back to the 5G ProSe UE-to-UE Relay, and then the 5G ProSe UE-to-UE Relay may send another PROSE PC5 DISCOVERY message for a UE-to-UE relay discovery response back to the discoverer 5G ProSe end UE.

After performing the U2U relay discovery, a first end UE (i.e., source (5G ProSe UE-to-UE) end UE) could then trigger a layer-2 link establishment procedure (as introduced in e.g., clause 6.7.1.1 or clause 6.7.2 in [1][TS23.304]) for supporting U2U relay communication between the first end UE and a second end UE (i.e., target (5G ProSe UE-to-UE) end UE) via a relay UE. When the relay UE becomes no longer suitable (e.g., the measured signal strength of the PC5 unicast link with the relay UE), the first end UE may trigger a negotiated relay reselection procedure to determine another suitable relay UE for keeping the connectivity service with the target end UE. The first end UE could first discover/find the other relay UEs in proximity, determine candidate relay UEs, and send a Link Modification Request message for indicating a list of candidate relay UEs to the second end UE via the current relay UE. It is noted that the list of candidate relay UEs may just indicate one candidate relay UE.

After receiving the list of candidate relay UEs, the second end UE could initiate the candidate U2U relay discovery to find which candidate relay UE listed in the list of candidate relay UEs is in proximity of the second end UE. As specified in [1][TS23.304], the candidate U2U relay discovery reuse the U2U relay discovery with model B procedure with some modifications. That is, the second end UE could send each 5G ProSe UE-to-UE Relay Discovery Solicitation message to one candidate relay UE listed in the list of candidate relay UEs. It is noted that in this case, a Direct Discovery set is not included in such a 5G ProSe UE-to-UE Relay Discovery Solicitation message and thus the candidate relay UE can know that this 5G ProSe UE-to-UE Relay Discovery Solicitation message is used for candidate U2U relay discovery (as introduced in clause 6.3.2.4.4 in [1][TS23.304]) rather than general U2U relay discovery (as introduced in clause 6.3.2.4.3 in [1][TS23.304]). If a candidate relay UE matches (the value e.g., user info ID of this candidate relay UE indicated in) the UE-to-UE Relay Discovery set, the candidate relay UE could then respond with a 5G ProSe UE-to-UE Relay Discovery Response message to the second end UE. The 5G ProSe UE-to-UE Relay Discovery Response message also does not include a Direct Discovery set. It is also specified in clause 8a.2.3.3 of [2][TS24.554] that both a PROSE PC5 DISCOVERY message for UE-to-UE relay discovery solicitation and a PROSE PC5 DISCOVERY message for UE-to-UE relay discovery response are sent without including the direct discovery set parameter. However, in section 10.2.1 of [2][TS24.554], the presence of direct discovery set Information Element (IE) is mandatory in both the PROSE PC5 DISCOVERY message for the UE-to-UE relay discovery solicitation message and the PROSE PC5 DISCOVERY message for the UE-to-UE relay discovery response message. An IE being mandatory in a message means that the receiving side expects to decode that IE when processing the message and thus the transmitting side must include that IE in the message. If the second end UE follows this concept, the second end UE may still include the direct discovery set IE in a PROSE PC5 DISCOVERY message for the UE-to-UE relay discovery solicitation message (in response to reception of the list of candidate relay UEs from the first end UE). According to clause 8a.2.3.3 of [2][TS24.554], the 5G ProSe UE-to-UE relay does not perform the Relay UE procedure for UE-to-UE relay discovery if: 1) the PROSE PC5 DISCOVERY message for UE-to-UE relay discovery solicitation does not include the direct discovery set parameter, and 2) the UE-to-UE relay UE info parameter in the PROSE PC5 DISCOVERY message for UE-to-UE relay discovery solicitation matches with the user info ID for 5G the ProSe UE-to-UE relay UE. Thus, each candidate relay UE may perform the Relay UE procedure for UE-to-UE relay discovery if the second end UE still includes the direct discovery set IE in the PROSE PC5 DISCOVERY message for the UE-to-UE relay discovery solicitation message (since the condition 1) is not satisfied), and then respond a PROSE PC5 DISCOVERY message for the UE-to-UE relay discovery response message to the second end UE. On the other hand, according to clause 8a.2.3.3 of [2][TS24.554], the 5G ProSe end UE shall consider the candidate 5G ProSe UE-to-UE relay UE is discovered and proceed with the 5G ProSe direct link modification procedure for UE-to-UE relay UE reselection at least if the direct discover set parameter of the PROSE PC5 DISCOVERY message for the UE-to-UE relay discovery response message is not included. Thus, the second end UE would not consider any candidate relay UE is discovered if each candidate relay UE follows the above concept to include the direct discover set in a PROSE PC5 DISCOVERY message for the UE-to-UE relay discovery response message and the second end UE receives the PROSE PC5 DISCOVERY message for the UE-to-UE relay discovery response message from this candidate relay UE. To this end, the second end UE may respond with a link modification reject message to the first end UE and thus the negotiated relay reselection will fail and the U2U relay communication would be then interrupted. To address the issue, some potential solutions may be considered.

It is possible that a new type of ProSe direct discovery PC5 message(s) not including a direct discovery set IE (or (presence of) the direct discovery set IE is optional) may be considered. The new type of ProSe direct discovery PC5 message(s) may be or include a new PROSE PC5 DISCOVERY message for the UE-to-UE candidate relay discovery solicitation message. The new type of ProSe direct discovery PC5 message(s) may be or include a new PROSE PC5 DISCOVERY message for the UE-to-UE candidate relay discovery response message.

For example, a difference between the new PROSE PC5 DISCOVERY message for the UE-to-UE candidate relay discovery solicitation message and the legacy PROSE PC5 DISCOVERY message for the UE-to-UE candidate relay discovery solicitation message may be that the new PROSE PC5 DISCOVERY message for the UE-to-UE candidate relay discovery solicitation message may not include the direct discovery set IE (or (presence of) the direct discovery set IE is optional). Remaining parts of the new PROSE PC5 DISCOVERY message for the UE-to-UE candidate relay discovery solicitation message may be the same as the legacy PROSE PC5 DISCOVERY message for the UE-to-UE candidate relay discovery solicitation message.

For example, a difference between the new PROSE PC5 DISCOVERY message for the UE-to-UE candidate relay discovery response message and the legacy PROSE PC5 DISCOVERY message for the UE-to-UE candidate relay discovery response message may be that the new PROSE PC5 DISCOVERY message for the UE-to-UE candidate relay discovery response message may not include the direct discovery set IE (or (presence of) the direct discovery set IE is optional). Remaining parts of the new PROSE PC5 DISCOVERY message for the UE-to-UE candidate relay discovery response message may be the same as the legacy PROSE PC5 DISCOVERY message for the UE-to-UE candidate relay discovery response message.

Since the transmission and reception of the new type of ProSe direct discovery PC5 message(s) may have backward compatibility issues, the first end UE may (only) include candidate relay UE(s) that support the new type of ProSe direct discovery PC5 message(s) into the list of candidate relay UEs (in a Link Modification Request message). The first end UE may not include candidate relay UE(s) that do support the new type of ProSe direct discovery PC5 message(s) into the list of candidate relay UEs (in the Link Modification Request message). A candidate relay UE may indicate whether it supports the transmission and reception of the new type of ProSe direct discovery PC5 message(s). Whether the candidate relay UE supports the transmission and reception of the new type of ProSe direct discovery PC5 message(s) may be indicated by a PROSE PC5 DISCOVERY message for a UE-to-UE relay discovery announcement (e.g., adding a new IE, an indication for candidate discovery supported). Additionally and/or alternatively, whether the candidate relay UE supports the transmission and reception of the new type of ProSe direct discovery PC5 message(s) may be indicated by a PROSE PC5 DISCOVERY message for the UE-to-UE relay discovery response (e.g., adding a new IE, an indication for candidate discovery supported). After recognizing these new relay UEs, the first end UE could send the link modification request message with the candidate relay UE list to the second end UE. The link modification request message may indicate that (which or all) candidate relay UE(s) in the candidate relay UE list support the transmission and reception of the new type of ProSe direct discovery PC5 message(s).

Figure 22:
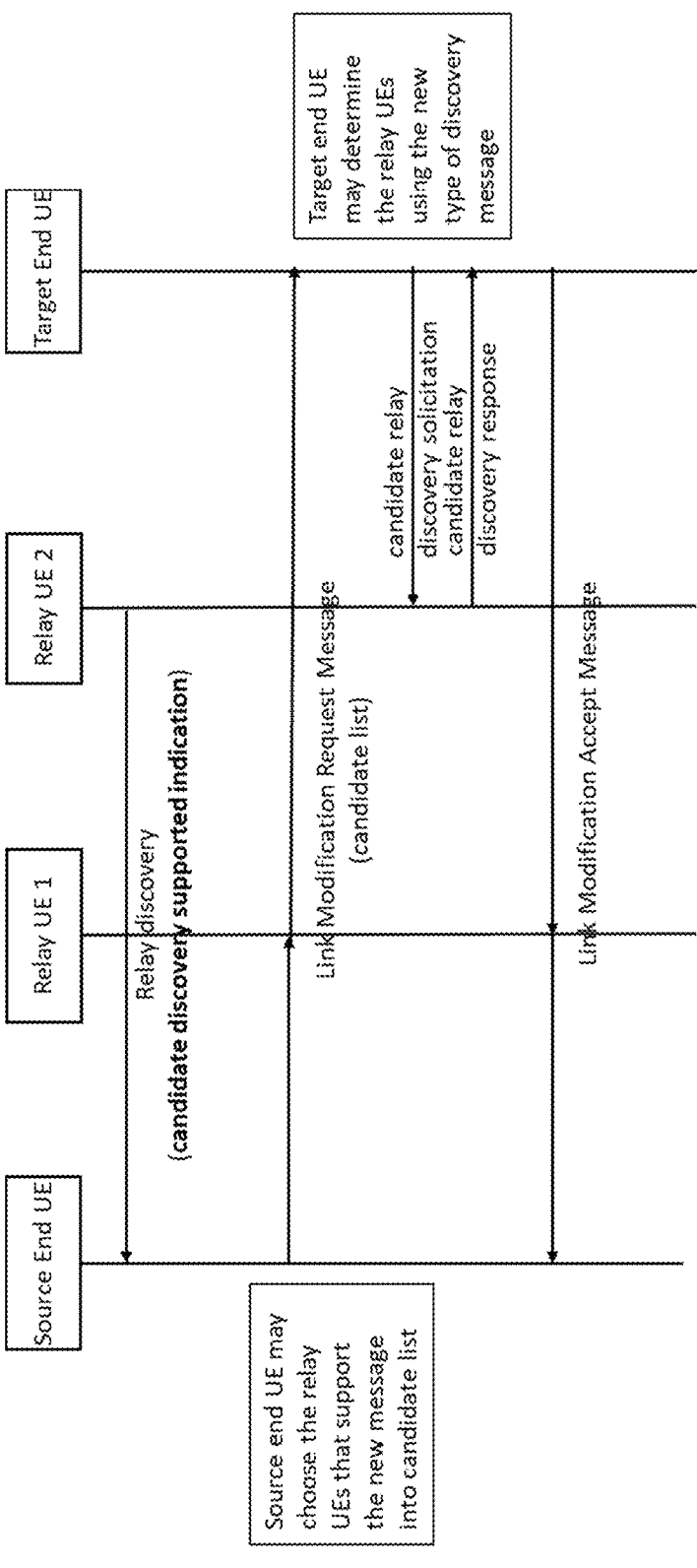
FIG. 22 is an example diagram showing 5G ProSe UE-to-UE Relay reselection, wherein a second end UE could perform the candidate U2U relay discovery procedure, in accordance with embodiments of the present invention.

The second end UE could perform the candidate U2U relay discovery procedure. The second end UE could transmit the new PROSE PC5 DISCOVERY message for the UE-to-UE candidate relay discovery solicitation message (to the candidate relay UE(s) in the candidate relay UE list). The candidate relay UE(s) (in the candidate relay UE list) could transmit (to the second end UE) the new PROSE PC5 DISCOVERY message for the UE-to-UE candidate relay discovery response message, e.g., in response to reception of the new PROSE PC5 DISCOVERY message for the UE-to-UE candidate relay discovery solicitation message. An example is illustrated in FIG. 22.

Additionally and/or alternatively, a PROSE PC5 DISCOVERY message for the UE-to-UE relay discovery solicitation message may include an indication indicating whether the PROSE PC5 DISCOVERY message for the UE-to-UE relay discovery solicitation message is for candidate 5G ProSe UE-to-UE relay discovery or not. Additionally and/or alternatively, the indication may indicate the PROSE PC5 DISCOVERY message for the UE-to-UE relay discovery solicitation message is for a candidate 5G ProSe UE-to-UE relay discovery. The indication may be a new IE (named e.g., candidate discovery indication IE) and presence of the new IE is optional. Based on the indication (setting to a specific value or being present), a candidate relay UE may determine that the PROSE PC5 DISCOVERY message for the UE-to-UE relay discovery solicitation message (received from the second end UE) is for candidate U2U relay discovery. Therefore, the candidate relay UE may not perform the relay UE procedure for UE-to-UE relay discovery. The candidate relay UE may ignore a direct discovery set IE included in the PROSE PC5 DISCOVERY message for the UE-to-UE relay discovery solicitation message.

Figure 23:
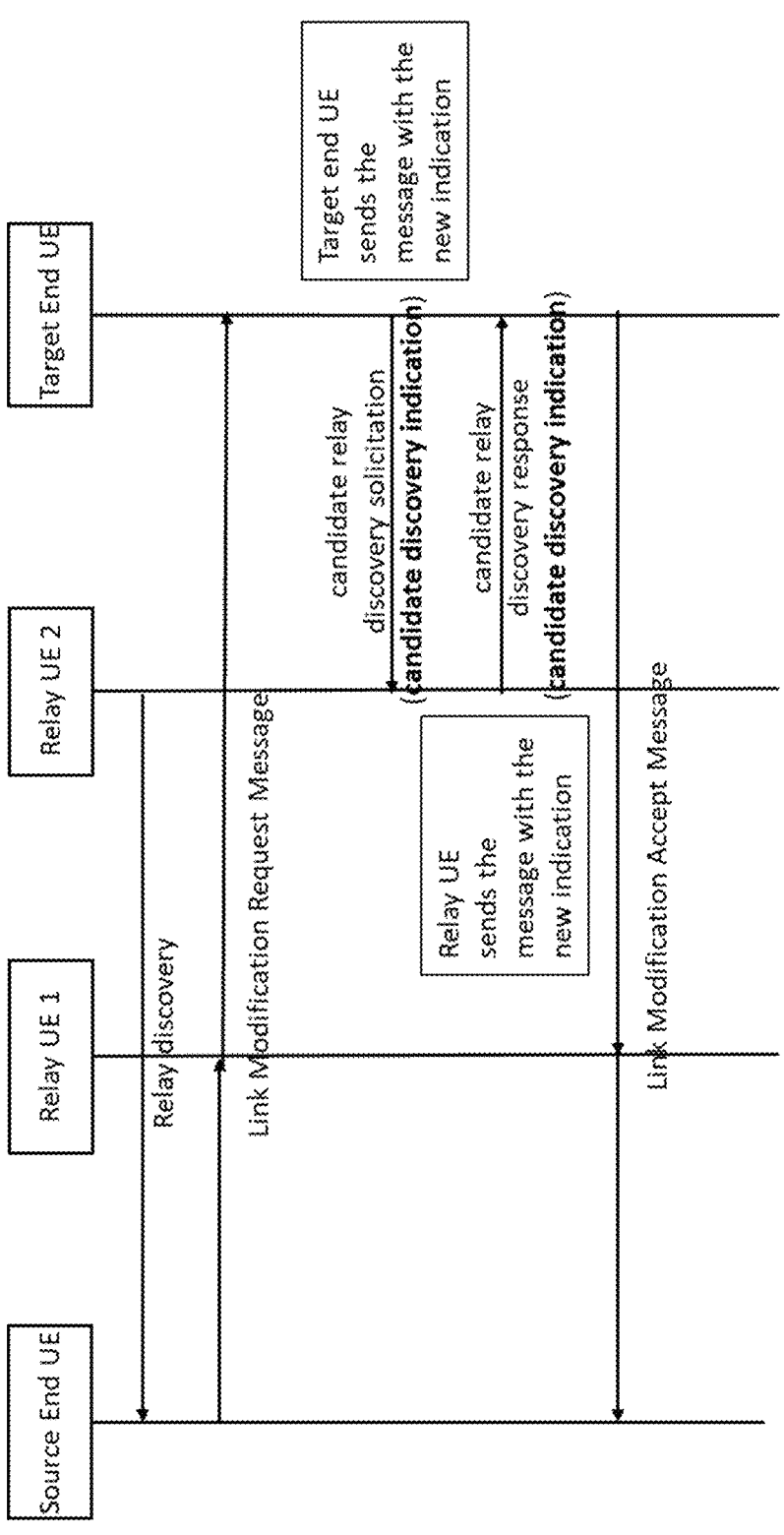
FIG. 23 is an example diagram showing 5G ProSe UE-to-UE Relay reselection, wherein a PROSE PC5 DISCOVERY message for the UE-to-UE relay discovery response message may include an indication indicating whether PROSE PC5 DISCOVERY message for the UE-to-UE relay discovery response message is for candidate 5G ProSe UE-to-UE relay discovery or not, in accordance with embodiments of the present invention.

Additionally and/or alternatively, a PROSE PC5 DISCOVERY message for the UE-to-UE relay discovery response message may include an indication indicating whether the PROSE PC5 DISCOVERY message for the UE-to-UE relay discovery response message is for candidate 5G ProSe UE-to-UE relay discovery or not. Additionally and/or alternatively, the indication may indicate the PROSE PC5 DISCOVERY message for the UE-to-UE relay discovery response message is for candidate 5G ProSe UE-to-UE relay discovery. Based on the indication (setting to a specific value or being present), the second end UE may determine that the PROSE PC5 DISCOVERY message for the UE-to-UE relay discovery response message is for candidate U2U relay discovery. Therefore, the second end UE may consider the candidate relay UE (sending the PROSE PC5 DISCOVERY message for the UE-to-UE relay discovery response) is discovered. The second end UE may ignore a direct discovery set IE included in the PROSE PC5 DISCOVERY message for the UE-to-UE relay discovery response message. An example is illustrated in FIG. 23.

Additionally and/or alternatively, content of a direct discovery set IE in a PROSE PC5 DISCOVERY message for the UE-to-UE relay discovery solicitation message may indicate that the PROSE PC5 DISCOVERY message for the UE-to-UE relay discovery solicitation message is for candidate 5G ProSe UE-to-UE relay discovery. Section 11.2.17 in [2] TS 24.554, the structure of the direct discovery set IE is specified. One or more fields in the direct discovery set IE set to specific value(s) could indicate the PROSE PC5 DISCOVERY message for the UE-to-UE relay discovery solicitation message is for candidate 5G ProSe UE-to-UE relay discovery.

Figure 24:
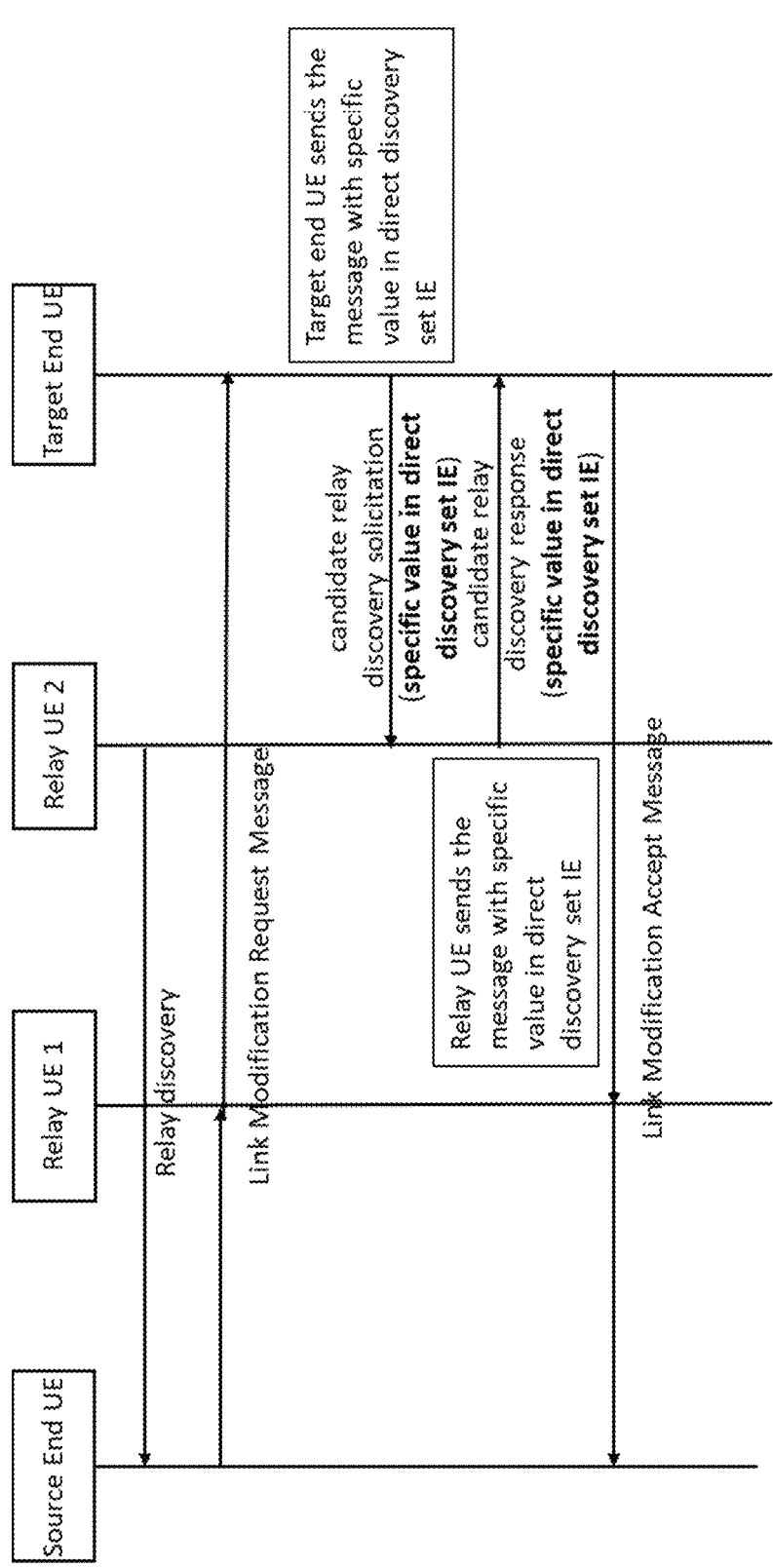
FIG. 24 is an example diagram showing 5G ProSe UE-to-UE Relay reselection, wherein content of a direct discovery set IE in a PROSE PC5 DISCOVERY message for the UE-to-UE relay discovery response message may indicate that the PROSE PC5 DISCOVERY message for the UE-to-UE relay discovery response message is for candidate 5G ProSe UE-to-UE relay discovery, in accordance with embodiments of the present invention.

Additionally and/or alternatively, content of a direct discovery set IE in a PROSE PC5 DISCOVERY message for the UE-to-UE relay discovery response message may indicate that the PROSE PC5 DISCOVERY message for the UE-to-UE relay discovery response message is for candidate 5G ProSe UE-to-UE relay discovery. Section 11.2.17 in [2] TS 24.554, specifies the structure of the direct discovery set IE. One or more fields in the direct discovery set IE set to specific value(s) could indicate the PROSE PC5 DISCOVERY message for the UE-to-UE relay discovery response message is for candidate 5G ProSe UE-to-UE relay discovery. An example is illustrated in FIG. 24.

The one or more fields may include one or more of the following fields:
Length of direct discovery set contents,
List of protected user info,
Protected user info,
Length of protected user info,
Coordinated Universal Time (UTC)-based counter Least Significant Bit (LSB) contents,
Message Integrity Check (MIC),
User info,
Length of application layer ID contents, and/or
Application layer ID contents.

The specific value(s) may be or include (all bit(s) set to) zero. The specific value(s) for Length of direct discovery set contents may be less than 12 (octets) or less than 9 (octets). The specific value(s) for Length of protected user info may be less than 9 (octets) or less than 7 (octets).

(A candidate UE may assume that) the Length of the direct discovery set IE may be fixed (e.g., 12 octets) when or if (at least) the content of the direct discovery IE is used to indicate that the PROSE PC5 DISCOVERY message for the UE-to-UE relay discovery solicitation message (received by the candidate UE) is for candidate 5G ProSe UE-to-UE relay discovery. (The second end UE may assume that) the Length of the direct discovery set IE may be fixed (e.g., 12 octets) when or if (at least) the content of the direct discovery IE is used to indicate that the PROSE PC5 DISCOVERY message for the UE-to-UE relay discovery response message (received by the second end UE) is for candidate 5G ProSe UE-to-UE relay discovery.

For example, there may be only one protected user info in the list of protected user info. The user info field may set to a specific one-byte length value (e.g., 0) while the UTC-based counter LSB and MIC remain the same. The candidate UE and the second end UE may consider the discovery message is for candidate relay discovery once the user info field in the protected user info matches the pre-configured specific value. Alternatively, the length of protected the user info field may set to 0, and the remaining protected user info field may be padded with 0. Once the length of the protected user info field in a protected user info is 0, the UE may consider the message is for candidate relay discovery. The UE decodes the remaining bytes according to the length of the direct discovery set contents field.

For another example, the candidate relay UE and/or the second end UE may determine whether the PROSE PC5 DISCOVERY message for the UE-to-UE relay discovery solicitation/response message is used for candidate U2U relay discovery based on the length of the direct discovery set included in the PROSE PC5 DISCOVERY message for the UE-to-UE relay discovery solicitation/response message. According to [2][TS24.554], the minimum length of the direct discovery set IE is 12 bytes. Thus, the candidate relay UE and/or the second end UE may determine the PROSE PC5 DISCOVERY message for the UE-to-UE relay discovery solicitation/response message is used for candidate U2U relay discovery if (at least) the length of the direct discovery set IE included in the PROSE PC5 DISCOVERY message for the UE-to-UE relay discovery solicitation/response message is 12 bytes. In this solution, a field of Protected user info may be included. In the field of User info within the field of Protected user info, the field of Application layer ID contents may be set to a specific value (e.g., 0). The field of Length of application layer ID contents may indicate one byte (i.e., the length of the field of Application layer ID contents is one byte). The second end UE may set the content of the PROSE PC5 DISCOVERY message for the UE-to-UE relay discovery solicitation message as usual except for the field of Application layer ID contents that is set to the specific value.

For another example, the candidate relay UE and/or the second end UE may determine whether the PROSE PC5 DISCOVERY message for the UE-to-UE relay discovery solicitation/response message is used for candidate U2U relay discovery based on the number of user info included in the direct discovery set. In general, for the U2U relay discovery with Model B (i.e., rather than candidate U2U relay discovery), the direct discovery set IE contains two UEs' user info (including e.g., discoverer UE's user info and discoveree UE's user info). In case of candidate U2U relay discovery, such a PROSE PC5 DISCOVERY message for the UE-to-UE relay discovery solicitation message is mainly used for checking if (at least) a specific candidate relay UE is in proximity rather than being used by the second end UE for discovering the first end UE. Thus, it would be feasible to consider that if (at least) the direct discovery set included in the PROSE PC5 DISCOVERY message for the UE-to-UE relay discovery solicitation/response message contains one end UE's user info, the candidate relay UE and/or the second end UE may then determine that this PROSE PC5 DISCOVERY message for the UE-to-UE relay discovery solicitation/response message is used for candidate U2U relay discovery. More specifically, the candidate relay UE and/or the second end UE may determine whether the PROSE PC5 DISCOV- ERY message for the UE-to-UE relay discovery solicitation/ response message is used for candidate U2U relay discovery if (at least) the field of length of the direct discovery set contents indicates one protected user info. More specifically, the candidate relay UE and/or the second end UE may determine whether the PROSE PC5 DISCOVERY message for the UE-to-UE relay discovery solicitation/response message is used for candidate U2U relay discovery if (at least) the field of list of protected user info indicates one protected user info. With this solution, in the field of User info within the field of the one Protected user info, the field of Application layer ID contents may be set to a specific value (e.g., 0) or an end UE's user info (e.g., the first end UE's user info or the second end UE's user info).

For the other example, the candidate relay UE and/or the second end UE may determine the PROSE PC5 DISCOVERY message for the UE-to-UE relay discovery solicitation/ response message is used for candidate U2U relay discovery if (at least) user info included in the direct discovery set is set to a specific value. More specifically, the field of length of the direct discovery set contents may indicate one or two protected user info (including e.g., the first end UE's user info and/or the second end UE's user info). For each Protected user info, the field of Application layer ID contents in the field of User info may be set to a specific value (e.g., 0).

Figure 25:
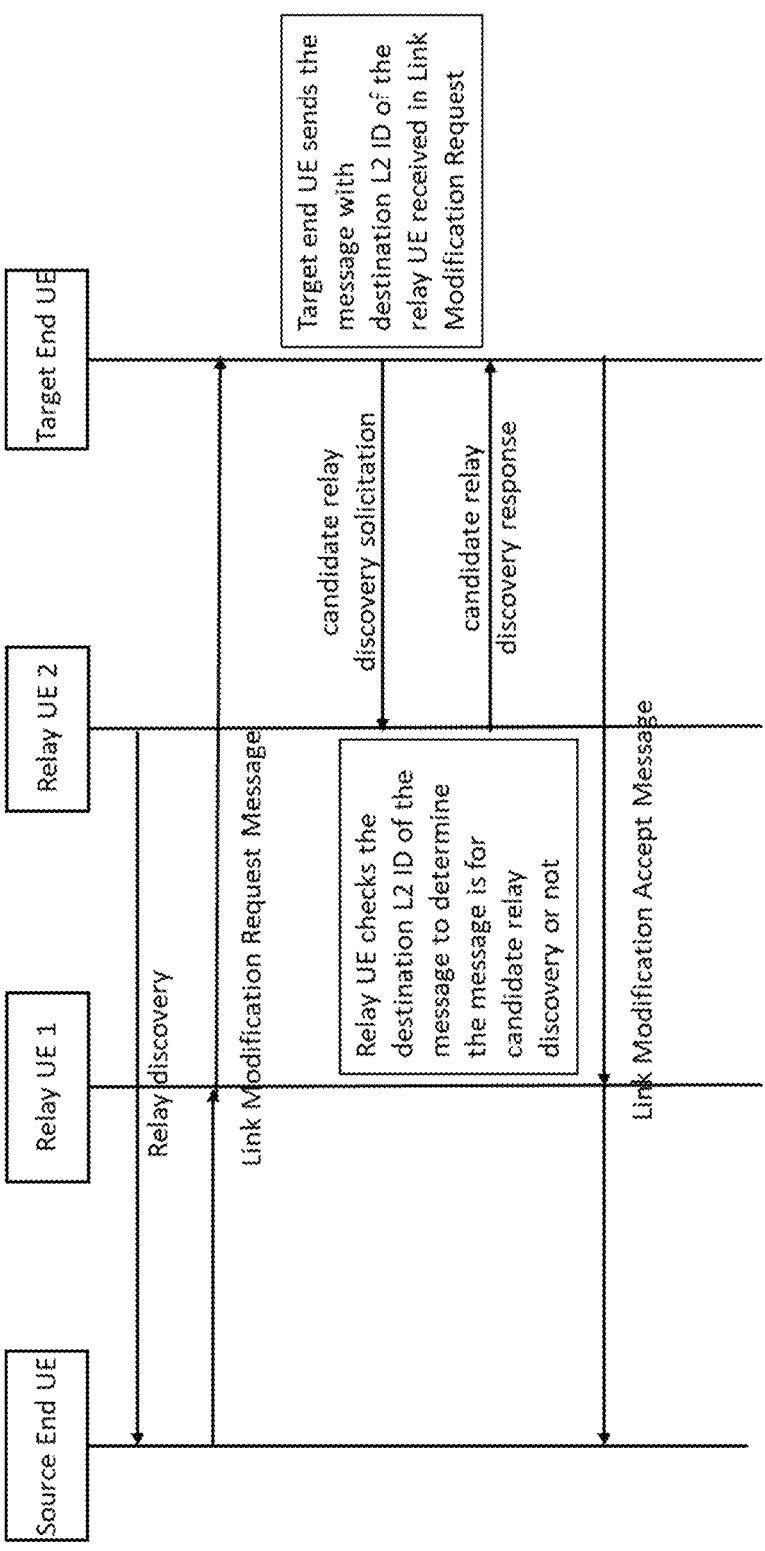
FIG. 25 is an example diagram showing 5G ProSe UE-to-UE Relay reselection, wherein a candidate relay UE may consider, based on an L2ID associated with a PROSE PC5 DISCOVERY message for a UE-to-UE relay discovery solicitation message, that the PROSE PC5 DISCOVERY message for the UE-to-UE relay discovery solicitation message may be used for candidate U2U relay discovery, in accordance with embodiments of the present invention.

Additionally and/or alternatively, a candidate relay UE may consider, based on a (Destination) layer-2 ID (L2ID) associated with a PROSE PC5 DISCOVERY message for a UE-to-UE relay discovery solicitation message, that the PROSE PC5 DISCOVERY message for the UE-to-UE relay discovery solicitation message may be used for candidate U2U relay discovery. For example, if (at least) the PROSE PC5 DISCOVERY message for the UE-to-UE relay discovery solicitation message is addressed to the candidate relay UE's L2ID, the candidate relay UE may consider that a PROSE PC5 DISCOVERY message for the UE-to-UE relay discovery solicitation message may be used for candidate U2U relay discovery. If (at least) the PROSE PC5 DISCOVERY message for the UE-to-UE relay discovery solicitation message is received by using the candidate relay UE's L2ID as the Destination L2ID, the candidate relay UE could know that the PROSE PC5 DISCOVERY message for the UE-to-UE relay discovery solicitation message is for candidate U2U relay discovery. If (at least) the PROSE PC5 DISCOVERY message for the UE-to-UE relay discovery solicitation message is not addressed to the candidate relay UE's L2ID or is addressed to a default L2ID, the candidate relay UE may consider that a PROSE PC5 DISCOVERY message for the UE-to-UE relay discovery solicitation message may not be used for candidate U2U relay discovery or may be used for U2U relay discovery with Model B. If (at least) the PROSE PC5 DISCOVERY message for the UE-to-UE relay discovery solicitation message is received not by using the candidate relay UE's L2ID as the Destination L2ID or is received by using the default L2ID (as Destination L2ID), the candidate relay UE could know that the PROSE PC5 DISCOVERY message for the UE-to-UE relay discovery solicitation message is not for candidate U2U relay discovery or is for U2U relay discovery with Model B. More specifically, the PROSE PC5 DISCOVERY message for the UE-to-UE relay discovery solicitation message may be received by using the second end UE's L2ID as the Source L2ID. This solution would be feasible since the discovery solicitation/response messages used in the U2U relay discovery with Model B (i.e., rather than candidate U2U relay discovery) are addressed to the default L2ID and the second end UE could know the candidate relay UE's L2ID indicated in the link modification request message received from the first end UE. The candidate relay UE may ignore the direct discovery set IE included in the PROSE PC5 DISCOVERY message for the UE-to-UE relay discovery solicitation message. After sending the PROSE PC5 DISCOVERY message for the UE-to-UE relay discovery solicitation message addressed to an L2ID of a candidate relay UE, the second end UE can consider the candidate relay UE is discovered if/when/after (at least) a corresponding PROSE PC5 DIS-COVERY message for the UE-to-UE relay discovery response message is received from the candidate relay UE (e.g., identifying based on an upper layer ID of the candidate relay UE or the candidate relay UE's L2ID as the Source L2ID). The second end UE may ignore the direct discovery set IE included in the PROSE PC5 DISCOVERY message for the UE-to-UE relay discovery response message. The upper layer ID may be an application layer ID, user info ID. An example is illustrated in FIG. 25.

More specifically, said end UE's user info may be an upper layer ID, application layer ID, or upper layer ID of that end UE.

For example, the text proposal for these related solutions on top of [2] TS 24.554 could be shown below, with changes and edits shown with double curly brackets to show deletions, i.e., {{ . . . }}, and double carets to show additions/ insertions, i.e., ^^. . . ^^:

Start of Changes 8a.2.1.2.2 Announcing UE Relay Discovery for UE-to-UE Relay Discovery 8a.2.1.2.2.1 General The purpose of the announcing UE procedure for UE-to-UE relay discovery is:

a) to enable a ProSe-enabled UE to announce availability of a connectivity service provided by a UE-to-UE relay of the ProSe-enabled UE to other ProSe-enabled UEs, upon a request from upper layers as defined in 3GPP TS 23.304; or b) to enable a ProSe-enabled UE to measure the PROSE PC5 DISCOVERY message signal strength between the ProSe-enabled UE and the 5G ProSe UE-to-UE relay UE(s) for UE-to-UE relay selection/reselection.

8a.2.1.2.2.2 Announcing UE Procedure for UE-to-UE Relay Discovery Initiation

The UE is authorised to perform the announcing UE procedure for UE-to-UE relay discovery if:

a) the UE is authorised to act as a 5G ProSe UE-to-UE relay UE in the PLMN indicated by the serving cell as specified in clause 5.2.7, and 1) the UE is served by NG-RAN and the UE is authorised to perform 5G ProSe UE-to-UE relay discovery in the PLMN as specified in clause 5; or 2) the UE is authorised to perform 5G ProSe UE-to-UE relay discovery when not served by NG-RAN as specified in clause 5 and intends to use the provisioned radio resources for 5G ProSe UE-to-UE relay discovery; and b) the UE is configured with:

1) the relay service code parameter identifying the connectivity service to be announced as specified in clause 5.2.7 and the indicated security procedure for 5G ProSe UE-to-UE relay for the relay service code is supported by the UE as per 3GPP TS 33.503; and 2) the user info ID for the 5G ProSe UE-to-UE relay discovery as specified in clause 5.2.7;

otherwise, the UE is not authorised to perform the announcing UE procedure for UE-to-UE relay discovery.

The protected user info of 5G ProSe end UE(s) shall be available in the announcing UE to perform the announcing UE procedure for UE-to-UE relay discovery. The protected user info of 5G ProSe end UE(s) may be retrieved from a previous 5G ProSe UE-to-UE relay discovery response message, or from a previous 5G ProSe UE-to-UE relay communication. The announcing UE shall store the list of the protected user info of 5G ProSe end UE(s) based on the validity timer(s) derived from the bit length of UTC-based counter LSB contents of the UTC-based counter LSB IE associated with the protected user info of 5G ProSe end UE as specified in clause 6.1.3.3 of 3GPP TS 33.503. If the validity timer associated with a protected user info of 5G ProSe end UE expires, the announcing UE shall remove the protected user info of 5G ProSe end UE from the stored list of protected user info of 5G ProSe end UE(s).

Editor's Note: It is FFS whether and how to retrieve the protected user info of 5G ProSe end UE via the existing direct link between the end UE and the relay UE.

Figures 26, 27, 28:
FIG. 26 is an example diagram (FIG. 8a.2.1.2.2.2.1) showing the interaction of the UEs in the announcing UE procedure for UE-to-UE relay discovery, in accordance with embodiments of the present invention.
FIG. 27 is a new table figure (FIG. 11.2.x.1) showing the candidate discovery supported indication information element, in accordance with embodiments of the present invention.
FIG. 28 is a new table figure (FIG. 11.2.z.1) showing the candidate discovery indication information element, in accordance with embodiments of the present invention.

FIG. 8a.2.1.2.2.2.1, depicted in FIG. 26, illustrates the interaction of the UEs in the announcing UE procedure for UE-to-UE relay discovery.

When the UE is triggered by the upper layers to announce availability of a connectivity service provided by a 5G ProSe UE-to-UE relay, if the UE is authorised to perform the announcing UE procedure for UE-to-UE relay discovery, then the UE:

a) if the UE is served by NG-RAN and the UE in 5GMM-IDLE mode needs to request resources for sending PROSE PC5 DISCOVERY messages for 5G ProSe UE-to-UE relay discovery as specified in 3GPP TS 38.331, shall perform a service request procedure or mobility registration procedure as specified in 3GPP TS 24.501;

b) shall obtain a valid UTC time for the discovery transmission from the lower layers and generate the UTC-based counter corresponding to this UTC time as specified in clause 11.2.5;

c) shall generate a PROSE PC5 DISCOVERY message for UE-to-UE relay discovery announcement according to clause 10.2.1. In the PROSE PC5 DISCOVERY message for UE-to-UE relay discovery announcement, the UE:

1) shall set the announcer info parameter to the User info ID configured for the 5G ProSe UE-to-UE relay discovery, as specified in clause 5.2.7;

2) shall set the relay service code parameter to the relay service code configured for the connectivity service to be announced, as specified in clause 5.2.7. If the UE is not served by NG-RAN served by the NG-RAN, the security procedures selection is based on the relay service codes configured at the UE. Otherwise, the selected relay service code configured at the UE shall be associated with the network assistance security indication indicating the security procedure without network assistance is to be used;

3) shall set the direct discovery set parameter to a list of stored protected user info of 5G ProSe end UE(s) of which the associated relay service code is the same as the relay service code to be announced;

NOTE 0: The 5G ProSe UE-to-UE relay UE announces protected user info of 5G ProSe end UEs in proximity only if the PC5 signal strength of the UEs in proximity measured by the 5G ProSe UE-to-UE relay is above the configured signal strength threshold as specified in 3GPP TS 38.331.

4) shall include the MIC field computed as described in 3GPP TS 33.503;

5) shall set the UTC-based counter LSB parameter to the 4 least significant bits of the UTC-based counter;

6) shall set the Resource status indicator bit of the status indicator parameter to indicate whether or not the UE has resources available to provide a connectivity service for 5G ProSe UE-to-UE relay for additional ProSe-enabled UEs; and 7) shall set the ProSe direct discovery PC5 message type parameter as specified in table 10.2.1.12;

^^8) shall set the candidate discovery supported indication as specified in table 10.2.1.12.^^ d) shall apply the DUIK, DUSK or DUCK with the associated encrypted bitmask for the relay service code for 5G ProSe UE-to-UE relay discovery, along with the UTC-based counter, to the PROSE PC5 DISCOVERY message for whichever security mechanism(s) configured to be applied, e.g., integrity protection, message scrambling or confidentiality protection of one or more above parameters, as specified in 3GPP TS 33.503;

e) shall set the destination layer-2 ID to the default destination layer-2 ID as specified in clause 5.2.7 and self-assign a source layer-2 ID for sending the 5G ProSe UE-to-UE relay discovery announcement; and NOTE 1: The UE implementation ensures that the value of the self-assigned source layer-2 ID is different from any other self-assigned source layer-2 ID(s) in use for 5G ProSe direct communication as specified in clause 7.2, is different from any other provisioned destination layer-2 ID(s) as specified in clause 5.2 and is different from any other self-assigned source layer-2 ID in use for a simultaneous 5G ProSe direct discovery procedure over PC5 with a different discovery model as specified in clause 6.2.14.2.2.2, clause 6.2.15.2.2.2, clause 8.2.1.3.1.2 and clause 8a.2.1.3.1.2.

f) shall pass the resulting PROSE PC5 DISCOVERY message for UE-to-UE relay discovery announcement to the lower layers for transmission over the PC5 interface with the source layer-2 ID, destination layer-2 ID and an indication that the message is for 5G ProSe direct discovery.

Until the UE is triggered by the upper layers to stop announcing availability of a connectivity service provided by a 5G ProSe UE-to-UE relay UE, or until the UE stops being authorised to perform the announcing UE procedure for UE-to-UE relay discovery, a) if the list of protected user info of 5G ProSe end UE(s) of which the associated relay service code is the same as the relay service code to be announced remains the same, the UE shall ensure that it keeps on passing the same PROSE PC5 DISCOVERY message along with the same source layer-2 ID, destination layer-2 ID, and an indication that the message is for 5G ProSe direct discovery to the lower layer for transmission, and b) if the list of protected user info of 5G ProSe end UE(s) of which the associated relay service code is the same as the relay service code to be announced in the UE is updated, for example, new protected user info of 5G ProSe end UE(s) are available, or one or more protected user info of 5G ProSe end UE(s) are removed due to the associated validity timer(s) have expired, the UE shall generate and protect a new PROSE PC5 DISCOVERY message containing the updated list of protected user info of 5G ProSe end UE(s) of which the associated relay service code are the same as the relay service code to be announced and pass the PROSE PC5 DISCOV- ERY message along with the source layer-2 ID, destination layer-2 ID, and an indication that the message is for 5G ProSe direct discovery to the lower layer for transmission.

NOTE 2: The announcing UE can stop announcing UE procedure for UE-to-UE relay discovery for power saving by implementation specific means e.g. an implementation-specific maximum number of 5G ProSe direct links configured in the UE, or an implementation-specific timer expires.

8a.2.1.2.2.3 Announcing UE procedure for UE-to-UE relay discovery completion

When the announcing UE is triggered by the upper layers to stop announcing availability for 5G ProSe UE-to-UE relay, when the announcing UE stops being authorised to perform the announcing UE procedure for UE-to-UE relay discovery, or none of the direct discovery set to be announced is available, the UE shall instruct the lower layers to stop announcing.

NOTE: The announcing UE can stop announcing UE procedure for UE-to-UE relay discovery for power saving by implementation specific means e.g. an implementation-specific maximum number of 5G ProSe direct links configured in the UE, or an implementation-specific timer expires.

When the UE stops announcing, if the UE is in 5GMM-CONNECTED mode, the UE shall trigger the corresponding procedure in lower layers as specified in 3GPP TS 38.331.

8a.2.3.3 Candidate 5G ProSe UE-to-UE Relay Discovery Procedure

The purpose of the candidate 5G ProSe UE-to-UE relay discovery procedure is to support the target 5G ProSe end UE to discover the candidate 5G ProSe UE-to-UE relay UE when the target 5G ProSe end UE needs to discover the candidate 5G ProSe UE-to-UE relay UE for the negotiated 5G ProSe layer-3 UE-to-UE relay reselection, as specified in clause 6.7.4 of 3GPP TS 23.304. This procedure is based on {{UE-to-UE relay discovery over PC5 interface with model B procedure as specified in clause 8a.2.1.3 with the following modifications: }}^^ the PROSE PC5 DISCOVERY message for UE-to-UE candidate relay discovery solicitation and the PROSE PC5 DISCOVERY message for UE-to-UE candidate relay discovery response.^^ a) when the target 5G ProSe end UE as a discoverer UE generates a PROSE PC5 DISCOVERY message for UE-to-UE relay ^^candidate^^ discovery solicitation, in the PROSE PC5 DISCOVERY message for UE-to-UE ^^candidate^^ relay discovery solicitation, the UE shall:

1) set the relay service code parameter to the relay service code parameter currently being used with the serving 5G UE-to-UE relay UE for which the UE-to-UE relay reselection is needed;

2) set the UE-to-UE relay UE info parameter to user info ID for the candidate 5G ProSe UE-to-UE relay UE; and 3) not include the direct discovery set parameter, and shall set the destination layer-2 ID to the destination layer-2 ID of the candidate 5G ProSe UE-to-UE relay UE as received in the PROSE DIRECT LINK MODIFICATION REQUEST message during the negotiated 5G ProSe layer-3 UE-to-UE relay reselection procedure. If there is no layer-2 ID of the candidate 5G ProSe UE-to-UE relay UE received in the PROSE DIRECT LINK MODIFICATION REQUEST message during the negotiated 5G ProSe layer-3 UE-to-UE relay reselection procedure, the UE shall set the destination layer-2 ID to the default layer-2 ID for discovery as specified in clause 5.2.7;

b) when the 5G ProSe UE-to-UE relay UE receives the PROSE PC5 DISCOVERY message for UE-to-UE ^^candidate^^ relay discovery solicitation, the 5G ProSe UE-to-UE relay does not perform the Relay UE procedure for UE-to-UE relay discovery if:

{{1) the PROSE PC5 DISCOVERY message for UE-to-UE relay discovery solicitation does not include the direct discovery set parameter; and}}

2) the UE-to-UE relay UE info parameter in the PROSE PC5 DISCOVERY message for UE-to-UE ^^candidate^^ relay discovery solicitation matches with the user info ID for 5G ProSe UE-to-UE relay UE;

c) after b), the 5G ProSe UE-to-UE relay UE shall send the PROSE PC5 DISCOVERY message for UE-to-UE ^^candidate^^ relay discovery response to the discoverer UE. In the PROSE PC5 DISCOVERY message for UE-to-UE ^^candidate^^ relay discovery response, the UE shall:

1) set the relay service code parameter to the relay service code parameter of the PROSE PC5 DISCOVERY message for UE-to-UE relay discovery solicitation received from the target 5G ProSe end UE; and 2) not include the direct discovery set parameter; and d) after c), when the target 5G ProSe end UE receives the PROSE PC5 DISCOVERY message for UE-to-UE relay discovery response and if 1) the relay service code parameter of the PROSE PC5 DISCOVERY message for UE-to-UE relay discovery response is the same as the relay service code parameter of the PROSE PC5 DISCOVERY message for UE-to-UE relay discovery solicitation;

{{b) the direct discover set parameter of the PROSE PC5 DISCOVERY message for UE-to-UE relay discovery response is not included; and}} c) the UE-to-UE relay UE info parameter of the PROSE PC5 DISCOVERY message for UE-to-UE relay discovery response is the same as the user info ID for the candidate 5G ProSe UE-to-UE relay UE of the PROSE PC5 DISCOVERY message for UE-to-UE relay discovery solicitation, then the 5G ProSe end UE shall consider the candidate 5G ProSe UE-to-UE relay UE is discovered, and proceed the 5G ProSe direct link modification procedure for UE-to-UE relay UE reselection.

10.2.1 Message Definition

This message is sent by the UE over the PC5 interface for open 5G ProSe direct discovery and restricted 5G ProSe direct discovery. See table 10.2.1.1, table 10.2.1.2, table 10.2.1.3, table 10.2.1.4, table 10.2.1.5, table 10.2.1.6, table 10.2.1.7, table 10.2.1.8, table 10.2.1.9, table 10.2.1.10, table 10.2.1.11, table 10.2.1.12, table 10.2.1.13, and table 10.2.1.14.

Message type: PROSE PC5 DISCOVERY
Significance: dual
Direction: UE to peer UE

TABLE 10.2.1.12

PROSE PC5 DISCOVERY message for UE-to-UE relay discovery announcement

| IEI | Information Element | Type/Reference | Presence | Format | Length |
|---|---|---|---|---|---|
| | ProSe direct discovery PC5 message type (NOTE 1) | ProSe direct discovery PC5 message type 11.2.1 | M | V | 1 |
| | UTC-based counter LSB | UTC-based counter LSB 11.2.11 | M | V | 1 |
| | MIC | MIC 11.2.4 | M | V | 4 |
| | Relay service code | Relay service code 11.2.8 | M | V | 3 |
| | Announcer info | User info ID 11.2.7 | M | V | 6 |
| | Status indicator | Status indicator 11.2.9 | M | V | 1 |
| | Direct discovery set | Direct discovery set 11.2.17 | M | LV-E | 15-8323 |
| | ^^Candidate discovery supported indication | Candidate discovery supported indication 11.2.x | M^^ | | |

1. (NOTE 1):
The discovery type is set to "Restricted discovery", the content type is set to "UE-to-UE relay discovery announcement" and the discovery model is set to "Model A".

TABLE 10.2.1.13

PROSE PC5 DISCOVERY message for UE-to-UE relay discovery solicitation

| IEI | Information Element | Type/Reference | Presence | Format | Length |
|---|---|---|---|---|---|
| | ProSe direct discovery PC5 message type (NOTE 1) | ProSe direct discovery PC5 message type 11.2.1 | M | V | 1 |
| | UTC-based counter LSB | UTC-based counter LSB 11.2.11 | M | V | 1 |
| | MIC | MIC 11.2.4 | M | V | 4 |
| | Relay service code | Relay service code 11.2.8 | M | V | 3 |
| | Direct discovery set | Direct discovery set 11.2.17 | M | LV-E | 12-520 |
| 2C | UE-to-UE relay UE info | User info ID 11.2.7 | O | TLV | 8 |
| 2D | Status indicator | Status indicator 11.2.9 | O | TV | 2 |
| 8 | Announce prohibited indication | Announce prohibited indication 11.2.y | O | TV | 1 |

1. (NOTE 1):
The discovery type is set to "Restricted discovery", the content type is set to "UE-to-UE relay discovery solicitation" and the discovery model is set to "Model B".

TABLE 10.2.1.14

PROSE PC5 DISCOVERY message for UE-to-UE relay discovery response

| IEI | Information Element | Type/Reference | Presence | Format | Length |
|---|---|---|---|---|---|
| | ProSe direct discovery PC5 message type (NOTE 1) | ProSe direct discovery PC5 message type 11.2.1 | M | V | 1 |
| | UTC-based counter LSB | UTC-based counter LSB 11.2.11 | M | V | 1 |

TABLE 10.2.1.14-continued

| IEI | Information Element | Type/Reference | Presence | Format | Length |
|-----|--------------------|----------------|----------|--------|--------|
| | MIC | MIC 11.2.4 | M | V | 4 |
| | Relay service code | Relay service code 11.2.8 | M | V | 3 |
| | Direct discovery set | Direct discovery set 11.2.17 | M | LV-E | 12-520 |
| 2C | UE-to-UE relay UE info | User info ID 11.2.7 | O | TLV | 8 |
| 2D | Status indicator | Status indicator 11.2.9 | O | TV | 2 |
| 8- | Announce prohibited indication | Announce prohibited indication 11.2.y | O | TV | 1 |

PROSE PC5 DISCOVERY message for UE-to-UE relay discovery response (NOTE 1):
The discovery type is set to "Restricted discovery", the content type is set to "UE-to-UE relay discovery response" and the discovery model is set to "Model B".

TABLE 10.2.1.x

PROSE PC5 DISCOVERY message for UE-to-UE candidate relay discovery solicitation

| IEI | Information Element | Type/Reference | Presence | Format | Length |
|-----|--------------------|----------------|----------|--------|--------|
| | ProSe direct discovery PC5 message type (NOTE 1) | ProSe direct discovery PC5 message type 11.2.1 | M | V | 1 |
| | UTC-based counter LSB | UTC-based counter LSB 11.2.11 | M | V | 1 |
| | MIC | MIC 11.2.4 | M | V | 4 |
| | Relay service code | Relay service code 11.2.8 | M | V | 3 |
| 2C | UE-to-UE relay UE info | User info ID 11.2.7 | O | TLV | 8 |
| 2D | Status indicator | Status indicator 11.2.9 | O | TV | 2 |
| 8 | Announce prohibited indication | Announce prohibited indication 11.2.y | O | TV | 1 |

1. (NOTE 1):
The discovery type is set to "Restricted discovery", the content type is set to "UE-to-UE relay discovery solicitation" and the discovery model is set to "Model B".

TABLE 10.2.1.y

PROSE PC5 DISCOVERY message for UE-to-UE candidate relay discovery response

| IEI | Information Element | Type/Reference | Presence | Format | Length |
|-----|--------------------|----------------|----------|--------|--------|
| | ProSe direct discovery PC5 message type (NOTE 1) | ProSe direct discovery PC5 message type 11.2.1 | M | V | 1 |
| | UTC-based counter LSB | UTC-based counter LSB 11.2.11 | M | V | 1 |
| | MIC | MIC 11.2.4 | M | V | 4 |
| | Relay service code | Relay service code 11.2.8 | M | V | 3 |
| 2C | UE-to-UE relay UE info | User info ID 11.2.7 | O | TLV | 8 |

TABLE 10.2.1.y-continued

| IEI | Information Element | Type/Reference | Presence | Format | Length |
|-----|---------------------|----------------|----------|--------|--------|
| | PROSE PC5 DISCOVERY message for UE-to-UE candidate relay discovery response | | | | |
| 2D | Status indicator | Status indicator 11.2.9 | O | TV | 2 |
| 8- | Announce prohibited indication | Announce prohibited indication 11.2.y | O | TV | 1 |

(NOTE 1):
The discovery type is set to "Restricted discovery", the content type is set to "UE-to-UE relay discovery response" and the discovery model is set to "Model B".

^^

^^11.2.x Candidate Discovery Supported Indication

The candidate discovery supported indication parameter is used to indicate whether, or not, the relay UE supports the transmission and reception of the new type of ProSe direct discovery PC5 message(s) during the procedure of 5G ProSe UE-to-UE candidate relay discovery.

The candidate discovery supported indication is a type 1 information element with a length of 1 octet.

The candidate discovery supported indication IE is coded as shown in FIG. 11.2.x.1 and table 11.2.x.1.^^

FIG. 27 depicts new ^^FIG. 11.2.x.1: Candidate discovery supported indication information element.

TABLE 11.2.x.1

Candidate discovery supported indication information element
Candidate discovery supported indication (CDSI) (octet 1, bit 1)
The bit is used to indicate whether or not the relay UE
supports the transmission and reception of the new type
of ProSe direct discovery PC5 message(s).

Bit
1

| 0 | It does not support the transmission and reception of the new type of ProSe direct discovery PC5 message(s). |
| 1 | It supports the transmission and reception of the new type of ProSe direct discovery PC5 message(s). |

Bits 2 to 4 of octet 1 are spare and shall be coded as zero.

^^

End of Changes

For another example, the text proposal for the related solutions on top of [2] TS 24.554 could be shown below, with changes and edits shown with double curly brackets to show deletions, i.e., {{ . . . }}, and double carets to show additions/insertions, i.e., ^^. . .^^:

Start of Changes 8a.2.3.3 Candidate 5G ProSe UE-to-UE Relay Discovery Procedure

The purpose of the candidate 5G ProSe UE-to-UE relay discovery procedure is to support the target 5G ProSe end UE to discover the candidate 5G ProSe UE-to-UE relay UE when the target 5G ProSe end UE needs to discover the candidate 5G ProSe UE-to-UE relay UE for the negotiated 5G ProSe layer-3 UE-to-UE relay reselection, as specified in clause 6.7.4 of 3GPP TS 23.304. This procedure is based on UE-to-UE relay discovery over PC5 interface with model B procedure as specified in clause 8a.2.1.3 with the following modifications:

a) when the target 5G ProSe end UE as a discoverer UE generates a PROSE PC5 DISCOVERY message for UE-to-UE relay discovery solicitation, in the PROSE PC5 DISCOVERY message for UE-to-UE relay discovery solicitation, the UE shall:

1) set the relay service code parameter to the relay service code parameter currently being used with the serving 5G UE-to-UE relay UE for which the UE-to-UE relay reselection is needed;

2) set the UE-to-UE relay UE info parameter to user info ID for the candidate 5G ProSe UE-to-UE relay UE; and 3) {{not include the direct discovery set parameter set}}^^ the candidate discovery indication^^.

and shall set the destination layer-2 ID to the destination layer-2 ID of the candidate 5G ProSe UE-to-UE relay UE as received in the PROSE DIRECT LINK MODIFICATION REQUEST message during the negotiated 5G ProSe layer-3 UE-to-UE relay reselection procedure. If there is no layer-2 ID of the candidate 5G ProSe UE-to-UE relay UE received in the PROSE DIRECT LINK MODIFICATION REQUEST message during the negotiated 5G ProSe layer-3 UE-to-UE relay reselection procedure, the UE shall set the destination layer-2 ID to the default layer-2 ID for discovery as specified in clause 5.2.7;

b) when the 5G ProSe UE-to-UE relay UE receives the PROSE PC5 DISCOVERY message for UE-to-UE relay discovery solicitation, the 5G ProSe UE-to-UE relay does not perform the Relay UE procedure for UE-to-UE relay discovery if:

1) {{the PROSE PC5 DISCOVERY message for UE-to-UE relay discovery solicitation does not include the direct discovery set parameter}}^^ the candidate discovery indication is included^^; and 2) the UE-to-UE relay UE info parameter in the PROSE PC5 DISCOVERY message for UE-to-UE relay discovery solicitation matches with the user info ID for 5G ProSe UE-to-UE relay UE;

c) after b), the 5G ProSe UE-to-UE relay UE shall send the PROSE PC5 DISCOVERY message for UE-to-UE relay discovery response to the discoverer UE. In the PROSE PC5 DISCOVERY message for UE-to-UE relay discovery response, the UE shall:

1) set the relay service code parameter to the relay service code parameter of the PROSE PC5 DISCOVERY message for UE-to-UE relay discovery solicitation received from the target 5G ProSe end UE; and 2) {{not include the direct discovery set parameter set}}^^ the candidate discovery indication^^; and d) after c), when the target 5G ProSe end UE receives the PROSE PC5 DISCOVERY message for UE-to-UE relay discovery response and if 1) the relay service code parameter of the PROSE PC5 DISCOVERY message for UE-to-UE relay discovery response is the same as the relay service code parameter of the PROSE PC5 DISCOVERY message for UE-to-UE relay discovery solicitation; ^^ and^^ b) {{the direct discover set parameter of the PROSE PC5 DISCOVERY message for UE-to-UE relay discovery response is not included}}^^ the candidate discovery indication is included^^; and c) the UE-to-UE relay UE info parameter of the PROSE PC5 DISCOVERY message for UE-to-UE relay discovery response is the same as the user info ID for the candidate 5G ProSe UE-to-UE relay UE of the PROSE PC5 DISCOVERY message for UE-to-UE relay discovery solicitation, then the 5G ProSe end UE shall consider the candidate 5G ProSe UE-to-UE relay UE is discovered, and proceed the 5G ProSe direct link modification procedure for UE-to-UE relay UE reselection.

10.2.1 Message Definition

This message is sent by the UE over the PC5 interface for open 5G ProSe direct discovery and restricted 5G ProSe direct discovery. See table 10.2.1.1, table 10.2.1.2, table 10.2.1.3, table 10.2.1.4, table 10.2.1.5, table 10.2.1.6, table 10.2.1.7, table 10.2.1.8, table 10.2.1.9, table 10.2.1.10, table 10.2.1.11, table 10.2.1.12, table 10.2.1.13, and table 10.2.1.14.

Message type: PROSE PC5 DISCOVERY

Significance: dual

Direction: UE to peer UE

TABLE 10.2.1.13

| | PROSE PC5 DISCOVERY message for UE-to-UE relay discovery solicitation | | | | |
|---|---|---|---|---|---|
| IEI | Information Element | Type/Reference | Presence | Format | Length |
| | ProSe direct discovery PC5 message type (NOTE 1) | ProSe direct discovery PC5 message type 11.2.1 | M | V | 1 |
| | UTC-based counter LSB | UTC-based counter LSB 11.2.11 | M | V | 1 |
| | MIC | MIC 11.2.4 | M | V | 4 |
| | Relay service code | Relay service code 11.2.8 | M | V | 3 |
| | Direct discovery set | Direct discovery set 11.2.17 | M | LV-E | 12-520 |
| 2C | UE-to-UE relay UE info | User info ID 11.2.7 | O | TLV | 8 |
| 2D | Status indicator | Status indicator 11.2.9 | O | TV | 2 |
| 8 | Announce prohibited indication | Announce prohibited indication 11.2.y | O | TV | 1 |
| | ^^Candidate discovery indication | Candidate discovery indication 11.2.z | O | TV | 1^^ |

1. (NOTE 1):
The discovery type is set to "Restricted discovery", the content type is set to "UE-to-UE relay discovery solicitation" and the discovery model is set to "Model B".

TABLE 10.2.1.14

| | PROSE PC5 DISCOVERY message for UE-to-UE relay discovery response | | | | |
|---|---|---|---|---|---|
| IEI | Information Element | Type/Reference | Presence | Format | Length |
| | ProSe direct discovery PC5 message type (NOTE 1) | ProSe direct discovery PC5 message type 11.2.1 | M | V | 1 |
| | UTC-based counter LSB | UTC-based counter LSB 11.2.11 | M | V | 1 |
| | MIC | MIC 11.2.4 | M | V | 4 |
| | Relay service code | Relay service code 11.2.8 | M | V | 3 |
| | Direct discovery set | Direct discovery set 11.2.17 | M | LV-E | 12-520 |
| 2C | UE-to-UE relay UE info | User info ID 11.2.7 | O | TLV | 8 |
| 2D | Status indicator | Status indicator 11.2.9 | O | TV | 2 |

TABLE 10.2.1.14-continued

| | | | | | |
|---|---|---|---|---|---|
| PROSE PC5 DISCOVERY message for UE-to-UE relay discovery response | | | | | |
| IEI | Information Element | Type/Reference | Presence | Format | Length |
| 8 | Announce prohibited indication | Announce prohibited indication 11.2.y | O | TV | 1 |
| | ^^Candidate discovery indication | Candidate discovery indication 11.2.z | O | TV | 1^^ |

(NOTE 1):
The discovery type is set to "Restricted discovery", the content type is set to "UE-to-UE relay discovery response" and the discovery model is set to "Model B".

^^11.2.z Candidate Discovery Indication

The candidate discovery supported indication parameter is used to indicate whether, or not, the message is for the procedure of 5G ProSe UE-to-U candidate relay discovery.

The candidate discovery indication is a type 1 information element with a length of 1 octet.

The candidate discovery indication IE is coded as shown in FIG. 11.2.z.1 and table 11.2.z.1.^^

FIG. 28 depicts the new ^^FIG. 11.2.z.1: Candidate discovery indication information element.

TABLE 11.2.z.1

| | |
|---|---|
| Candidate discovery indication information element | |
| Candidate discovery indication (CDI) (octet 1, bit 1) | |
| The bit is used to indicate whether or not the message is for | |
| the procedure of 5G ProSe UE-to-UE candidate relay discovery. | |
| Bit 1 | |
| 0 | The message is not for the procedure of 5G ProSe UE-to-UE candidate relay discovery. |
| 1 | The message is for the procedure of 5G ProSe UE-to-UE candidate relay discovery. |
| Bits 2 to 4 of octet 1 are spare and shall be coded as zero. | |

^^

End of Changes

For another example, the text proposal for the related solutions on top of [2] TS 24.554 could be shown below, with changes and edits shown with double curly brackets to show deletions, i.e., {{ . . . }} and double carets to show additions/insertions, i.e., ^^. . .^^:

Start of Changes 8a.2.3.3 Candidate 5G ProSe UE-to-UE Relay Discovery Procedure

The purpose of the candidate 5G ProSe UE-to-UE relay discovery procedure is to support the target 5G ProSe end UE to discover the candidate 5G ProSe UE-to-UE relay UE when the target 5G ProSe end UE needs to discover the candidate 5G ProSe UE-to-UE relay UE for the negotiated 5G ProSe layer-3 UE-to-UE relay reselection, as specified in clause 6.7.4 of 3GPP TS 23.304. This procedure is based on UE-to-UE relay discovery over PC5 interface with model B procedure as specified in clause 8a.2.1.3 with the following modifications:

a) when the target 5G ProSe end UE as a discoverer UE generates a PROSE PC5 DISCOVERY message for UE-to-UE relay discovery solicitation, in the PROSE PC5 DISCOVERY message for UE-to-UE relay discovery solicitation, the UE shall:

1) set the relay service code parameter to the relay service code parameter currently being used with the serving 5G UE-to-UE relay UE for which the UE-to-UE relay reselection is needed;

2) set the UE-to-UE relay UE info parameter to user info ID for the candidate 5G ProSe UE-to-UE relay UE; and 3) {{not include the value of direct discovery set parameter}}^^set one or more fields in the direct discovery set IE to specific value(s).^^ and shall set the destination layer-2 ID to the destination layer-2 ID of the candidate 5G ProSe UE-to-UE relay UE as received in the PROSE DIRECT LINK MODIFICATION REQUEST message during the negotiated 5G ProSe layer-3 UE-to-UE relay reselection procedure. If there is no layer-2 ID of the candidate 5G ProSe UE-to-UE relay UE received in the PROSE DIRECT LINK MODIFICATION REQUEST message during the negotiated 5G ProSe layer-3 UE-to-UE relay reselection procedure, the UE shall set the destination layer-2 ID to the default layer-2 ID for discovery as specified in clause 5.2.7;

b) when the 5G ProSe UE-to-UE relay UE receives the PROSE PC5 DISCOVERY message for UE-to-UE relay discovery solicitation, the 5G ProSe UE-to-UE relay does not perform the Relay UE procedure for UE-to-UE relay discovery if:

1) {{the PROSE PC5 DISCOVERY message for UE-to-UE relay discovery solicitation does not include the direct discovery set parameter}}^^one or more fields in the direct discovery set IE matches the pre-configured value^^; and 2) the UE-to-UE relay UE info parameter in the PROSE PC5 DISCOVERY message for UE-to-UE relay discovery solicitation matches with the user info ID for 5G ProSe UE-to-UE relay UE;

c) after b), the 5G ProSe UE-to-UE relay UE shall send the PROSE PC5 DISCOVERY message for UE-to-UE relay discovery response to the discoverer UE. In the PROSE PC5 DISCOVERY message for UE-to-UE relay discovery response, the UE shall:

1) set the relay service code parameter to the relay service code parameter of the PROSE PC5 DISCOVERY message for UE-to-UE relay discovery solicitation received from the target 5G ProSe end UE; and 2) {{not include the value of direct discovery set parameter}}^^set one or more fields in the direct discovery set IE to specific value(s)^^; and d) after c), when the target 5G ProSe end UE receives the PROSE PC5 DISCOVERY message for UE-to-UE relay discovery response and if 1) the relay service code parameter of the PROSE PC5 DISCOVERY message for UE-to-UE relay discovery response is the same as the relay service code parameter of the PROSE PC5 DISCOVERY message for UE-to-UE relay discovery solicitation; ^^ and^^ b) {{the direct discover set parameter of the PROSE PC5 DISCOVERY message for UE-to-UE relay discovery response is not included}}^^one or more fields in the direct discovery set IE matches the pre-configured value^^; and c) the UE-to-UE relay UE info parameter of the PROSE PC5 DISCOVERY message for UE-to-UE relay discovery response is the same as the user info ID for the candidate 5G ProSe UE-to-UE relay UE of the PROSE PC5 DISCOVERY message for UE-to-UE relay discovery solicitation, then the 5G ProSe end UE shall consider the candidate 5G ProSe UE-to-UE relay UE is discovered, and proceed the 5G ProSe direct link modification procedure for UE-to-UE relay UE reselection.

11.2.17 Direct Discovery Set

The purpose of the direct discovery set information element is to carry the direct discovery set as specified in 3GPP TS 33.503.

The direct discovery set information element is a type 6 information element with the minimum length of 12 octets and the maximum length of 520 octets.

The direct discovery set information element is coded as shown in FIG. 11.2.17.1 and table 11.2.17.1.

^^One or more fields shall be set to specific value(s) if the IE is included in the PROSE PC5 DISCOVERY message for UE-to-UE relay discovery solicitation message and the message is used for candidate U2U relay discovery.

One or more fields shall be set to specific value(s) if the IE is included in the PROSE PC5 DISCOVERY message for UE-to-UE relay discovery response message and the message is used for candidate U2U relay discovery.^^

Figure 29:
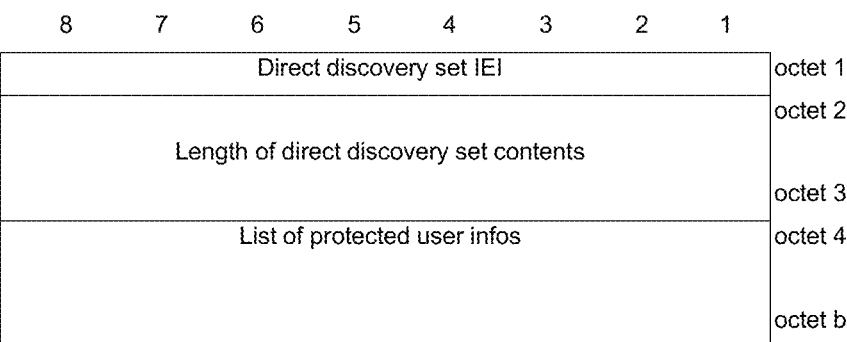
FIG. 29 is a table figure (FIG. 11.2.17.1) showing the direct discovery set information element, in accordance with embodiments of the present invention.

FIG. 29 depicts FIG. 11.2.17.1: Direct discovery set information element.

Figure 30:
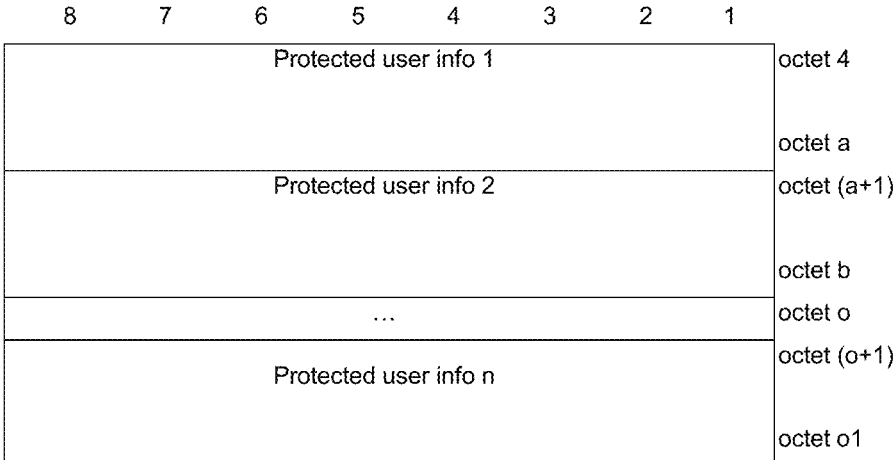
FIG. 30 is a table figure (FIG. 11.2.17.2) showing the list of Protected user info ID, in accordance with embodiments of the present invention.

FIG. 30 depicts FIG. 11.2.17.2: List of Protected user info ID.

Figure 31:
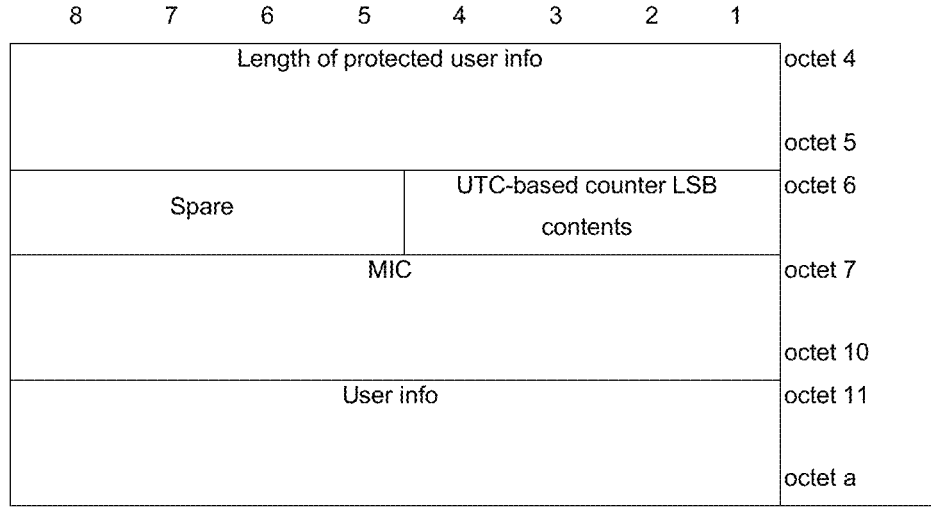
FIG. 31 is a table figure (FIG. 11.2.17.3) showing Protected user info, in accordance with embodiments of the present invention.

FIG. 31 depicts FIG. 11.2.17.3: Protected user info.

TABLE 11.2.17.1

| Direct discovery set information element |
| --- |
| UTC-based counter LSB (bits 1 to 4 of octet b + 5)<br>The UTC-based counter LSB field contains the four least significant bits of the UTC-based counter associated with the discovery transmission opportunity used by the UE. UTC-based counter LSB field is coded as the value part of UTC-based counter LSB information element as specified in clause 11.2.11.<br>MIC (octet 7 to 10)<br>The MIC field contains the MIC (Message Integrity Check) for integrity protection of the direct discovery set. MIC field is coded as the value part of MIC information element as specified in clause 11.3.38.<br>User info (octet 4 to a)<br>The user info field is discoveree user info or discoverer user info containing the Application layer ID of the 5G ProSe end UE. The encypted user info field is coded as the length and value part of Application layer ID information element as specified in clause 11.2.15 starting with the second octet.<br>Bits 5 to 8 of octet (b + 5) are spare and shall be coded as zero. |

End of Change

For another example, the text proposal for the related solutions on top of [2] TS 24.554 could be shown below, with changes and edits shown with double curly brackets to show deletions, i.e., {{ . . . }}, and double carets to show additions/insertions, i.e., ^^. . . ^^:

Start of Change 8a.2.3.3 Candidate 5G ProSe UE-to-UE Relay Discovery Procedure

The purpose of the candidate 5G ProSe UE-to-UE relay discovery procedure is to support the target 5G ProSe end UE to discover the candidate 5G ProSe UE-to-UE relay UE when the target 5G ProSe end UE needs to discover the candidate 5G ProSe UE-to-UE relay UE for the negotiated 5G ProSe layer-3 UE-to-UE relay reselection, as specified in clause 6.7.4 of 3GPP TS 23.304. This procedure is based on UE-to-UE relay discovery over PC5 interface with model B procedure as specified in clause 8a.2.1.3 with the following modifications:

a) when the target 5G ProSe end UE as a discoverer UE generates a PROSE PC5 DISCOVERY message for UE-to-UE relay discovery solicitation, in the PROSE PC5 DISCOVERY message for UE-to-UE relay discovery solicitation, the UE shall:

1) set the relay service code parameter to the relay service code parameter currently being used with the serving 5G UE-to-UE relay UE for which the UE-to-UE relay reselection is needed; and 2) set the UE-to-UE relay UE info parameter to user info ID for the candidate 5G ProSe UE-to-UE relay UE;

{{3) not include the value of direct discovery set parameter; }} and shall set the destination layer-2 ID to the destination layer-2 ID of the candidate 5G ProSe UE-to-UE relay UE as received in the PROSE DIRECT LINK MODIFICATION REQUEST message during the negotiated 5G ProSe layer-3 UE-to-UE relay reselection procedure. {{If there is no layer-2 ID of the candidate 5G ProSe UE-to-UE relay UE received in the PROSE DIRECT LINK MODIFICATION REQUEST message during the negotiated 5G ProSe layer-3 UE-to-UE relay reselection procedure, the UE shall set the destination layer-2 ID to the default layer-2 ID for discovery as specified in clause 5.2.7}};

b) when the 5G ProSe UE-to-UE relay UE receives the PROSE PC5 DISCOVERY message for UE-to-UE relay discovery solicitation, the 5G ProSe UE-to-UE relay does not perform the Relay UE procedure for UE-to-UE relay discovery if:

1)^^ the destination layer-2 ID of^^ the PROSE PC5 DISCOVERY message for UE-to-UE relay discovery solicitation ^^is set to the destination layer-2 ID of the candidate 5G ProSe UE-to-UE relay UE^^{{does not include the direct discovery set parameter}}; and 2) the UE-to-UE relay UE info parameter in the PROSE PC5 DISCOVERY message for UE-to-UE relay discovery solicitation matches with the user info ID for 5G ProSe UE-to-UE relay UE;

c) after b), the 5G ProSe UE-to-UE relay UE shall send the PROSE PC5 DISCOVERY message for UE-to-UE relay discovery response to the discoverer UE. In the PROSE PC5 DISCOVERY message for UE-to-UE relay discovery response, the UE shall:

1) set the relay service code parameter to the relay service code parameter of the PROSE PC5 DISCOVERY message for UE-to-UE relay discovery solicitation received from the target 5G ProSe end UE; ^^ and^^

{{2) not include the value of direct discovery set parameter; and}} d) after c), when the target 5G ProSe end UE receives the PROSE PC5 DISCOVERY message for UE-to-UE relay discovery response and if 1) the relay service code parameter of the PROSE PC5 DISCOVERY message for UE-to-UE relay discovery response is the same as the relay service code parameter of the PROSE PC5 DISCOVERY message for UE-to-UE relay discovery solicitation; ^^ and^^ b) ^^ the destination layer-2 ID^^{{the direct discover set parameter}} of the ^^corresponding^^ PROSE PC5 DISCOVERY message for UE-to-UE relay discovery ^^solicitation^^ {{response}} is ^^set to the destination layer-2 ID of the candidate 5G ProSe UE-to-UE relay UE^^{{not included}}; and c) the UE-to-UE relay UE info parameter of the PROSE PC5 DISCOVERY message for UE-to-UE relay discovery response is the same as the user info ID for the candidate 5G ProSe UE-to-UE relay UE of the PROSE PC5 DISCOVERY message for UE-to-UE relay discovery solicitation, then the 5G ProSe end UE shall consider the candidate 5G ProSe UE-to-UE relay UE is discovered, and proceed the 5G ProSe direct link modification procedure for UE-to-UE relay UE reselection.

End of Changes

Various examples and embodiments of the present invention are described below. For the methods, alternatives, concepts, examples, and embodiments detailed above and herein, the following aspects and embodiments are possible.

Referring to FIG. 32, with this and other concepts, systems, and methods of the present invention, a method 1000 for a relay UE in a wireless communication system comprises receiving a discovery solicitation message from a target end UE, wherein the discovery solicitation message includes information indicating the discovery solicitation message is used for candidate U2U relay discovery (step 1002), and the relay UE, in response to reception of the discovery solicitation message including the information, transmits a discovery response message to the target end UE and performs no procedure for U2U relay discovery (step 1004).

In various embodiments, performing no procedure for U2U relay discovery means the relay UE does not transmit another discovery solicitation message to another end UE in response to reception of the discovery solicitation message.

In various embodiments, the discovery response message includes information indicating the discovery response message is used for candidate U2U relay discovery.

In various embodiments, the discovery response message sent by the relay UE is a PROSE PC5 DISCOVERY message for a UE-to-UE relay discovery response message.

In various embodiments, the discovery solicitation message sent by the target end UE is a PROSE PC5 DISCOVERY message for a UE-to-UE relay discovery solicitation message.

In various embodiments, the information is an information element.

In various embodiments, the information is an indication IE or a candidate discovery indication IE.

In various embodiments, the information is at least a user info set to a specific value, e.g., 0.

In various embodiments, the information is a specific number of protected user info.

In various embodiments, the information is a specific length of a direct discovery set IE.

In various embodiments, the connection is a PC5 connection, PC5-S connection, PC5-Radio Resource Control (RRC) connection, layer-2 link, unicast link, or direct link.

Referring back to FIGS. 3 and 4, in one or more embodiments from the perspective of a relay UE in a wireless communication system, the device 300 includes a program code 312 stored in memory 310 of the transmitter. The CPU 308 could execute program code 312 to: (i) receive a discovery solicitation message from a target end UE, wherein the discovery solicitation message includes information indicating the discovery solicitation message is used for candidate U2U relay discovery; and (ii) the relay UE, in response to reception of the discovery solicitation message including the information, transmits a discovery response message to the target end UE and performs no procedure for U2U relay discovery. Moreover, the CPU 308 can execute the program code 312 to perform all of the described actions, steps, and methods described above, below, or otherwise herein.

Various examples and embodiments of the present invention are described below. For the methods, alternatives, concepts, examples, and embodiments detailed above and herein, the following aspects and embodiments are possible.

Figure 33:
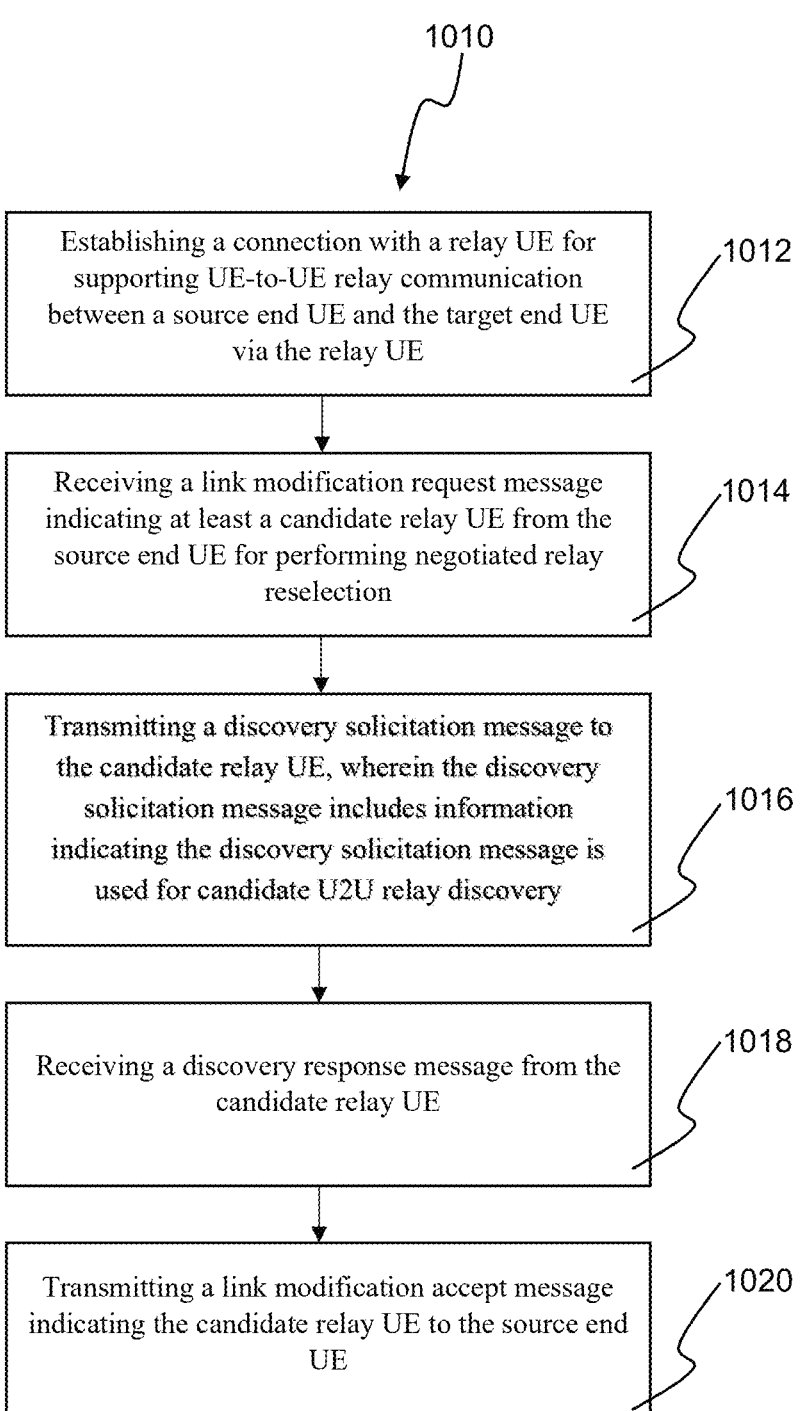
FIG. 33 is a flow diagram of a method for a target end UE in a wireless communication system comprises establishing a connection with a relay UE for supporting UE-to-UE relay communication between a source end UE and the target end UE via the relay UE, receiving a link modification request message indicating at least a candidate relay UE from the source end UE for performing negotiated relay reselection, transmitting a discovery solicitation message to the candidate relay UE, receiving a discovery response message from the candidate relay UE, and transmitting a link modification accept message indicating the candidate relay UE to the source end UE, in accordance with embodiments of the present invention.

Referring to FIG. 33, with this and other concepts, systems, and methods of the present invention, a method 1010 for a target end UE in a wireless communication system comprises establishing a connection with a relay UE for supporting UE-to-UE relay communication between a source end UE and the target end UE via the relay UE (step 1012), receiving a link modification request message indicating at least a candidate relay UE from the source end UE for performing negotiated relay reselection (step 1014), transmitting a discovery solicitation message to the candidate relay UE, wherein the discovery solicitation message includes information indicating the discovery solicitation message is used for candidate U2U relay discovery (step 1016), receiving a discovery response message from the candidate relay UE (step 1018), and transmitting a link modification accept message indicating the candidate relay UE to the source end UE (step 1020).

In various embodiments, the discovery response message includes information indicating this discovery solicitation message is used for candidate U2U relay discovery.

In various embodiments, the target end UE considers the candidate relay UE is discovered in response to reception of the discovery response message including the information indicating this discovery solicitation message is used for candidate U2U relay discovery.

In various embodiments, the discovery response message sent by the relay UE is a PROSE PC5 DISCOVERY message for a UE-to-UE relay discovery response message.

In various embodiments, the discovery solicitation message sent by the target end UE is a PROSE PC5 DISCOVERY message for a UE-to-UE relay discovery solicitation message.

In various embodiments, the information is an information element.

In various embodiments, the information is an indication IE or a candidate discovery indication IE.

In various embodiments, the information is at least a user info set to a specific value, e.g., 0.

In various embodiments, the information is a specific number of protected user info.

In various embodiments, the information is a specific length of a direct discovery set IE.

In various embodiments, the connection is a PC5 connection, PC5-S connection, PC5-RRC connection, layer-2 link, unicast link, or direct link.

Referring back to FIGS. 3 and 4, in one or more embodiments from the perspective of a target end UE in a wireless communication system, the device 300 includes a program code 312 stored in memory 310 of the transmitter. The CPU 308 could execute program code 312 to: (i) establish a connection with a relay UE for supporting UE-to-UE relay communication between a source end UE and the target end UE via the relay UE; (ii) receive a link modification request message indicating at least a candidate relay UE from the source end UE for performing negotiated relay reselection; (iii) transmit a discovery solicitation message to the candidate relay UE, wherein the discovery solicitation message includes information indicating the discovery solicitation message is used for candidate U2U relay discovery; (iv) receive a discovery response message from the candidate relay UE; and (v) transmit a link modification accept message indicating the candidate relay UE to the source end UE. Moreover, the CPU 308 can execute the program code 312 to perform all of the described actions, steps, and methods described above, below, or otherwise herein.

Various examples and embodiments of the present invention are described below. For the methods, alternatives, concepts, examples, and embodiments detailed above and herein, the following aspects and embodiments are possible.

Referring to FIG. 34, with this and other concepts, systems, and methods of the present invention, a method 1030 for a relay UE in a wireless communication system comprises receiving a first discovery solicitation message from a first target end UE, wherein the first discovery solicitation message is received by using or is addressed to a default layer-2 ID for discovery as a Destination Layer-2 ID (step 1032), in response to reception of the first discovery solicitation message addressed to the default layer-2 ID, performing a procedure for U2U relay discovery (step 1034), receiving a second discovery solicitation message from a second target end UE, wherein the second discovery solicitation message is received by using or is addressed to a layer-2 ID of the relay UE as a Destination Layer-2 ID (step 1036), and in response to reception of the second discovery solicitation message addressed to the layer-2 ID of the relay UE, performing no procedure for U2U relay discovery (step 1038).

In various embodiments, the relay UE transmits a third discovery solicitation message in the procedure for U2U relay discovery.

In various embodiments, performing no procedure for U2U relay discovery means the relay UE does not transmit another discovery solicitation message.

In various embodiments, the discovery solicitation message sent by the relay UE is a PROSE PC5 DISCOVERY message for a UE-to-UE relay discovery solicitation message.

Referring back to FIGS. 3 and 4, in one or more embodiments from the perspective of a relay UE in a wireless communication system, the device 300 includes a program code 312 stored in memory 310 of the transmitter. The CPU 308 could execute program code 312 to: (i) receive a first discovery solicitation message from a first target end UE, wherein the first discovery solicitation message is received by using or is addressed to a default layer-2 ID for discovery as a Destination Layer-2 ID; (ii) in response to reception of the first discovery solicitation message addressed to the default layer-2 ID, perform a procedure for U2U relay discovery; (iii) receive a second discovery solicitation message from a second target end UE, wherein the second discovery solicitation message is received by using or is addressed to a layer-2 ID of the relay UE as a Destination Layer-2 ID; and (iv) in response to reception of the second discovery solicitation message addressed to the layer-2 ID of the relay UE, perform no procedure for U2U relay discovery. Moreover, the CPU 308 can execute the program code 312 to perform all of the described actions, steps, and methods described above, below, or otherwise herein.

Various examples and embodiments of the present invention are described below. For the methods, alternatives, concepts, examples, and embodiments detailed above and herein, the following aspects and embodiments are possible.

Referring to FIG. 35, with this and other concepts, systems, and methods of the present invention, a method 1040 for a second end UE in a wireless communication system comprises sending a first discovery solicitation message, wherein the first discovery solicitation message is sent by using or is addressed to a default layer-2 ID for discovery as a Destination Layer-2 ID if the first discovery solicitation message is used for U2U relay discovery (step 1042), and sending a second discovery solicitation message, wherein the second discovery solicitation message is sent by using or is addressed to a layer-2 ID of a candidate relay UE as a Destination Layer-2 ID if the second discovery solicitation message is used for candidate U2U relay discovery (step 1044).

In various embodiments, the second end UE establishes a connection with a relay UE for supporting a first U2U relay communication between a first end UE and the second end UE via the relay UE.

In various embodiments, the second end UE receives a link modification request message indicating the candidate relay UE for negotiated relay reselection from the first end UE via the relay UE.

In various embodiments, the link modification request message includes the Layer-2 ID of the candidate relay UE.

In various embodiments, the second end UE receives a first discovery response message from the candidate relay UE.

In various embodiments, the second end UE, in response to reception of the first discovery response message, sends a link modification accept message indicating the candidate relay UE to the source end UE via the relay UE.

In various embodiments, the first discovery solicitation message includes a user info of a third end UE and a user info of the second end UE.

In various embodiments, the second end UE receives a second discovery response message from a second relay UE.

In various embodiments, the second end UE, based on the second discovery response message, establishes a connection with the second relay UE for supporting a second U2U relay communication between the third end UE and the second end UE via the second relay UE.

In various embodiments, the first/second discovery solicitation message sent by the second end UE is a PROSE PC5 DISCOVERY message for a UE-to-UE relay discovery solicitation message.

In various embodiments, the first/second discovery solicitation message sent by the second end UE is a PROSE PC5 DISCOVERY message for a UE-to-UE relay discovery solicitation message.

In various embodiments, the first/second discovery response message sent by the second end UE is a PROSE PC5 DISCOVERY message for a UE-to-UE relay discovery response message.

In various embodiments, the first end UE is a source end UE and the second end UE is a target end UE in the first U2U relay communication.

In various embodiments, the third end UE is a target end UE and the second end UE is a source end UE in the second U2U relay communication.

Referring back to FIGS. 3 and 4, in one or more embodiments from the perspective of a second end UE in a wireless communication system, the device 300 includes a program code 312 stored in memory 310 of the transmitter. The CPU 308 could execute program code 312 to: (i) send a first discovery solicitation message, wherein the first discovery solicitation message is sent by using or is addressed to a default layer-2 ID for discovery as a Destination Layer-2 ID if the first discovery solicitation message is used for U2U relay discovery; and (ii) send a second discovery solicitation message, wherein the second discovery solicitation message is sent by using or is addressed to a layer-2 ID of a candidate relay UE as a Destination Layer-2 ID if the second discovery solicitation message is used for candidate U2U relay discovery. Moreover, the CPU 308 can execute the program code 312 to perform all of the described actions, steps, and methods described above, below, or otherwise herein.

Referring to FIG. 36, with this and other concepts, systems, and methods of the present invention, a method 1050 for a relay UE in a wireless communication system comprises receiving, from a target end UE, a discovery solicitation message for candidate U2U relay discovery (step 1052), and determining to transmit a discovery response message to the target end UE, in response to reception of the discovery solicitation message for candidate U2U relay discovery, wherein the discovery response message indicates the discovery response message being used for candidate U2U relay discovery by at least setting an application layer ID indicated in the discovery response message to a specific value (step 1054).

In various embodiments, the specific value is 0.

In various embodiments, the application layer ID is included in a user info field.

In various embodiments, the user info field is included in a direct discovery set.

In various embodiments, the discovery response message indicates the discovery response message being used for candidate U2U relay discovery further by a number of user info in the direct discovery set being 1.

In various embodiments, the direct discovery set is mandatory in the discovery response message.

In various embodiments, the discovery response message transmitted by the relay UE is a PROSE PC5 DISCOVERY message for U2U relay discovery response, and the discovery solicitation message received from the target end UE is a PROSE PC5 DISCOVERY message for U2U relay discovery solicitation.

In various embodiments, the discovery solicitation message indicates the discovery solicitation message being used for candidate U2U relay discovery by at least setting a second application layer ID indicated in the discovery solicitation message to the specific value.

In various embodiments, the method further comprises determining the discovery solicitation message being used for candidate U2U relay discovery based on the second application layer ID being set to the specific value.

In various embodiments, the method further comprises not performing, in response to reception of the discovery solicitation message for candidate U2U relay discovery, a relay UE procedure for U2U relay discovery.

Referring back to FIGS. 3 and 4, in one or more embodiments from the perspective of a UE in a wireless communication system, the device 300 includes a program code 312 stored in memory 310 of the transmitter. The CPU 308 could execute program code 312 to: (i) receive, from a target end UE, a discovery solicitation message for candidate U2U relay discovery; and (ii) determine to transmit a discovery response message to the target end UE, in response to reception of the discovery solicitation message for candidate U2U relay discovery, wherein the discovery response message indicates the discovery response message being used for candidate U2U relay discovery by at least setting an application layer ID indicated in the discovery response message to a specific value. Moreover, the CPU 308 can execute the program code 312 to perform all of the described actions, steps, and methods described above, below, or otherwise herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:
1. A method for a relay User Equipment (UE), comprising:
   receiving, from a target end UE, a discovery solicitation message for candidate UE-to-UE (U2U) relay discovery; and
   determining to transmit a discovery response message to the target end UE, in response to reception of the discovery solicitation message for candidate U2U relay discovery, wherein the discovery response message indicates the discovery response message being used for candidate U2U relay discovery by at least setting an application layer Identification (ID) indicated in the discovery response message to a specific value of 0.
2. The method of claim 1, wherein the application layer ID is included in a user info field.
3. The method of claim 2, wherein the user info field is included in a direct discovery set.
4. The method of claim 3, wherein the discovery response message indicates the discovery response message being used for candidate U2U relay discovery further by a number of user info in the direct discovery set being 1.
5. The method of claim 3, wherein the direct discovery set is mandatory in the discovery response message.
6. The method of claim 1, wherein the discovery response message transmitted by the relay UE is a PROSE PC5 DISCOVERY message for U2U relay discovery response, and the discovery solicitation message received from the target end UE is a PROSE PC5 DISCOVERY message for U2U relay discovery solicitation.
7. The method of claim 1, wherein the discovery solicitation message indicates the discovery solicitation message being used for candidate U2U relay discovery by at least setting a second application layer ID indicated in the discovery solicitation message to the specific value.
8. The method of claim 7, further comprising determining the discovery solicitation message being used for candidate U2U relay discovery based on the second application layer ID being set to the specific value.
9. The method of claim 1, further comprising not performing, in response to reception of the discovery solicitation message for candidate U2U relay discovery, a relay UE procedure for U2U relay discovery.

10. A relay User Equipment (UE), comprising:

a memory; and a processor operatively coupled with the memory, wherein the processor is configured to execute a program code to:

receive, from a target end UE, a discovery solicitation message for candidate UE-to-UE (U2U) relay discovery; and determine to transmit a discovery response message to the target end UE, in response to reception of the discovery solicitation message for candidate U2U relay discovery, wherein the discovery response message indicates the discovery response message being used for candidate U2U relay discovery by at least setting an application layer Identification (ID) indicated in the discovery response message to a specific value of 0.

11. The relay UE of claim 10, wherein the application layer ID is included in a user info field.

12. The relay UE of claim 11, wherein the user info field is included in a direct discovery set.

13. The relay UE of claim 12, wherein the discovery response message indicates the discovery response message being used for candidate U2U relay discovery further by a number of user info in the direct discovery set being 1.

14. The relay UE of claim 12, wherein the direct discovery set is mandatory in the discovery response message.

15. The relay UE of claim 10, wherein the discovery response message transmitted by the relay UE is a PROSE PC5 DISCOVERY message for a U2U relay discovery response, and the discovery solicitation message received from the target end UE is a PROSE PC5 DISCOVERY message for U2U relay discovery solicitation.

16. The relay UE of claim 10, wherein the discovery solicitation message indicates the discovery solicitation message being used for candidate U2U relay discovery by at least setting a second application layer ID indicated in the discovery solicitation message to the specific value.

17. The relay UE of claim 16, wherein the processor is further configured to execute the program code to: determine the discovery solicitation message being used for candidate U2U relay discovery based on the second application layer ID being set to the specific value.

18. The relay UE of claim 10, wherein the processor is further configured to execute the program code to: not perform, in response to reception of the discovery solicitation message for candidate U2U relay discovery, a relay UE procedure for U2U relay discovery.

* * * * *